(12) United States Patent
Bender

(10) Patent No.: US 10,944,726 B2
(45) Date of Patent: Mar. 9, 2021

(54) METHOD AND APPLICATION FOR COMMUNICATING SENSITIVE INFORMATION

(71) Applicant: T. Gregory Bender, Harrison, NY (US)

(72) Inventor: T. Gregory Bender, Harrison, NY (US)

(73) Assignee: Anonymous Alerts, LLC, White Plains, NY (US)

( * ) Notice: Subject to any disclaimer, the term of this patent is extended or adjusted under 35 U.S.C. 154(b) by 95 days.

(21) Appl. No.: 15/636,061

(22) Filed: Jun. 28, 2017

(65) Prior Publication Data
US 2019/0007377 A1    Jan. 3, 2019

Related U.S. Application Data

(63) Continuation-in-part of application No. 14/754,655, filed on Jun. 29, 2015, now Pat. No. 10,419,399, (Continued)

(51) Int. Cl.
*H04L 29/06* (2006.01)
*H04W 4/90* (2018.01)
(Continued)

(52) U.S. Cl.
CPC ...... *H04L 63/0421* (2013.01); *H04L 12/1895* (2013.01); *H04L 51/14* (2013.01);
(Continued)

(58) Field of Classification Search
None
See application file for complete search history.

(56) References Cited

U.S. PATENT DOCUMENTS

| 7,151,438 B1 * | 12/2006 | Hall | G06Q 10/10 340/286.06 |
| 2002/0107002 A1 * | 8/2002 | Duncan | H04L 12/1859 455/412.1 |

(Continued)

*Primary Examiner* — Kaveh Abrishamkar
(74) *Attorney, Agent, or Firm* — Lainie E. Parker; Richard M. Blank

(57) ABSTRACT

Method and application for communicating sensitive information, incident reporting, and for acceleration of urgent situation responses and supervision allowing for school administrators, teachers, professors, users, submitters, or receivers, to instantly report credible threats, or dangerous situations. In at least one current embodiment, a Smart Button is a digital situation button for use by any submitter to instantly report their GPS map location, name, title, contact information, picture and/or workplace. Submitters can receive and/or send 1-way or at least 2-way communications. At least one embodiment of the invention relates to a method for sending, receiving, reporting or responding to mood related, time-sensitive, live situation, or secretive messages, through a one-step anonymous, or with a specific degree of anonymity, or non-anonymous submit and targeted authorized receipt process, generating, assigning, and utilizing unique identifiers with a corresponding administrative report generating process. Submitters' information and messages can be encrypted, in whole or in part.

34 Claims, 69 Drawing Sheets

Related U.S. Application Data which is a continuation-in-part of application No. 13/902,801, filed on May 25, 2013, now Pat. No. 9,071,579.

(60) Provisional application No. 62/356,401, filed on Jun. 29, 2016, provisional application No. 61/662,305, filed on Jun. 20, 2012, provisional application No. 61/252,099, filed on May 25, 2012.

(51) Int. Cl.
   *H04L 12/18* (2006.01)
   *H04L 12/58* (2006.01)
   *H04W 12/02* (2009.01)
   *H04W 4/21* (2018.01)

(52) U.S. Cl.
   CPC .......... *H04L 51/32* (2013.01); *H04L 63/0428* (2013.01); *H04L 63/104* (2013.01); *H04W 4/90* (2018.02); *H04W 12/02* (2013.01); *H04L 51/28* (2013.01); *H04L 2209/42* (2013.01); *H04W 4/21* (2018.02)

(56) References Cited

U.S. PATENT DOCUMENTS

| | | | |
|---|---|---|---|
| 2004/0110119 A1* | 6/2004 | Riconda ................ | G09B 7/02 434/350 |
| 2005/0188090 A1* | 8/2005 | Washburn .......... | G06Q 30/0218 709/226 |
| 2005/0266388 A1* | 12/2005 | Gross .................. | G09B 5/00 434/350 |

* cited by examiner

SYSTEM FLOW

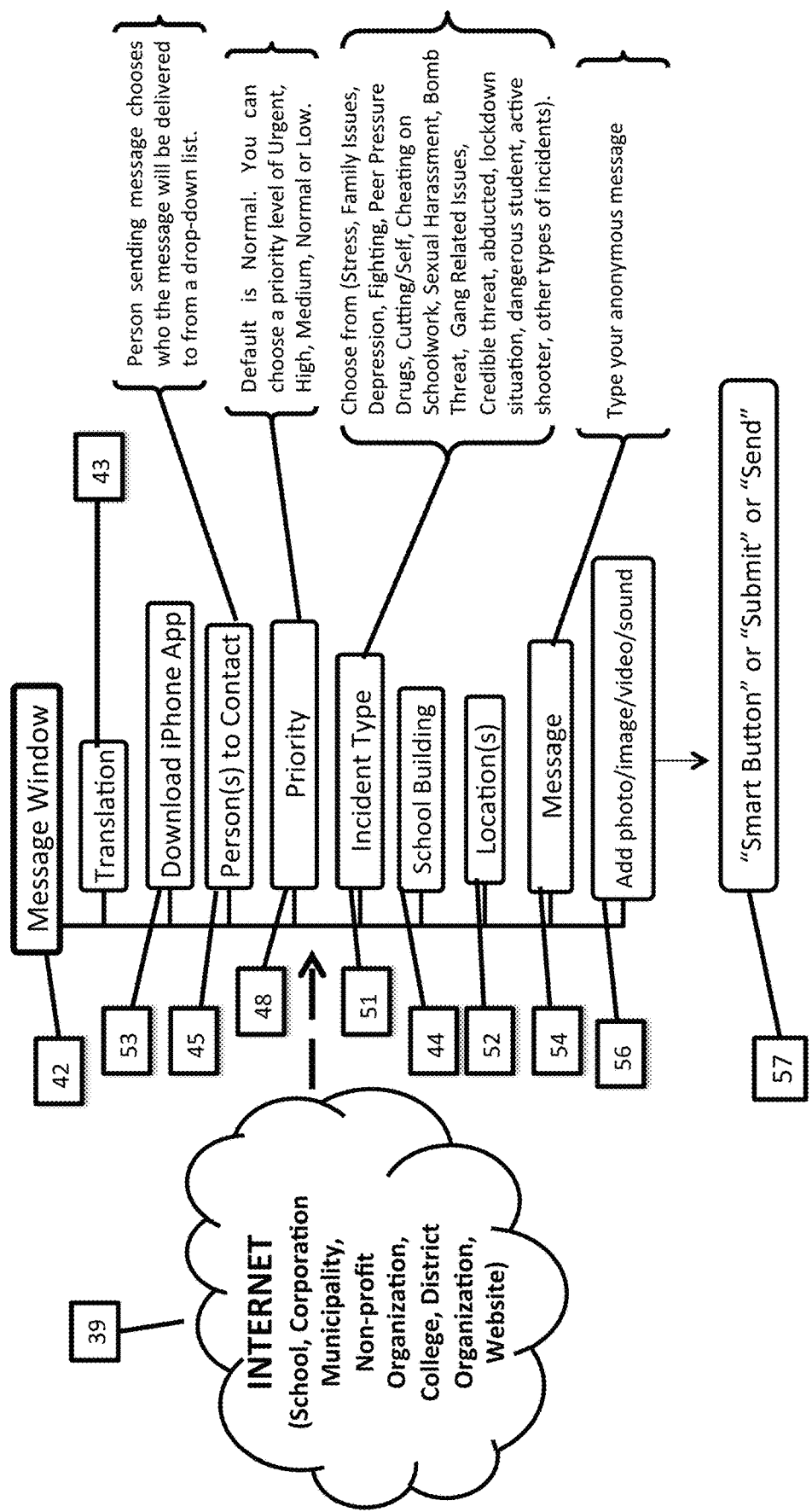

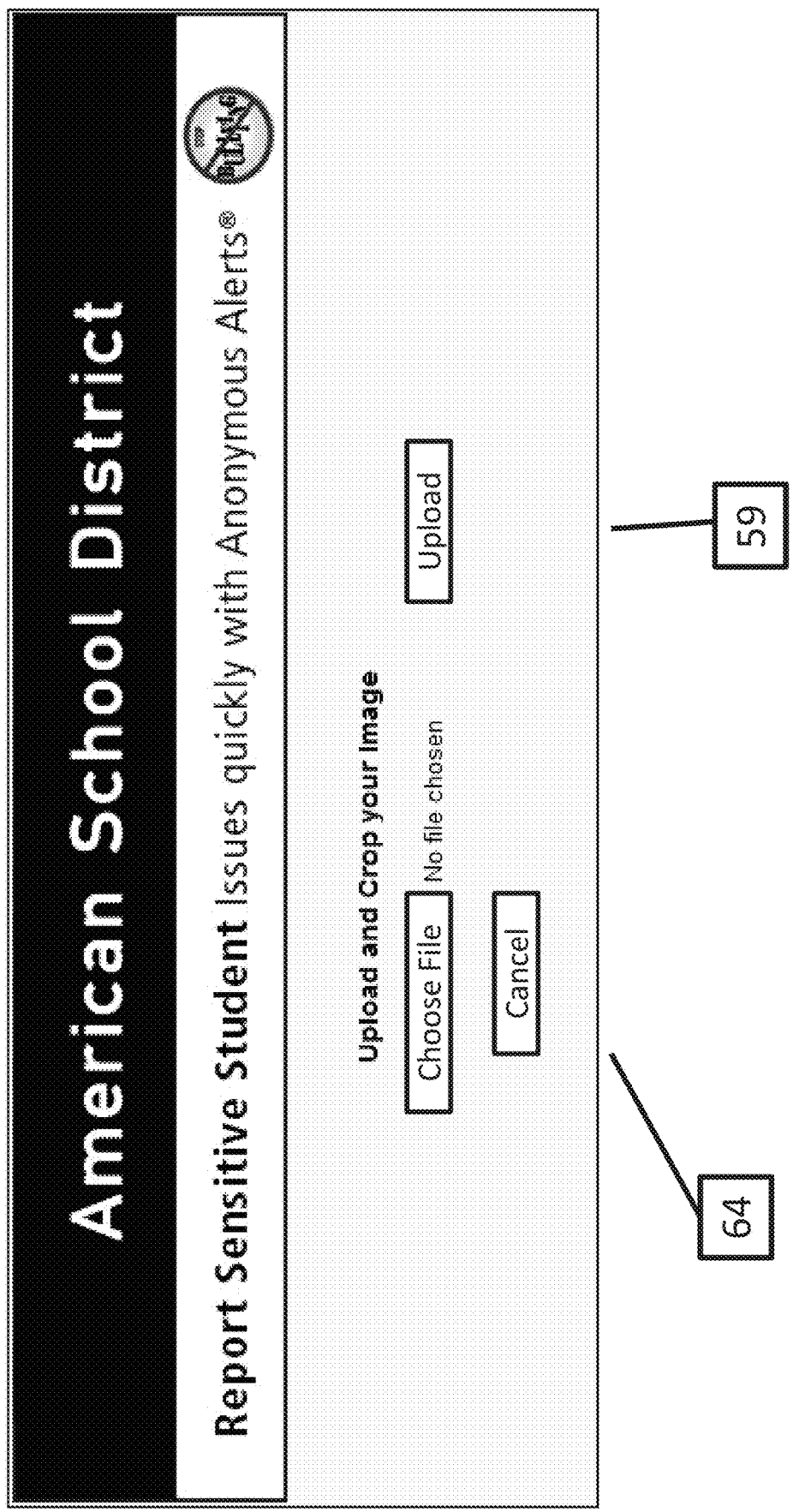
FIG. 2A Choose an Image

FIG. 2B Selecting the image

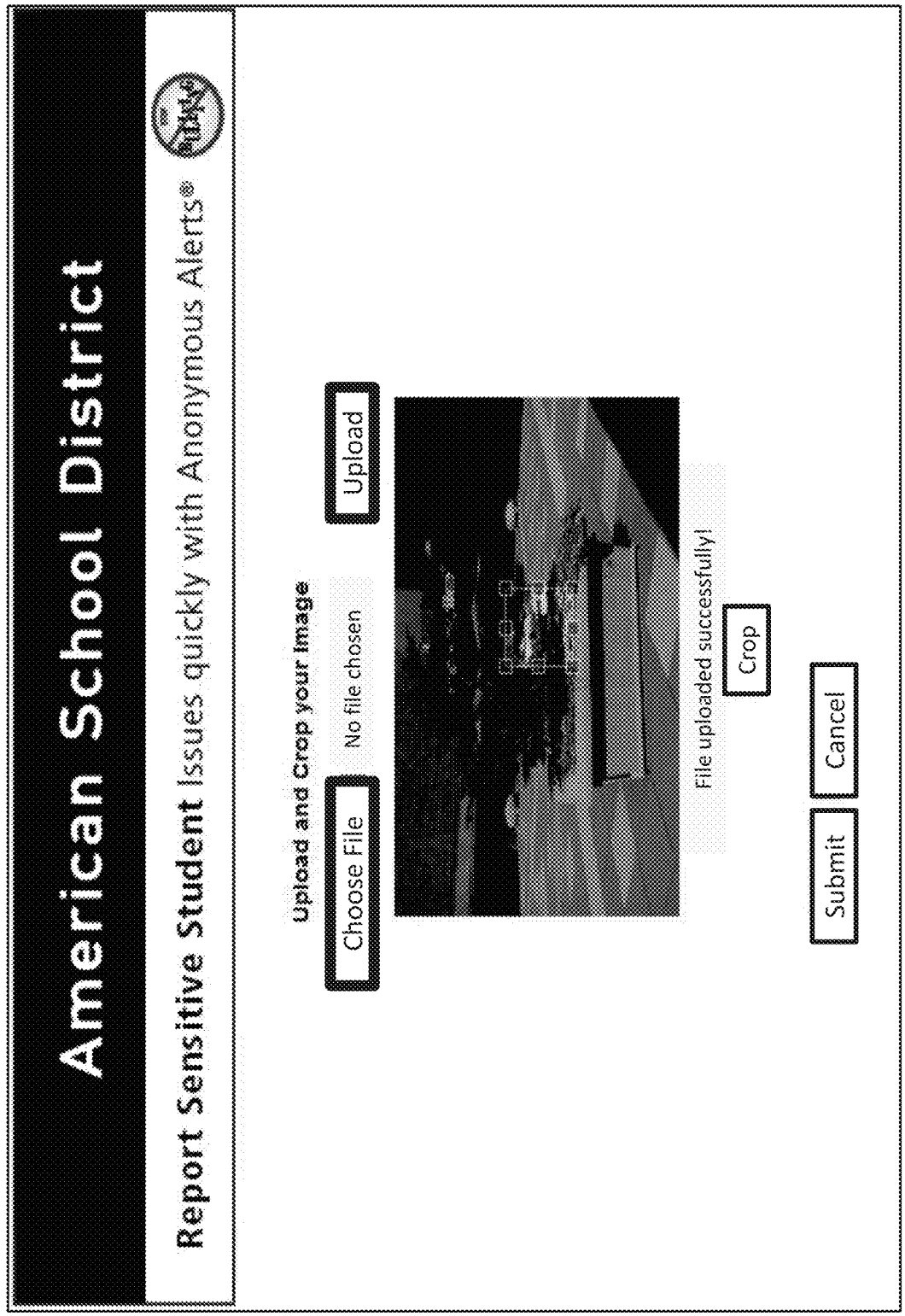
FIG. 2C: Uploading the image

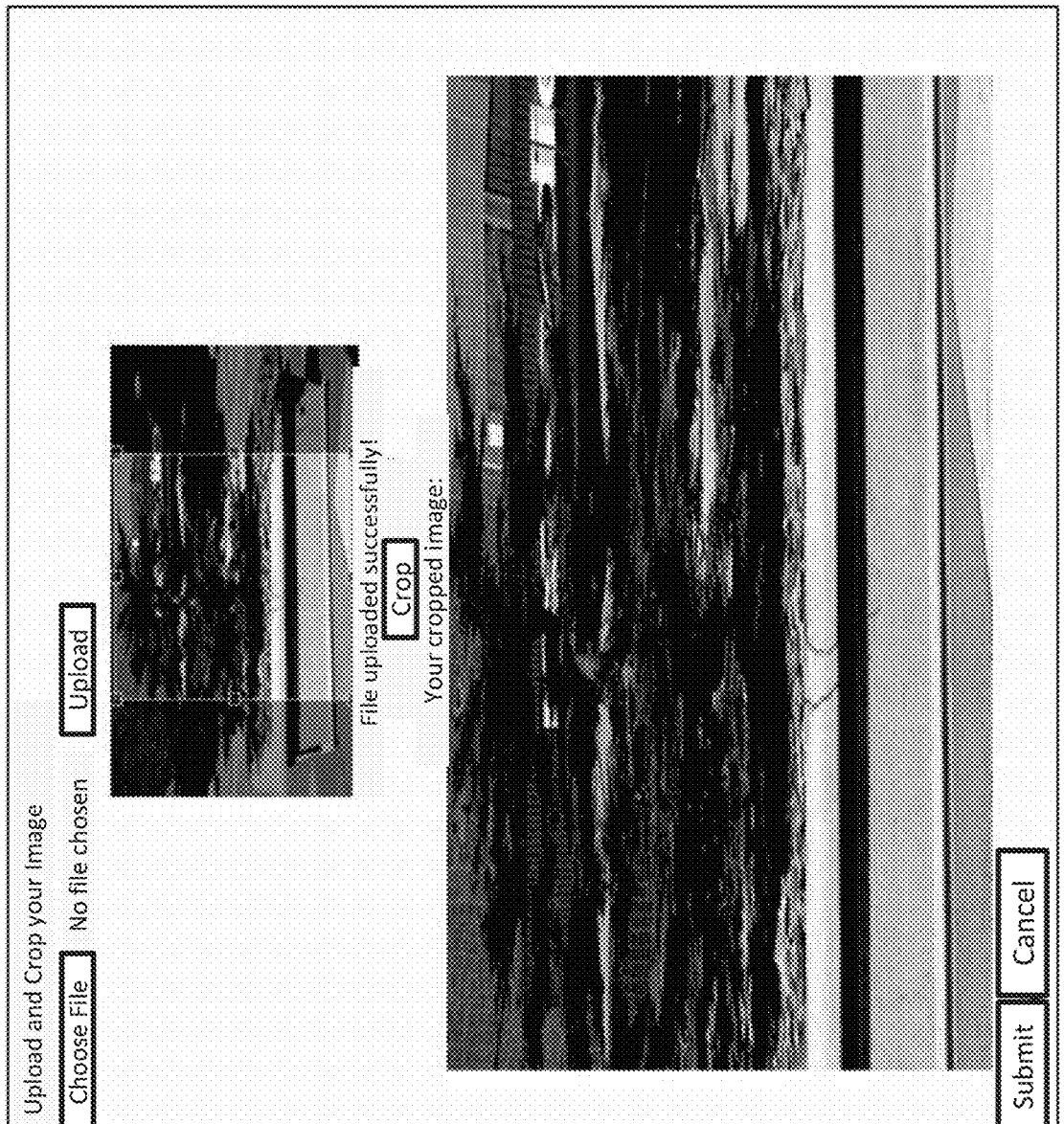
FIG. 2D Crop the image

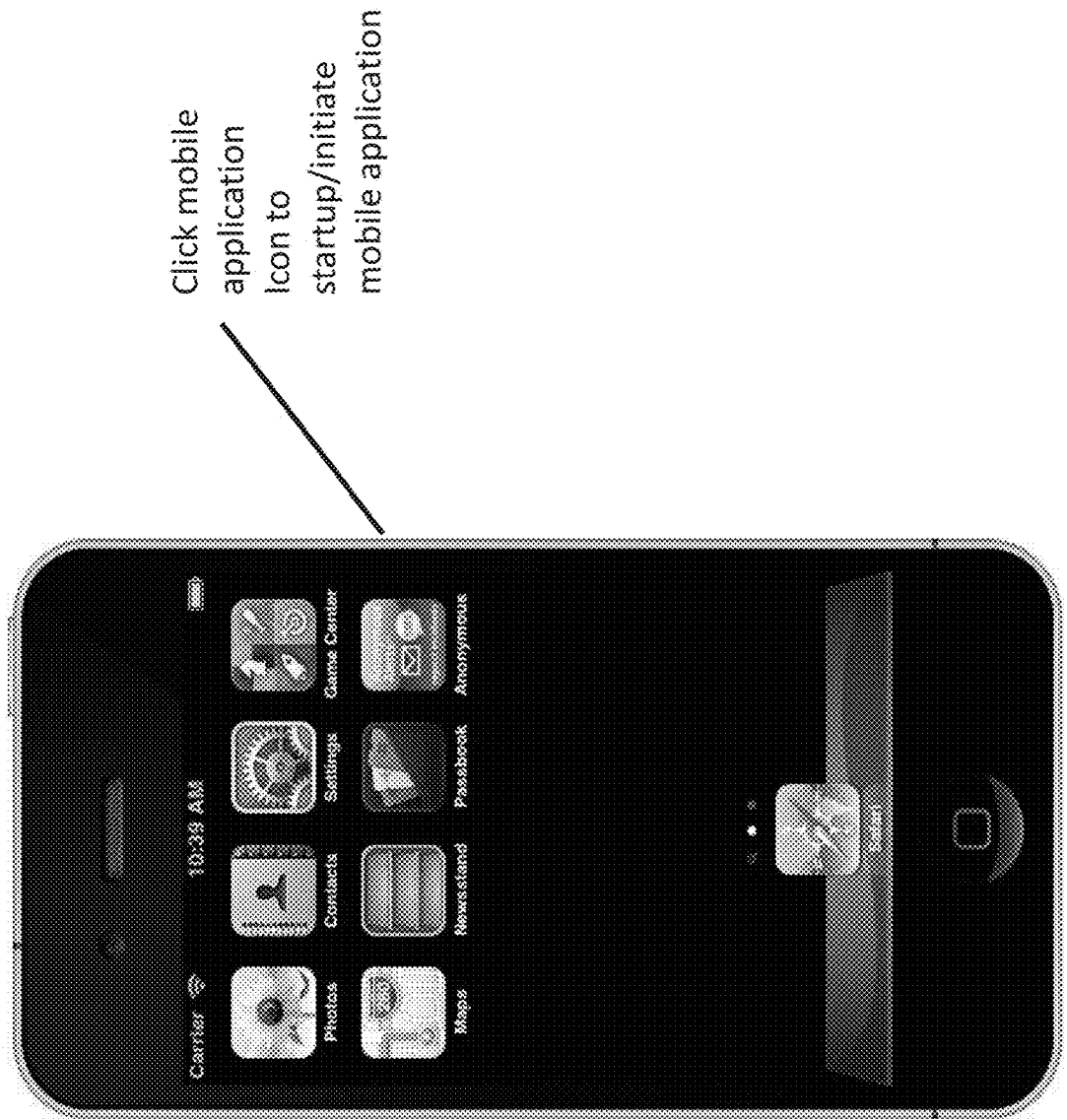
FIG. 2E Mobile Application Screen
Mobile Screen 1.

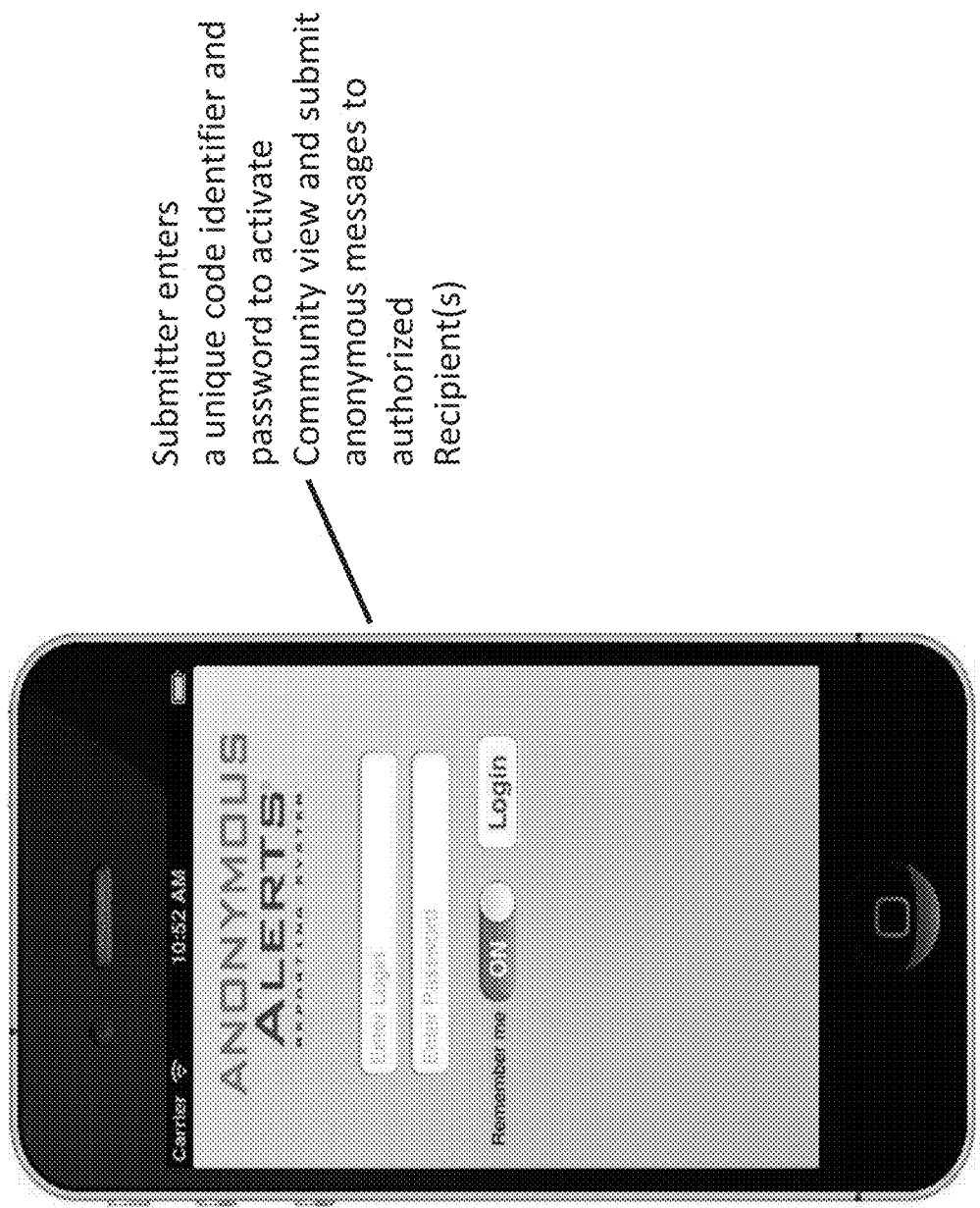
FIG. 2F Mobile Application Screen
Mobile Screen 2.

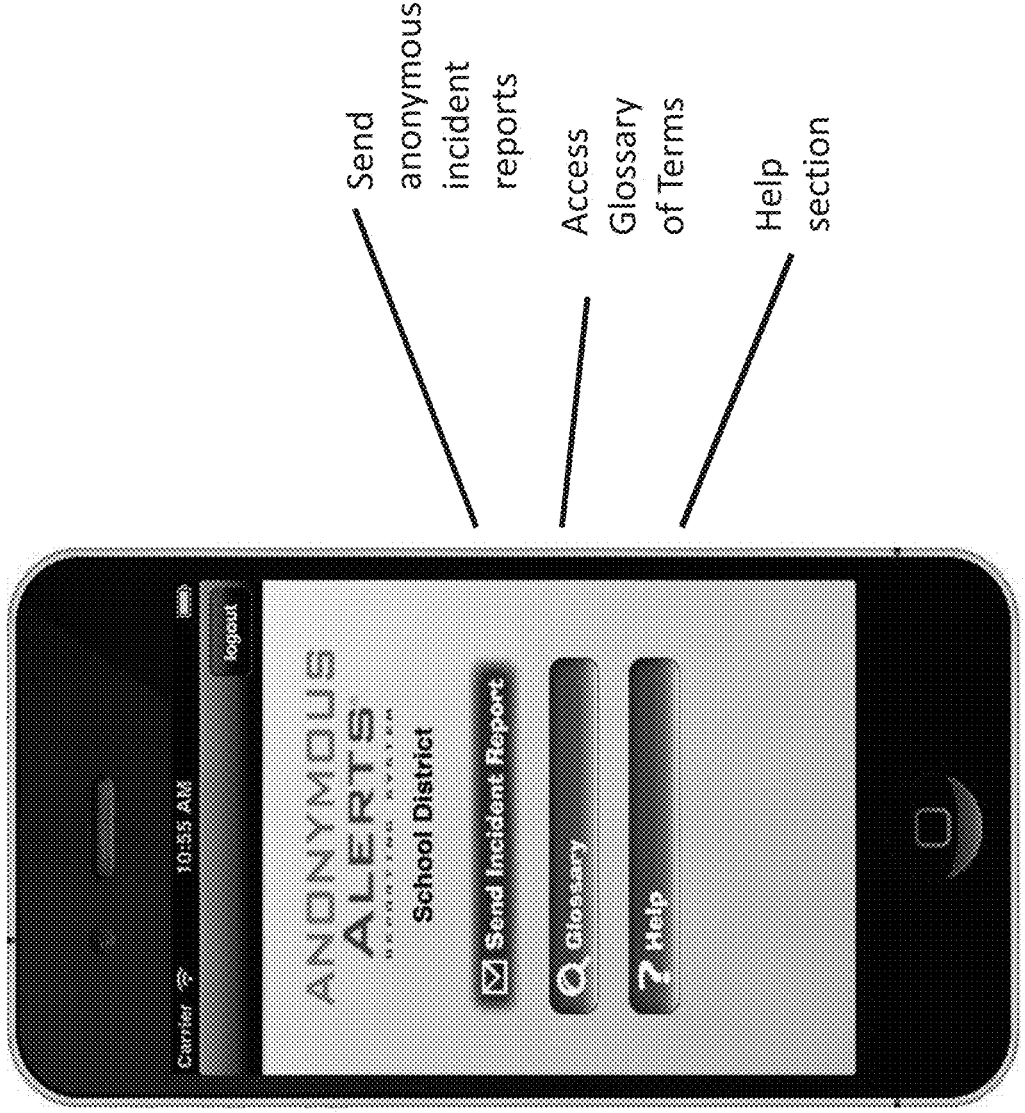
FIG. 2G Mobile Application Screen
Mobile Screen 3.

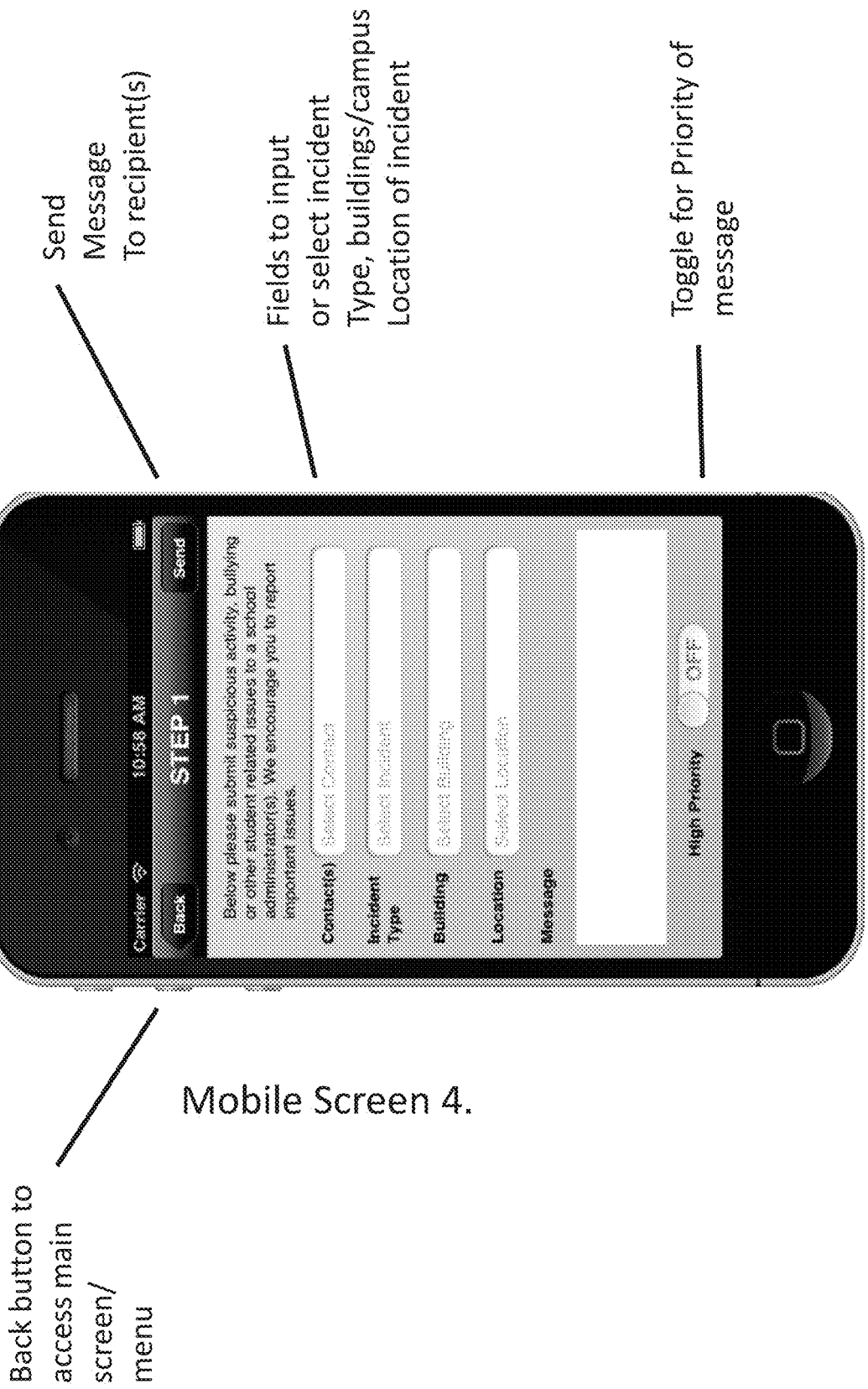
FIG. 2H Mobile Application Screen

FIG.2I Mobile Application Screen
Mobile Screen 5.

FIG.2J Mobile Application Screen
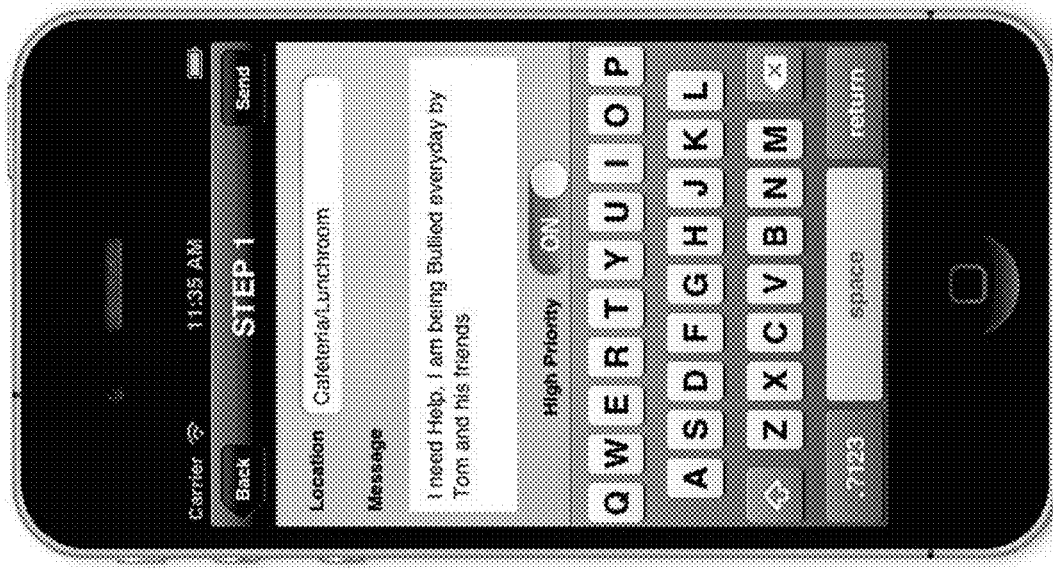
Submitter types in anonymous message to send to authorized Receiver(s)
Mobile Screen 6.

FIG.2K Mobile Application Screen
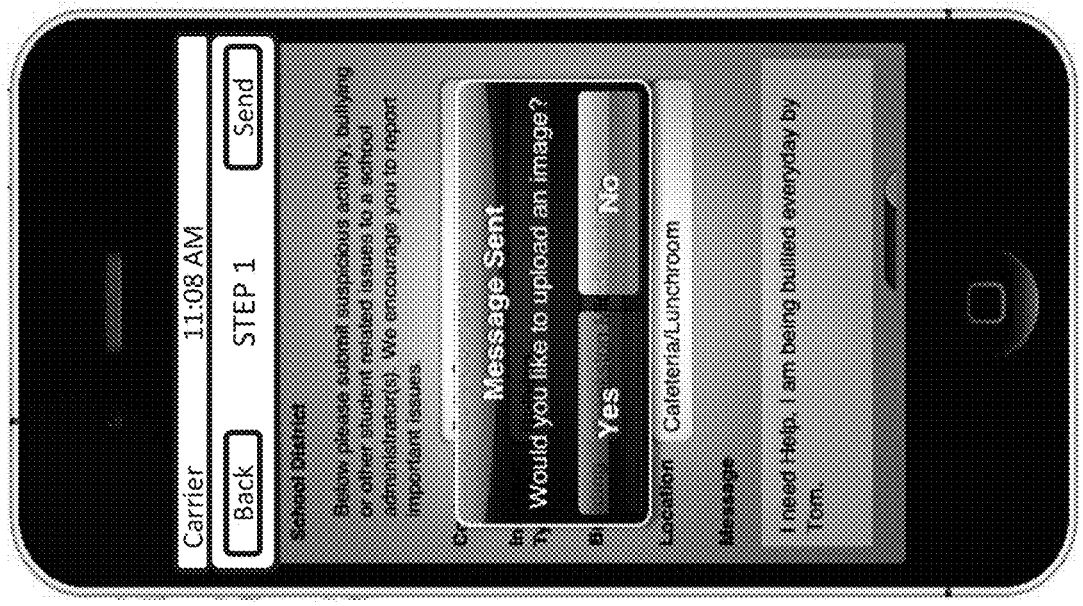
Submitter is prompted to upload an image At their discretion If they have an image to upload about an incident report
Mobile Screen 7.

FIG. 2L Mobile Application Screen
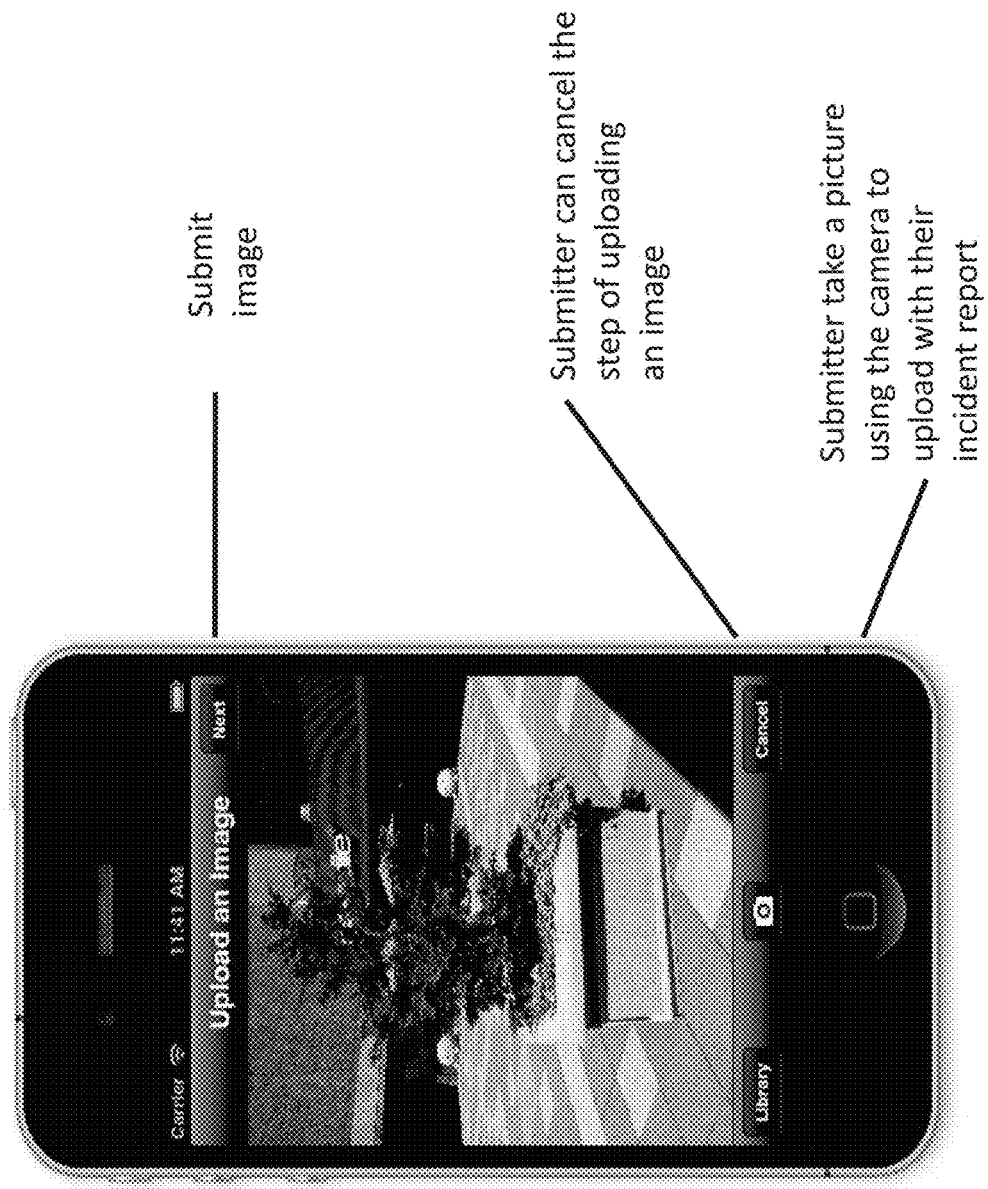
Submit image
Submitter can cancel the step of uploading an image
Submitter take a picture using the camera to upload with their incident report
Mobile Screen 8.
Submitter can select a saved image

FIG.2M Mobile Application Screen
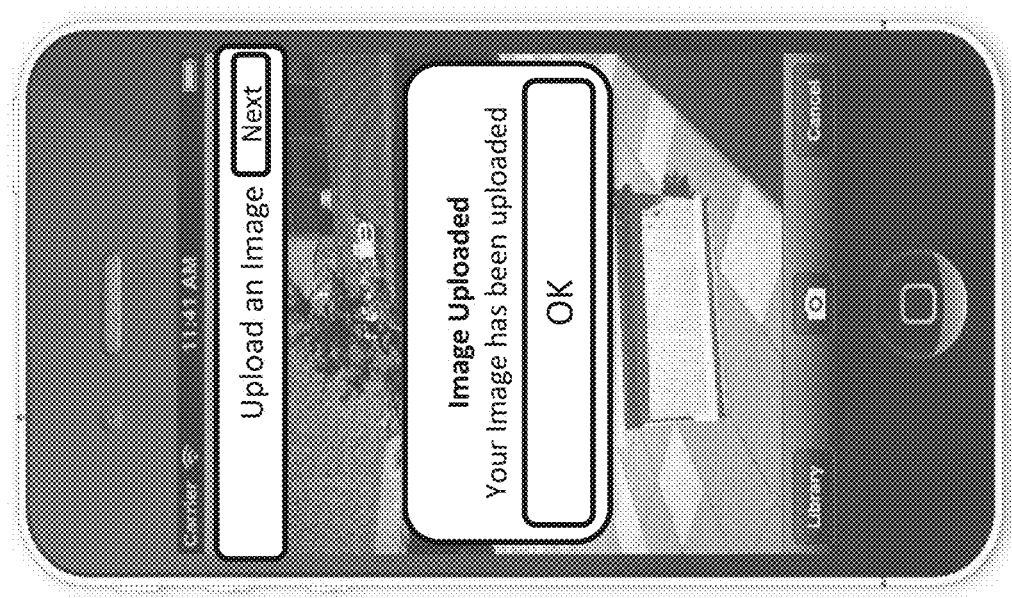
Confirmation screen
Details that the image is successfully uploaded with text report of the incident by the submitter
Mobile Screen 9.

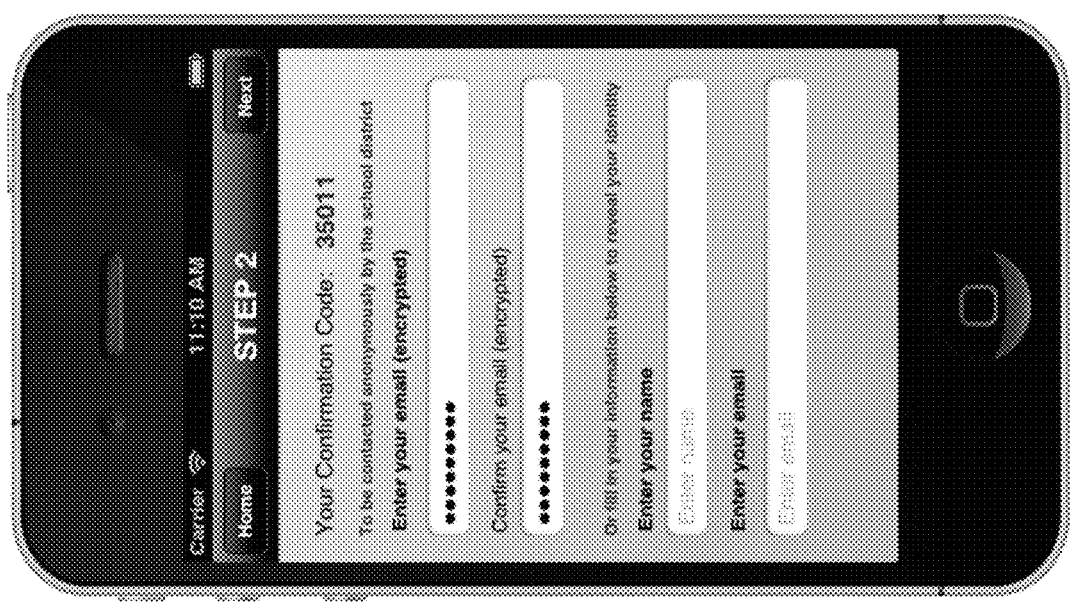
FIG.2N Mobile Application Screen
Mobile Screen 10.

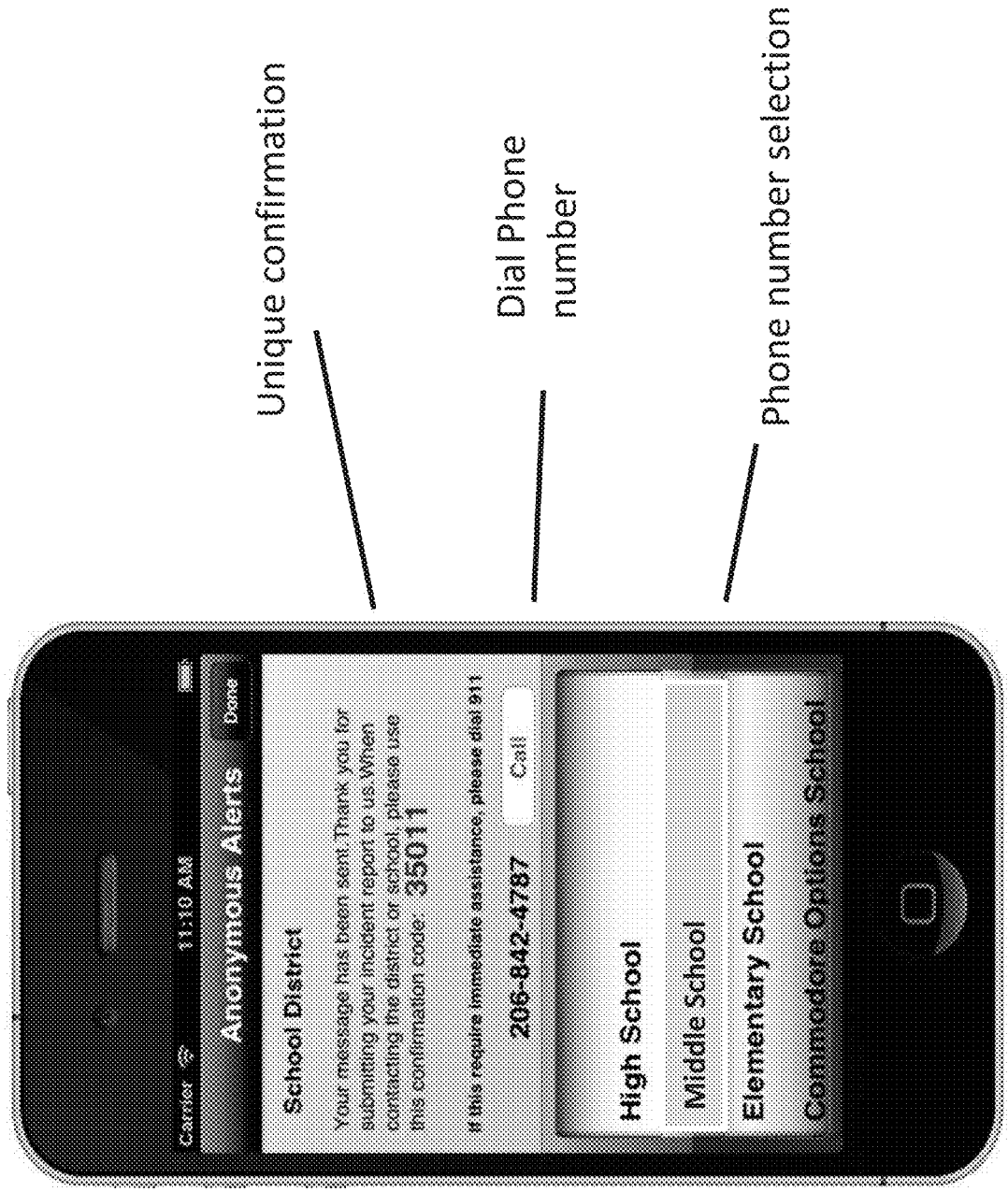
FIG. 2O Mobile Application Screen
Mobile Screen 11.

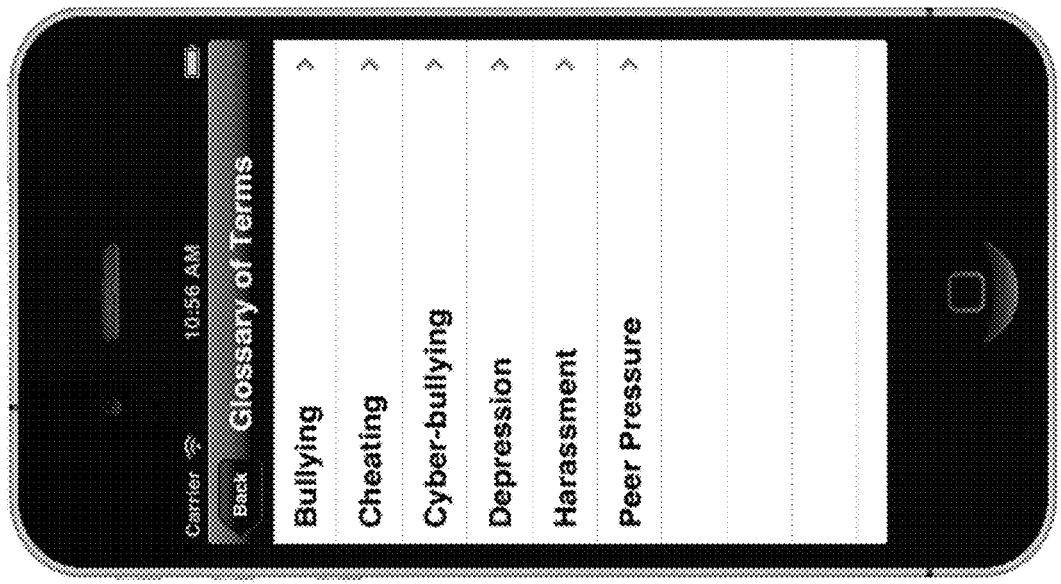
FIG.2P Mobile Application Screen
Submitter clicks on icon for Glossary of terms to read community specific Glossary of Terms
Mobile Screen 12.

FIG. 2Q Mobile Application Screen
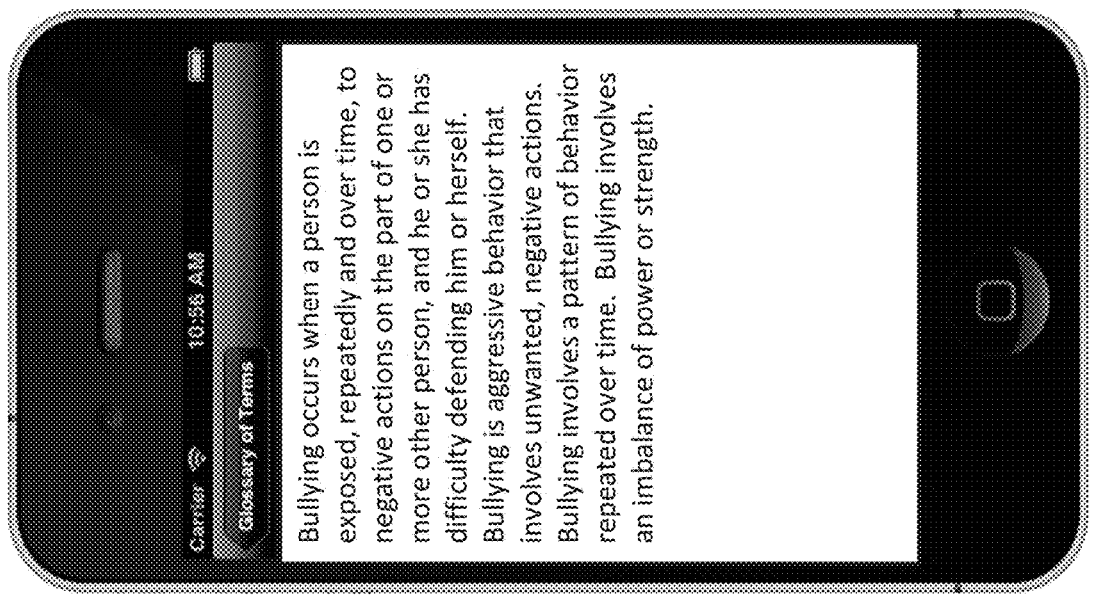
Mobile Screen 13.

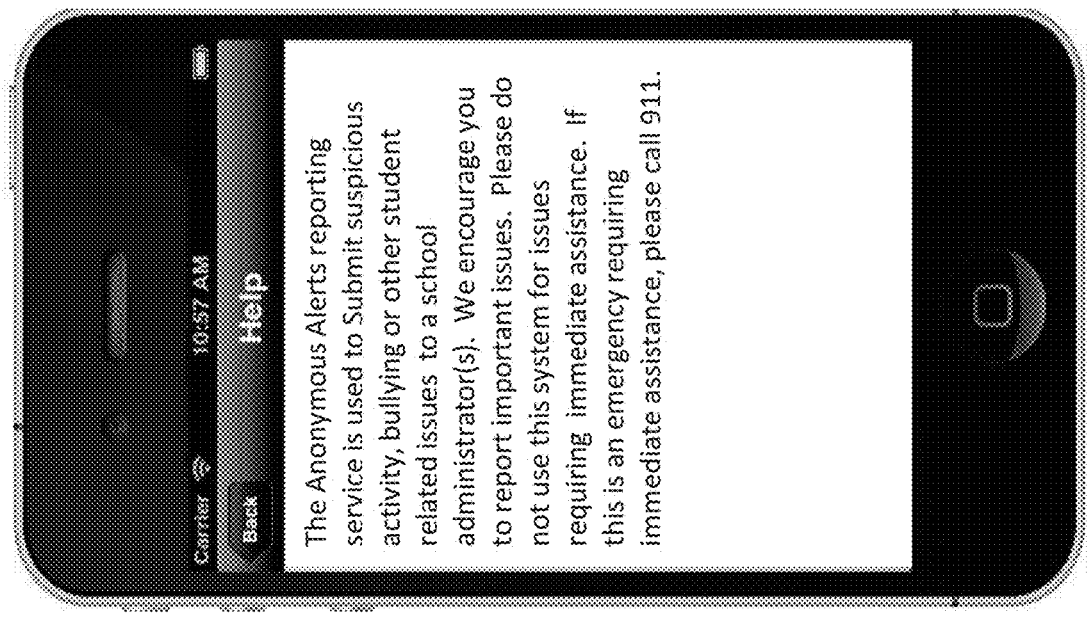
FIG.2R Mobile Application Screen
Mobile Screen 14.

FIG.2S Message Receiver / Message Recipient
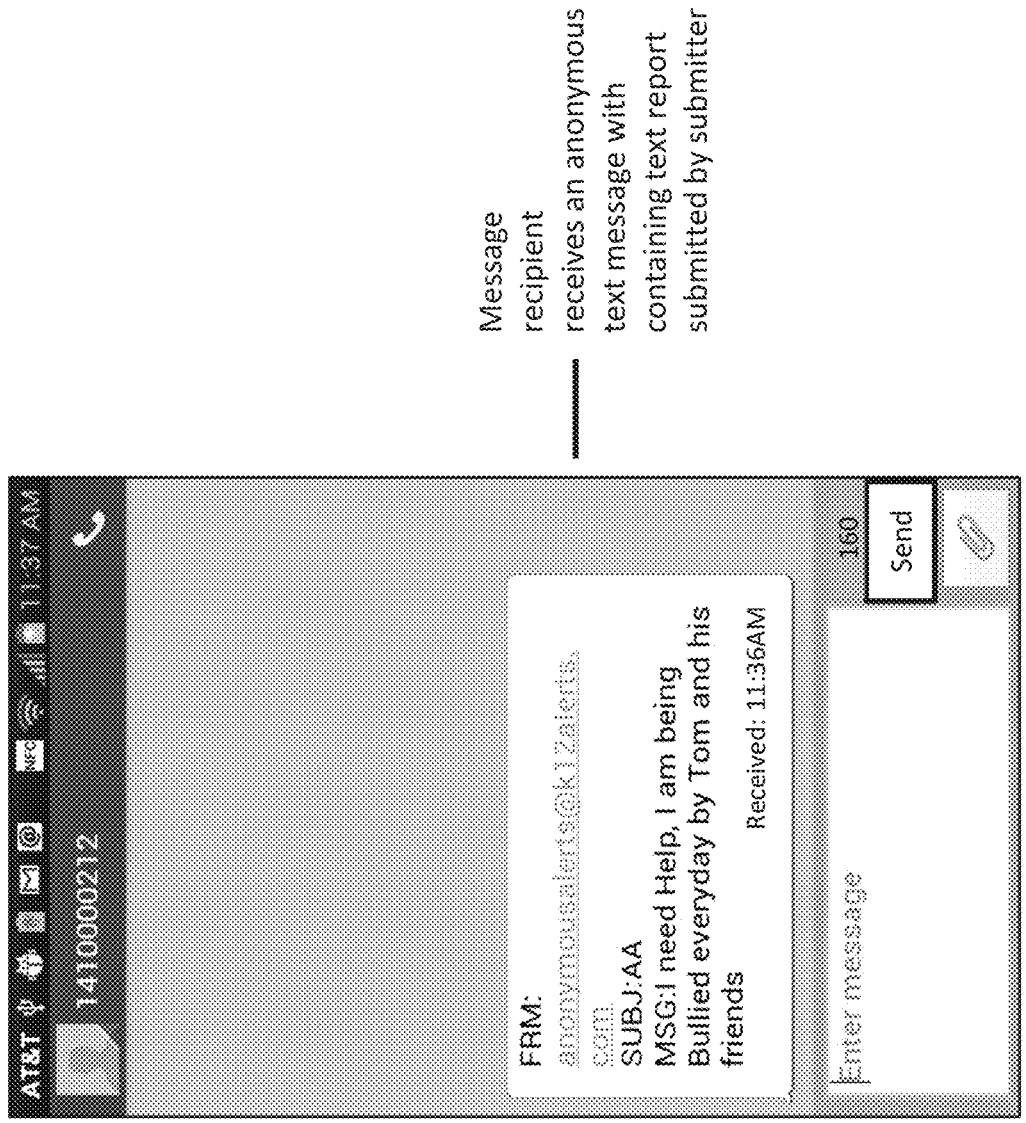
Mobile Screen 15.

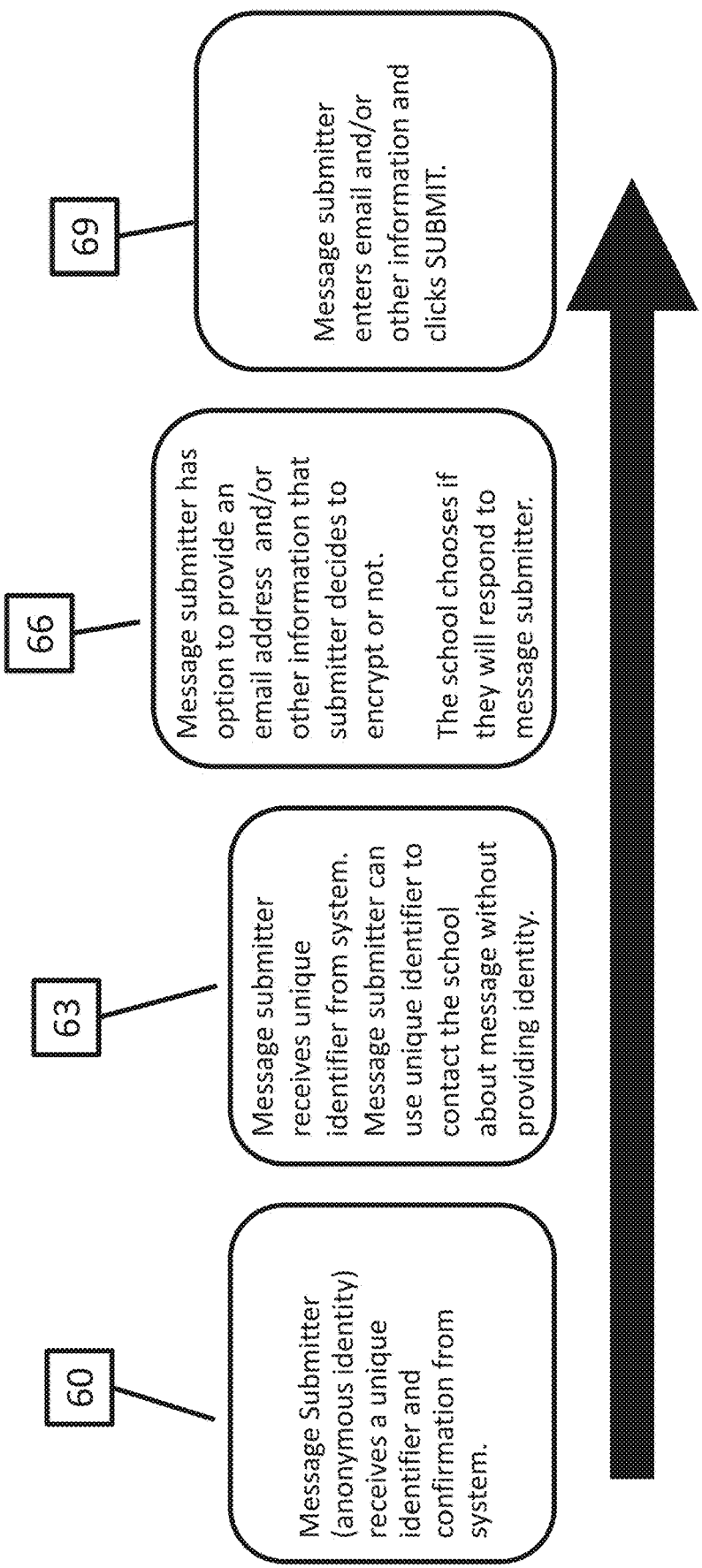
FIG. 3 Message Submitter Screen 2

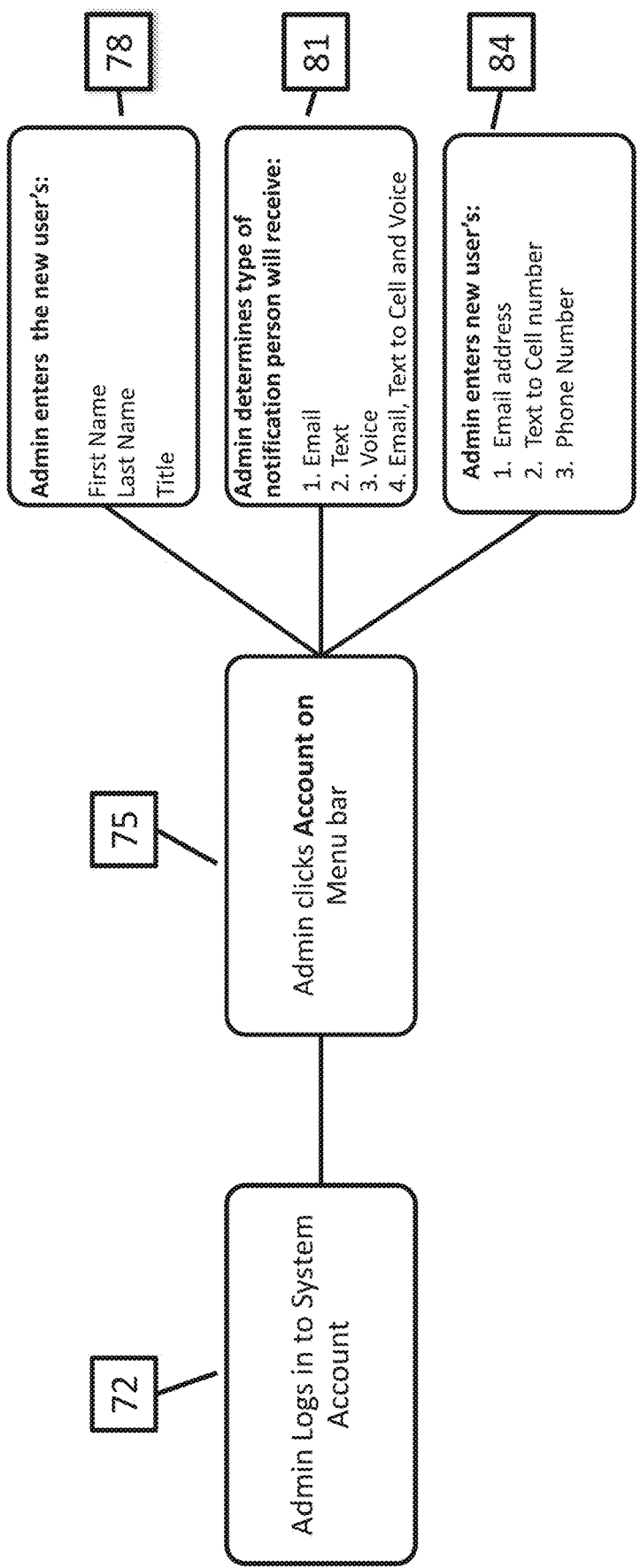
FIG. 4 Administrator User
Account Setup Process of a Message Recipient

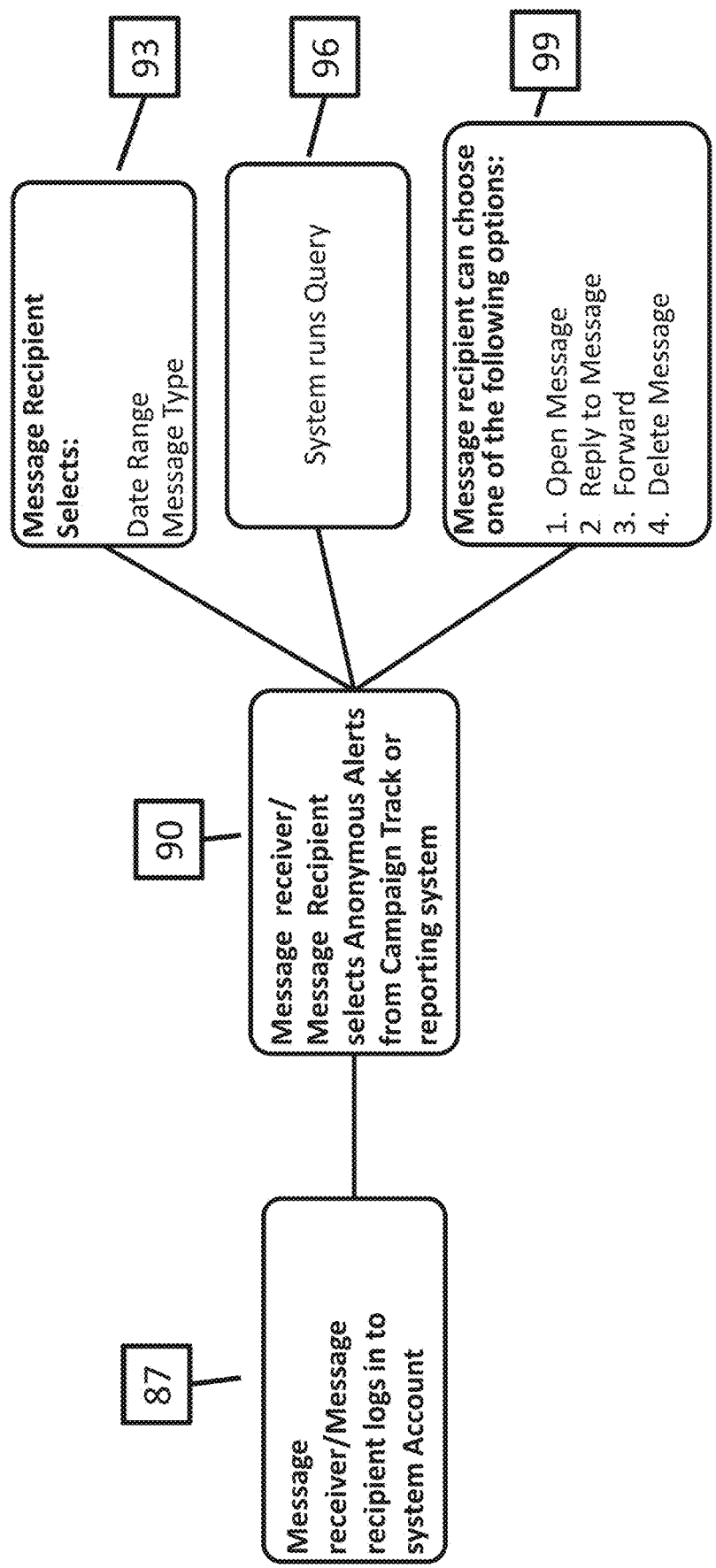
Fig. 5 Message Receiver/Message Recipient
Accessing Messages from Admin Interface

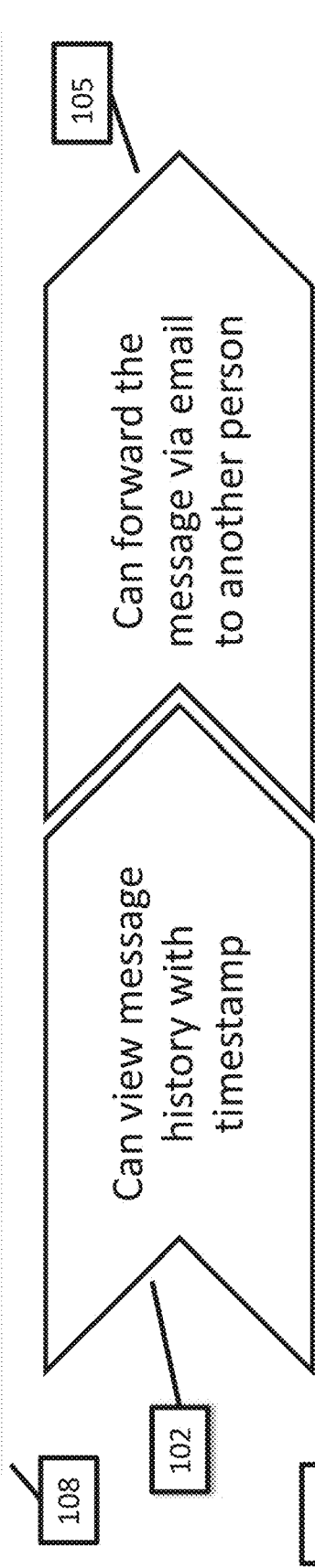
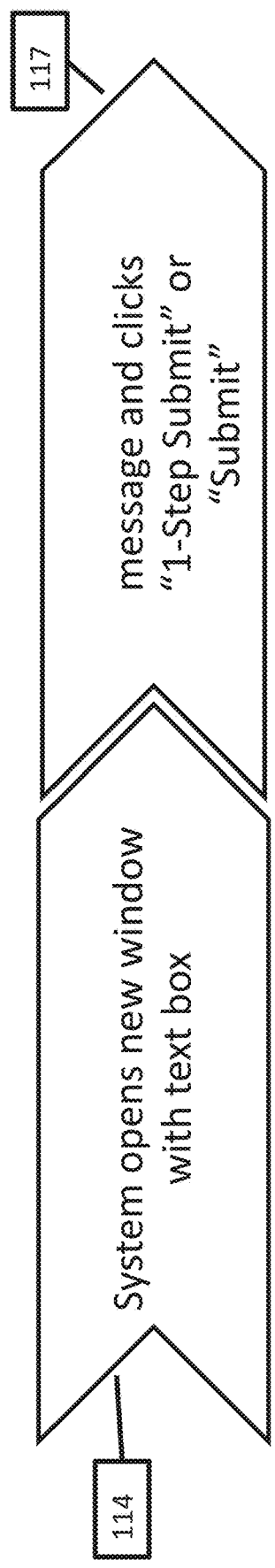

FIG. 7 Administrator User Setup Screen

User: (1893) Account Admin ▼

USER SETTINGS

* Account ID: 380054

* PIN Number: 1893

First Name: Account

Last Name: Admin

Title: Superintendent

* Caller ID: 949 - 724 - 3584

Email Address (optional): gbender@k12alerts.com

* Call Type:
  ○ Primary Phone Numbers Only
  ● All Phone Numbers

Anonymous Alerts Settings

Text-to-Cell (optional): ___ - ___ - ___   Carrier: Select Option ▼

Anonymous Alerts Access: Email Only ▼

Save

FIG. 8 Anonymous Alert Report
(Search Options)

Anonymous Alerts Report

Search for Anonymous Messages Submitted

Beginning Search Date: [ ] / [ ] / [ ] (mm/dd/yyyy) Select Date

Ending Search Date: [ ] / [ ] / [ ] (mm/dd/yyyy) Select Date

Anonymous Alert Type: [Bullying ▼]
- Select Option
- Bomb Threat
- Bullying
- Cheating on schoolwork
- Cutting/Self-Injury
- Depression
- Drugs
- Family Issues
- Fighting
- Gang Related Issue
- Other
- Peer Pressure
- Sexual Harrassment
- Stress Building: [Select Option ▼]  Location: [Select Option ▼]

Status: [ ▼]  Confirmation Code: [ ]  Credible: [Select Option ▼]

[Search]

1 2 3 ... Next >>  Page 1 of 14

| Date Submitted | Code | Alert | Priority | Message | Reply-to | Credible | Status | |
|---|---|---|---|---|---|---|---|---|
| 2/22/2013 7:21 PM | 36299 | bullying | Normal | Click Here | Click Here | YES | Open | Delete |
| 2/25/2013 2:19 PM | 66840 | Bullying | Normal | Click Here | N/A | YES | Open | Delete |
| 2/25/2013 4:54 PM | 42232 | Bullying | Normal | Click Here | N/A | YES | Open | Delete |
| 2/25/2013 5:01 PM | 25026 | Bullying | Normal | Click Here | N/A | YES | Open | Delete |
| 2/25/2013 5:33 PM | 35543 | Bullying | Normal | Click Here | N/A | YES | Open | Delete |

FIG. 9 Anonymous Alert Report
(System Query Results)

Anonymous Alerts Report

Search for Anonymous Messages Submitted

Beginning Search Date: [ ] / [ ] / [ ] (mm/dd/yyyy) Select Date

Ending Search Date: [ ] / [ ] / [ ] (mm/dd/yyyy) Select Date    Confirmation Code: [ ]

Anonymous Alert Type: Bullying

Building: Select Option    Location: Select Option

Status: Select Option    Credible: Select Option

Pie Chart    View All    Search

<< 1 2 3 4 5 6 7 8 9 10 Next > Last >>    Page 1 of 14

| Date Submitted | Code | Anonymous Alert Type | Priority | Message | Reply-to | Credible | Status | |
|---|---|---|---|---|---|---|---|---|
| 2/22/2013 7:21 PM | 36299 | Bullying | Normal | Click Here | Click Here | YES | Open | Delete |
| 2/25/2013 2:19 PM | 66949 | Bullying | Normal | Click Here | N/A | YES | Open | Delete |
| 2/25/2013 4:54 PM | 42220 | Bullying | Normal | Click Here | N/A | YES | Open | Delete |
| 2/25/2013 5:01 PM | 25026 | Bullying | Normal | Click Here | N/A | YES | Open | Delete |
| 2/25/2013 5:33 PM | 38543 | Bullying | Normal | Click Here | N/A | YES | Open | Delete |

FIG. 10 Anonymous Alert Report
(View Message Screen)

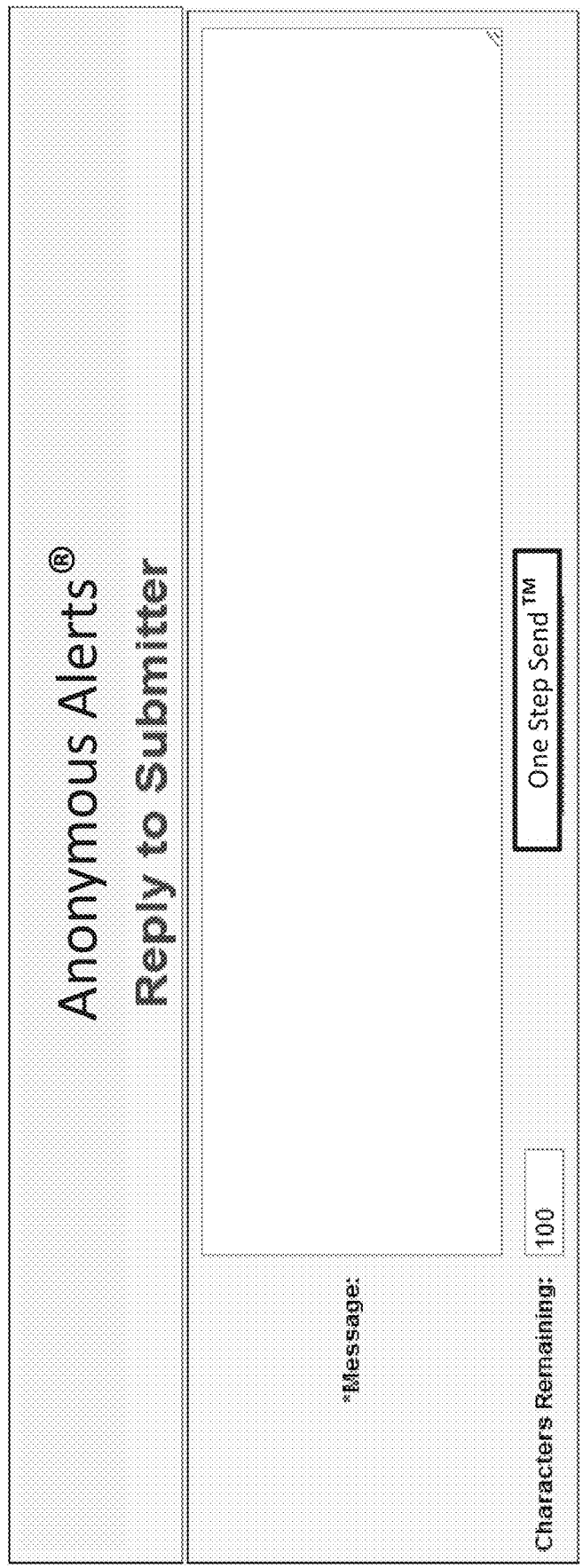
FIG. 11: Anonymous Alert Report
(Administrator Reply Screen)

FIG. 12 Message Submitter User Interface

FIG. 13: Message Submitter User Interface
(Report Incident Type drop-down list option)

FIG. 14: Message Submitter User Interface
(Person of Contact drop-down list option)

FIG. 15 Message Submitter User Interface
(Confirmation that message was received)

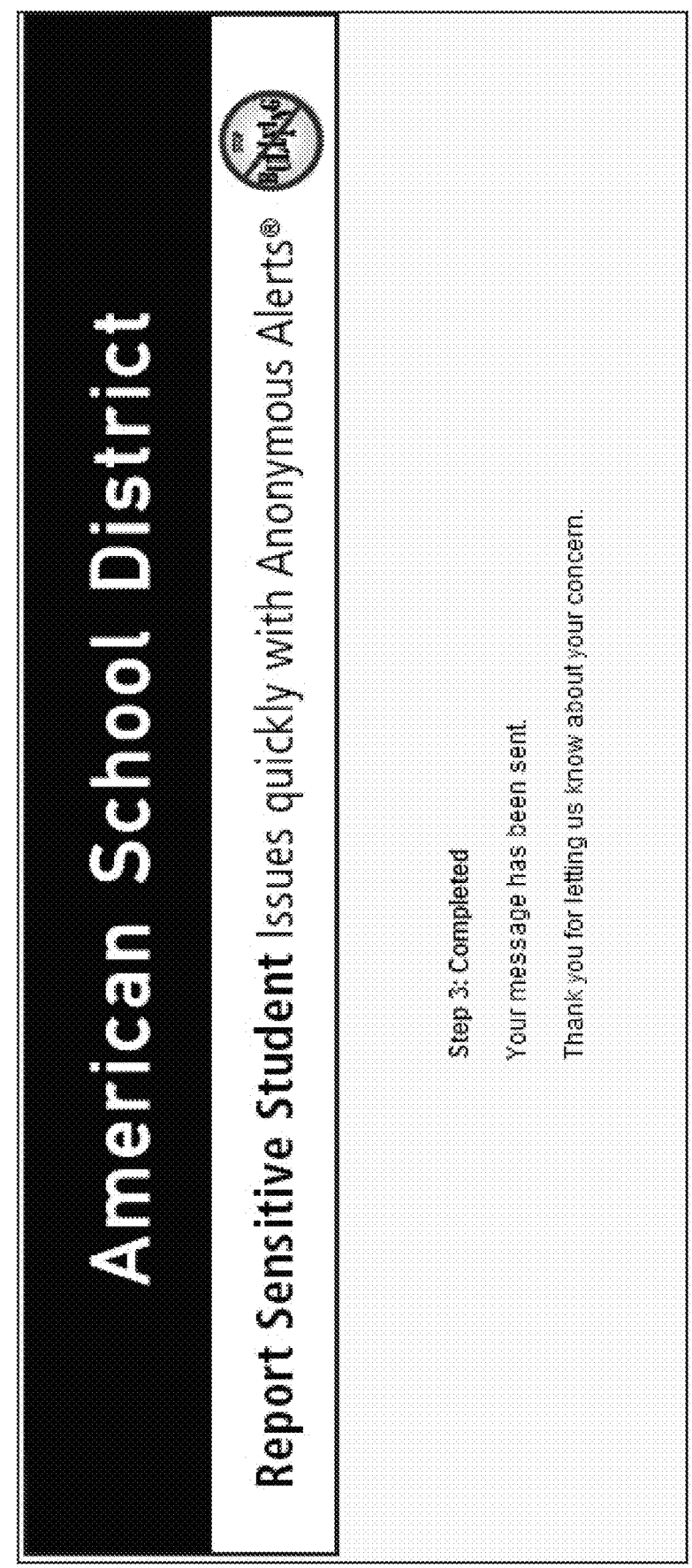
FIG. 16 Step 3

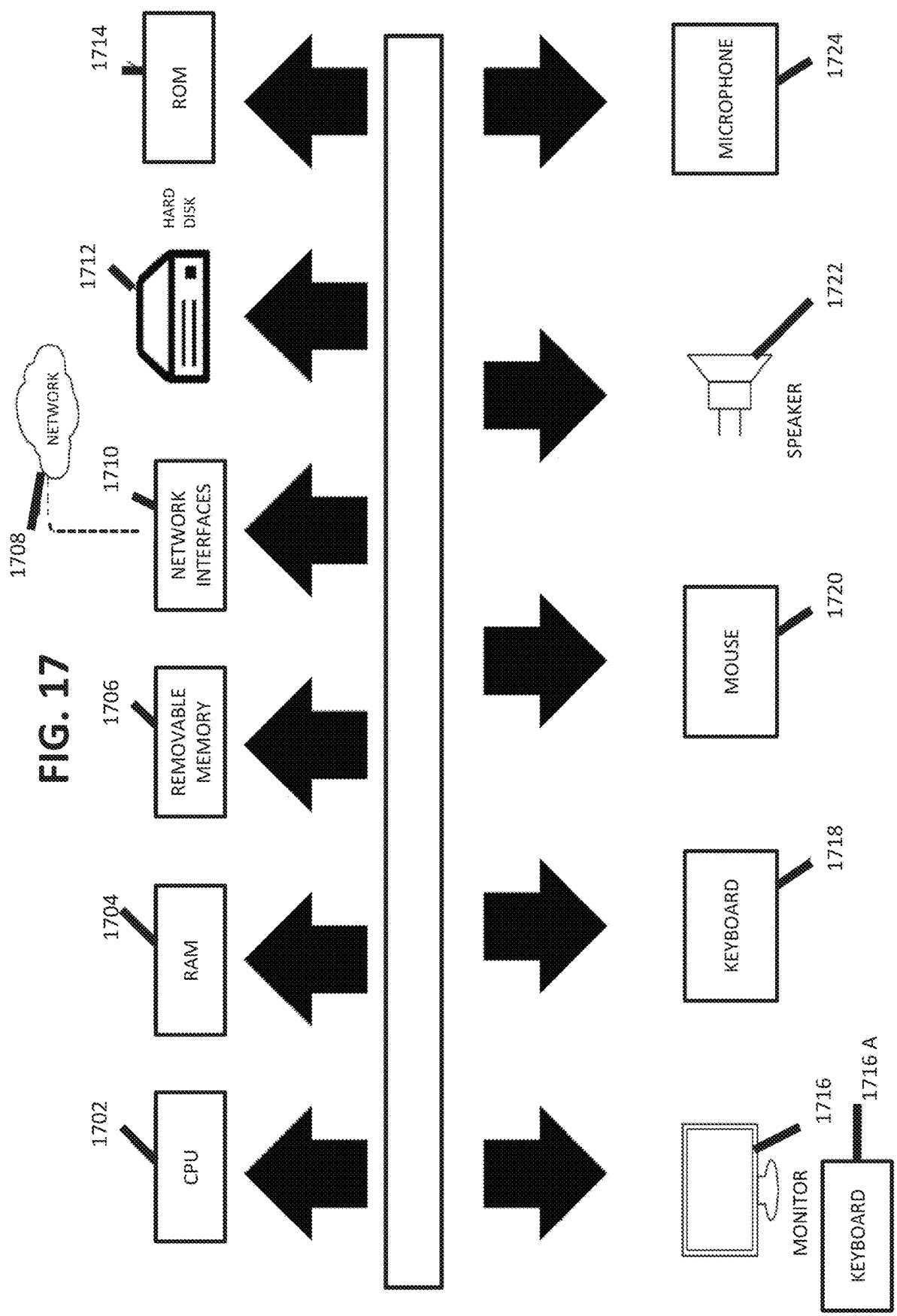

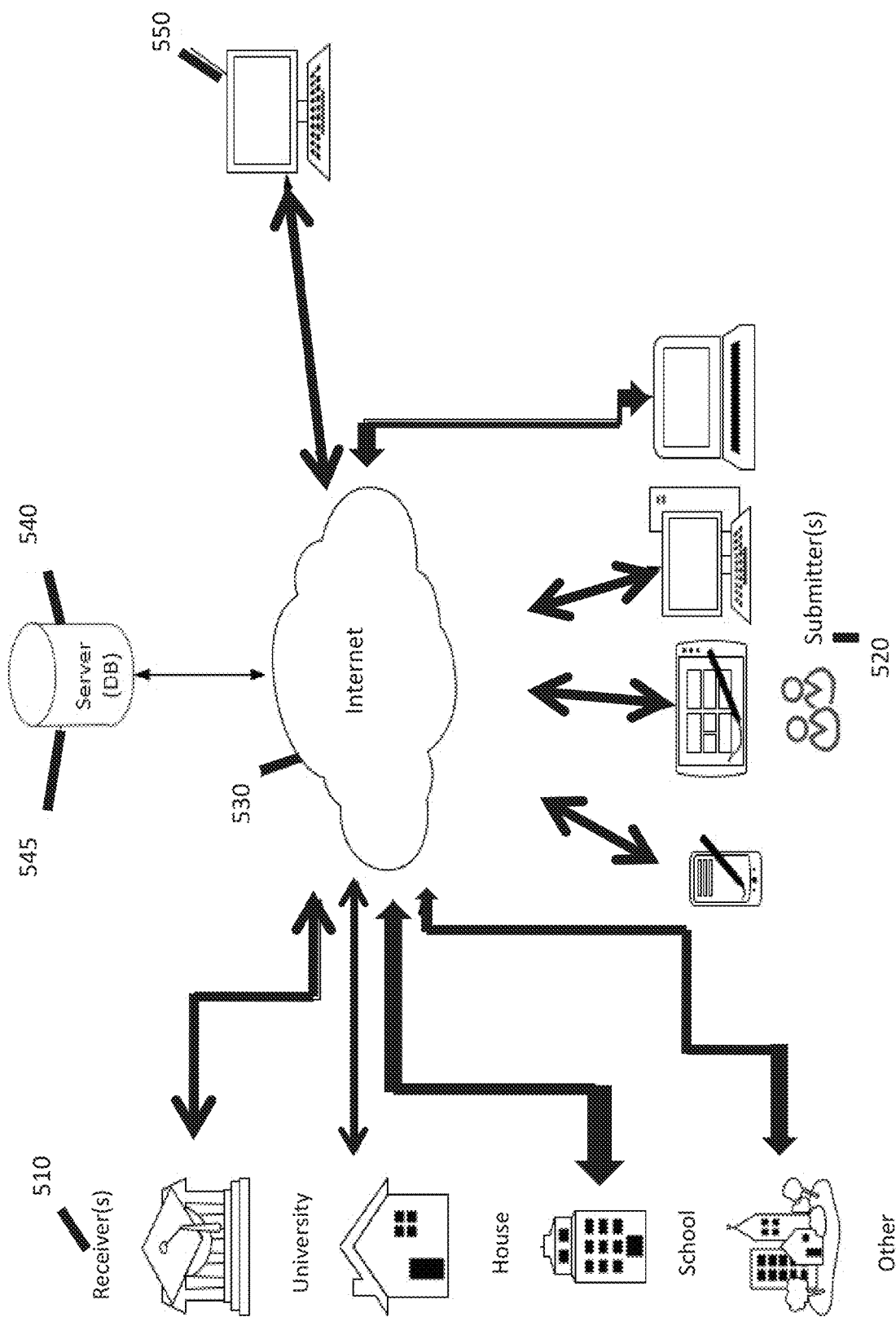

FIG. 20 Mobile to Mobile Message Sending and Receiving with Unique Content Identifier and Receiver Unique Identifier

METHOD AND APPLICATION FOR COMMUNICATING SENSITIVE INFORMATION

CROSS-REFERENCE TO RELATED APPLICATIONS

This application is a continuation-in-part of and claims priority to and benefit of U.S. Non-Provisional application Ser. No. 14/754,655 and all applications for which application Ser. No. 14/754,655 claims priority to and benefit of, and also claims priority to U.S. Provisional Application No. 62/356,401. Application Ser. No. 14/754,655 is a continuation-in-part of and claims priority to and benefit of U.S. Non-Provisional application Ser. No. 13/902,801, filed May 25, 2013, which claims priority to and benefit of U.S. Provisional Application No. 61/652,099, filed May 25, 2012, and Provisional Application for U.S. Patent No. 61/662,305, filed Jun. 20, 2012. All of the above mentioned applications are incorporated herein by reference for all purposes.

FIELD OF INVENTION

The present invention is a method and application for communicating sensitive information, incident reporting, and for acceleration of urgent situation responses and supervision.

BACKGROUND AND SUMMATION OF THE INVENTION

The present invention relates to a method for sending, receiving, reporting, and/or responding to mood related, time-sensitive, live situation, and/or secretive matter messages, through one-step submission, and/or "Smart Button®" activation anonymous or non-anonymous submit process to authorized receiver(s) via at least one of a communication networks, social media platforms, and/or targeted authorized receipt process, and generating, assigning, and utilizing unique identifiers and corresponding actionable and searchable administrative report generating process. More specifically, the invention relates to a method for permitting submitter(s) to choose the degree of anonymity and/or submit information/content and/or location and send that information/content and/or location, by means of a user interface, computer, text link, and/or Smart Button, or a computer, mobile device, mobile phone, smart pad, electronic device, smart watch, smart glasses, car play and alike, input device, communication device, touchscreen computing device, portable media player, smart device, or tablet to provide an activated application and open a log-in screen to authorized receiver(s) who may access such information/content, which can be encrypted, in whole or in part, and act, report, forward or respond accordingly. In at least one current embodiment, anonymous at least one way or two way communication is further achieved by additional transmissions sent being stored associated to a unique identifier, as well as, encrypted, in an intervening buffer such as a data storage device acting as a data security wall. The said at least one transmission once parked is separately transmitted from the said data security wall to the at least one receiver coupled with associated receiver unique identifier(s). Thus, the presence of the intervening data security wall causes the transmission and targeted reception to be two separate buffered acts so the transmission is never direct increasing the anonymous features.

Prompt distribution of live incidents, events, mood related, time-sensitive, and secretive, information is crucial to protection and authorized intervention concerning individual and community safety, and mitigating damage to persons, property and/or infrastructure. The advent of new methods of communication, such as e-mail, cell phones, instant messaging, Smart phones, tablets, computers, text messaging, and other Internet, world wide web, virtual network, and social media compatible devices has increased the ability to effectively communicate such mood related, time-sensitive, and secretive information to authorized individuals. As a result, it is advantageous for a specialized and focused information dissemination system to be adapted to utilize the Internet, virtual network, and/or social media for prompt and effective systems of notification and/or dissemination of sensitive information. Increased utilization of complex smart devices, tablets, mobile devices, associated mobile applications, and mobile icons, as well as, computers, e-mail, texting, instant messaging, and other communication devices and transmission methods can be exploited for their instant notification abilities, and their abilities to relay information back to authorized personnel in time sensitive situations.

A mobile application or mobile app as it is sometimes referred to, is a currently executing computer software application/program that can physically move information from one computer (mobile device) to another host server while it is being executed by the user/submitter. Mobile applications demonstrate many benefits and efficiencies and also immediacy of message/information distribution to an authorized host computer system, host system administration device, system administration device.

One of the goals of this system is instant distribution of mood related, live incident, time-sensitive, and secretive, information to authorized persons identified by the system. One of the primary goals of this method is to enable persons to come forward with time sensitive and/or secretive information and submit it to authorized persons who can immediately respond to the information submitted.

SUMMARY OF THE INVENTION

In at least one embodiment, the present invention is a computer implemented method for at least one submitter to wirelessly communicate information by either at least one one-way or at least one two-way communication executing on at least one computer and/or smart device comprising of the following steps of: sending from at least one submitter at least one anonymous communication or at least one non-anonymous communication or sending from at least one submitter at least one anonymous communication or at least one non-anonymous communication at the at least one submitter's sole discretion; sending said communication from at least one submitter computer and/or smart device running at least one custom software application, or selecting said at least one receiver or receiving group and sending said communication, in real time, from at least one computer and/or smart device, running the said at least one custom software application; said computer and/or smart device being wirelessly connected to at least one of the following: text, e-mail, phone, audio, visual, facsimile, instant message, social network transmission, Bluetooth, Infrared, NFC, radio frequency, communication, and/or data transmission, and through the Internet, a virtual network, a communication network, social network, world wide web, WAN, and/or LAN, Ethernet, streaming, optical transmission, fiberoptic transmission, wireless communication, GPS, cable, global satellite, Internet satellite; generating from database data security wall or other, server, database, computer, or smart device at least one Unique Identifier and/or Unique Code Identifier to be associated with said at least one communication containing information and generating at least one Submitter Identifier to be used to identify the said submitter computer and/or smart device running said custom software application;

sending to at least one receiver the said at least one communication containing information comprising the following steps of: sending via said wireless network the said at least one communication containing information by executing on the said user computer and/or smart device, running said custom software application, receiving the said at least one communication containing information in at least one dedicated computer, server, and/or smart device, then sending said at least one communication containing information to at least one database data security wall; generating at least one Unique Identifier to be associated with said one communication containing information; sending the said at least one communication containing information and said at least one Unique Identifier and/or Unique Code Identifier from the said at least one database data security wall, matching the targeted said at least one receiver to the specific said at least one communication containing information targeted by the said at least one submitter associated to the at least one Unique Identifier and/or Unique Code Identifier stored in the database and matching the Receiver Unique Identifier or Code to said at least one receiver; providing from the said at least one database data security wall or other, server, database, computer, or smart device a Receiver Unique Identifier or Code to at least one of the following: at least one of authorized host computer system, host system administration device, system administration device, and/or to the said targeted receiver; providing a Receiver Unique Identifier to at least one of the following: at least one of authorized host computer system, host system administration device, system administration device, and/or to the said targeted receiver; receiving authorization for the said targeted at least one receiver to access the said communication containing information along with access to the associated said at least one Unique Identifier and Receiver Unique Identifier or Code, in real time; receiving said authorization for at least one of the following: open communication(s); read the communication(s); act on the communication(s); forward the communication(s); respond to the communication(s); reply to the communication(s); making a report(s); locating source(s) of communication(s); initiating and/or utilizing map source(s); initiating and/or utilizing plan(s); and/or delete the communication(s);

The invention may further comprise, whereby level of said anonymous communication can be sent by submitter within a range of permitted, available, or offered choices, range, degree, or type.

The invention may further comprise, whereby level of said anonymous communication can be sent within a range of permitted, available, or offered choices, range, degree, or type.

The invention may further comprise, whereby the information is coupled with or contains metadata, including but not limited to, at least one Unique Identifier and/or Unique Code Identifier used for anonymous or non-anonymous identification.

The invention may further comprise, whereby the information is coupled with or contains metadata.

The invention may further comprise, wherein the information contains in whole or in part, at least one of the following: voice message, handwriting notes or duplication, video(s), photograph(s), image(s), text(s), evidence.

The invention may additionally include the following initiating method: downloading the said specific customized software application, receiving authorization and/or metadata; performing sign in process, initiating and running of the said at least one specific customized software application on said user computer and/or smart device, operated by the said at least one user; or initiating and running, or signing in, initiating and running on the said at least one specific customized software application on said user computer and/or smart device, operated by said at least one user.

The invention may additionally include the following initiating method: inputting data for sign-in process; using the sign-in metadata to authorize the user's account and matching it with previously retrieved identifying information and creating and/or assigning at least one Unique Identifier and/or Unique Code Identifier, which identifies the user.

The method may further comprise at least one of the following: encrypting the information being submitted, in whole or in part, to be sent to the said at least one receiver; encrypting the information being stored in the said at least one database data security wall, in whole or in part; decrypting the said information upon it's exit from the said at least one database data security wall, in whole or in part; targeting the said at least one receiver, for the said communication; whereby the communication and/or transmission of data is through at least one of: text, e-mail, phone, audio, visual, facsimile, instant message, social network transmission, Bluetooth, Infrared, NFC, radio frequency, communication, and/or data transmission, and through the Internet, a virtual network, a communication network, social network, world wide web, WAN, and/or LAN, Ethernet, streaming, optical transmission, fiberoptic transmission, wireless communication, GPS, cable, global satellite, Internet satellite; whereby the at least one Unique Identifier and/or Unique Code Identifier being generated is associated with the submitted said communication containing information, in whole or in part; whereby the at least one Unique Identifier and/or Unique Code Identifier and at least one confirmation message from at least said one receiver is being sent to the said at least one submitter; choosing by the said at least one submitter to be identified as being anonymous or non-anonymous, thus if desiring non-anonymous submission said at least one receiver submitting or allowing access to related information, comprising their name, e-mail address, phone number, phone text number, network identity code, device identification code or location for non-anonymous communications to the said at least one receiver(s), wherein the submitter related information is stored in at least one data base to be associated with at least one Unique Identifier and/or Unique Code Identifier; and/or matching of the targeted receiver to a specific communication and information targeted by the said at least one submitter is associated with at least one Unique Identifier and/or Unique Code Identifier stored in the database; providing the said at least one Unique Identifier and/or Unique Code Identifier to at least one of authorized host computer system, host system administration device, system administration device, and/or to the said at least one targeted receiver.

The invention may additionally comprise at least one designated contact and/or at least one added contact, and/or said at least one designated contact and/or added contact is notified upon incident report submission or transmission.

The invention may further include a switch, button, Smart Button, or a shortened process switch or button.

The invention may further comprise other information and content made available to authorized users, including but not limited to, architectural and structural plans, blueprints, policies, compliance, laws and statutes, other locating and compliance materials made available to authorized users.

The method may further comprise, whereby: the submitting of the said encrypted information, in whole or in part, and any other information is sent to the said at least one receiver of a plurality of receivers, wherein the said at least one receiver of the plurality of receivers is a targeted receiver for the communication; the sending of the at least one Unique Identifier and/or Unique Code Identifier, and any non-encrypted information or messages is to the said at least one receiver of the plurality of receivers.

The invention may further comprise, whereby said communication which contains information and/or messages transmitted and sent by at least one submitter and received by at least one receiver is at least one of the following; all or less than all information and/or messages are encrypted; initial encryption occurs in centralized database data security wall; encryption occurs utilizing at least two levels of encryption or at least three levels of encryption; said encryption at least one communication containing information and/or message(s) are transmitted utilizing at least one database data security wall; said submitter and said receiver are anonymously communicating and separated and thus not connected directly via the usage of at least one database data security wall positioned between the wireless transmission and reception; system and security adaptation for cloud; system and security adaptation firewalls;

The method may further comprise, whereby any information can be submitted or received on at least one computer and/or smart device and/or communication sent comprises at least one of the following an image, photo, text, video, film, sound file, sound bites, audio, content file, downloadable content, downloadable file utilizing a Unique Identifier and/or Unique Code Identifier with said message and/or information.

The method may further comprise the steps of: prior to sending at least one anonymous communication or at least one non-anonymous communication from the at least one submitter, downloading and/or activating an icon on at least one of a computer, mobile device, mobile phone, smart pad, electronic device, smart watch, smart glasses, car play and alike, input device, communication device, touchscreen computing device, portable media player, smart device, or tablet to provide an activated application and open a log-in screen; inputting at least one Unique Identifier and/or Unique Code Identifier on the log-in screen wherein the Unique Identifier and/or Unique Code Identifier identifies which community the anonymous submitter(s) wants to communicate with or is located in or near; and submitting the Unique Identifier and/or Unique Code Identifier to authorized person(s) and/or administrator(s) to disseminate the Unique Identifier and/or Unique Code Identifier with-in the community and surrounding areas so the Unique Identifier and/or Unique Code Identifier can be utilized by submitter person(s) and/or groups(s) in or near the community for sending anonymous communications to a specified authorized receiver(s) or receiver group(s).

The method may further comprise of, wherein the at least one of a user-interface and/or a input device is comprised of a computer, mobile device, Mobile phone, smart pad, electronic device, smart watch, smart glasses, car play and alike, input device, communication device, touchscreen computing device, portable media player, smart device, smart phone, tablet, voice prompt, phone, fax, facsimile, a part therein and/or associated software, further comprising the steps of: locating the submitter(s) using a geographic locater, device unique identifier, and/or global positioning system (GPS); and providing the submitter's location to at least one of authorized host computer system, host system administration device, and/or system administration device for submission to receiver(s).

The method may further comprise of, wherein the geographic locater is sending and/or transmitting to/from the submitter's, receiver's, and/or the administrator's mobile device.

The method may further comprise the steps of: downloading, accessing, utilizing and/or activating an application to send, mood related, time sensitive, or secretive information, sending an anonymous communication, said anonymous communication containing information; encrypting the information, in whole or in part; routing the encrypted information and any other information to be sent to at least one receiver; generating at least one Unique Identifier and/or Unique Code Identifier; and sending the at least one Unique Identifier and/or Unique Code Identifier and at least one confirmation message to the at least one submitter, and sending the at least one Unique Identifier and/or Unique Code Identifier, and any non-encrypted information to the at least one receiver.

The method may further comprise the steps of: the system receiving at least one selection command, voice activated or other content input or transmission from the submitter; the submitter typing in a message, information and/or selecting a photo, camera function, image, text, film, audio, file, content, sound or video to upload to the system; and the submitter, after sending a submission/communication, receiving a communication comprising a Unique Identifier and/or Unique Code Identifier and a message confirmation.

The method may further comprise, whereby the anonymous communication(s) and/or non-anonymous communications are carried forth via at least one of the following: 2-way text-to-cell communication, 2-way voice communication, 2-way Social Media communications, 2-way texting, 2-way phone, 2-way SMS or MMS, 2-way communication, 2-way chat, about information, and the 2-way communication push notifications is between the sender/submitter(s) and the receiver(s).

In at least one embodiment, the invention can be comprised of a computer implemented method comprising the submitting of an anonymous location from at least one submitter, from at least one computer and/or smart device, wirelessly connected to at least one of: text, e-mail, phone, audio, visual, facsimile, instant message, social network transmission, Bluetooth, Infrared, NFC, radio frequency, communication, and/or data transmission, and through the Internet, a virtual network, a communication network, social network, world wide web, WAN, and/or LAN, Ethernet, streaming, optical transmission, fiberoptic transmission, wireless communication, GPS, cable, global satellite, Internet satellite, wherein said anonymous locator communication contains geographic location information sent to at least one receiver utilizing said third-party data security wall.

In at least one embodiment, the invention can be comprised of a method for at least one submitter to communicate information comprising: sending an anonymous communication from the said at least one submitter, from at least one computer and/or smart device, wirelessly connected to at least one of: text, e-mail, phone, audio, visual, facsimile, instant message, social network transmission, Bluetooth, Infrared, NFC, radio frequency, communication, and/or data transmission, and through the Internet, a virtual network, a communication network, social network, world wide web, WAN, and/or LAN, Ethernet, streaming, optical transmission, fiberoptic transmission, wireless communication, GPS, cable, global satellite, Internet satellite, wherein said anonymous communication contains information, wherein the anonymous communication sent from the at least one submitter is in whole or in part inputted utilizing at least one customized standardized template with at least one drop-down list for selecting the at least one recipient; receiving, by the said input device, the selection by the submitter from the drop-down list within the standardized template; sending the at least one Unique Identifier and/or Unique Code Identifier, and any non-encrypted information or message to the at least one receiver of the plurality of receivers.

The method may additionally comprise of, wherein a customized standardized template drop-down list comprises at least one of the following: recipient, priority level, type of incident, building, location, GPS location or other.

The method may additionally comprise of, wherein the said customized standardized template includes a choice for setting the level of priority that can be assigned to the communication, the level is one of "Urgent", "High", "Medium", "Normal", "Low", or other.

The method may additionally comprise of, wherein the said standardized template includes a drop-down list for selecting a type of communication, said types of communication comprising of, including, but not limited to, at least one of these: stress, family, issues, harassment, stealing, drugs, bullying, weapons on campus, credible threats, bomb threats, cheating on schoolwork, cutting/self-injury, cyber bullying, fighting, gang related issues and/or associations, peer pressure, sexual harassment, and/or depression, trafficking, accident, standards, rules, regulations, statutes, guidelines, or other customized type of communication.

Some of the incident types covered by the Smart Button are as follows: abducted, abuse/assault, being followed, boiler breakdown, dangerous student, earthquake, gas leak, dangerous parent, harassment/stalking, hazard, hazardous spill, heard shots, lockdown situation, medical situation, medical condition, repair needed, saw active shooter, severe injury, severe weather, vandalism, missing student, dangerous situation with parent, dangerous situation with student, or other customized type of communication.

The method may additionally comprise of, wherein the said standardized template includes a drop-down list for selecting types of location, said types of location comprising bus, cafeteria/lunchroom, classroom, hallway, deck, parking lot, warehouse, shed, storage facility, dock, base, headquarters, auditorium, courtyard, quad area, gymnasium, locker room, street, sidewalk, playground, bathroom, in town, sports field, theater, Facebook, instant messaging, FaceTime, social media, imessage, e-mail, instant message, Twitter, telephone, Skype, IP (internet protocol) address, VoW (Voice over Internet Protocol), a multimedia message (MMS), YouTube or other customized type of location.

The method may additionally comprise, wherein the communication language can be selected by the submitter from a choice of, or drop down window displaying, a selection of a variety of languages to pick from to read and/or communicate in and the at least one receiver through the method has the ability to select auto translation of the information.

The method may additionally comprise of, the at least one receiver sending at least one response message back to the at least one submitter in response to the Unique Identifier and/or Unique Code Identifier and related content received by receiver(s) from the submitter(s).

The method may additionally comprise of, wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smart phone.

The system and method may additionally comprise of, wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smart phone.

In at least one embodiment, the invention can be comprised of a non-transitory storage device storing a plurality of instructions for at least one message submitter to send in a live situation, one-click, one-step, mood related, time sensitive, medical, threatening, or secretive information, wherein said non-transitory storage device comprises a plurality of instructions for: sending an anonymous communication from the said at least one submitter, from at least one user-interface of at least one input device, connected to at least one of an Internet, a virtual network, a social network, a world wide web, WAN, and/or LAN, wherein said anonymous communication contains information; encrypting the information, in whole or in part; submitting the encrypted information and any other information to be sent to at least one receiver of a plurality of receivers; generating at least one Unique Identifier and/or Unique Code Identifier, and sending the at least one Unique Identifier and/or Unique Code Identifier and at least one confirmation message to the at least one submitter; sending the at least one Unique Identifier and/or Unique Code Identifier and any non-encrypted information to the at least one receiver of a plurality of receivers, wherein the instructions further comprise a step, when the submitter chooses to only be identified as being anonymous, the submitter completing the anonymous e-mail address and/or text number entry field in the confirmation message; sending the confirmation message to at least one receiver of the plurality of receivers, wherein the submitter communication is identified as being anonymous; sending, by the at least one receiver of the plurality of receivers, at least one response message anonymously back to the submitter in response to or associated with the at least one Unique Identifier and/or Unique Code Identifier, wherein the at least one receiver of the plurality of receivers is a targeted receiver for the communication; storing the non-encrypted information in at least one database; matching the targeted receiver to a specific communication and information targeted by the submitter associated to at least one Unique Identifier and/or Unique Code Identifier stored in the database; providing a Receiver Unique Identifier or Code to at least one of authorized host computer system, host system administration device, system administration device, and/or to each said at least one receiver; granting the targeted receiver access to the secure communication and information targeted by the submitter for the targeted receiver once the inputted Receiver Unique Identifier or Code is verified; wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier or Code.

The non-transitory storage device may additionally comprise of, wherein the instructions further comprise a step, when the submitter chooses to be identified as being non-anonymous, wherein the submitter may reveal information such as their name, e-mail address, phone number, phone text number, photo, video, audio, mobile or other device identifier, or network identity code or location for non-anonymous communications to the at least one receiver(s) and the information is stored in at least one data base, and the submitter communication is identified as being non-anonymous.

The non-transitory storage device may additionally comprise of, wherein the instructions further comprise a step, wherein at least one of the at least one receiver(s) is a targeted receiver(s) of the communication, and further comprising the steps of: matching at least one targeted receiver to specific communications and information stored in at least one database or other storage device and associated with at least one Unique Identifier and/or Unique Code Identifier; providing a Receiver Unique Identifier or Code to at least one of authorized host computer system, host system administration device, system administration device, and/or to each said at least one receiver; giving a receiver access to secure communications and information targeted by submitter to them once they input their Receiver Unique Identifier or Code; and permitting the receiver to open communication(s), read the communication(s), act on the communication(s), forward the communication(s), respond to the communication(s), reply to the communication(s), and/or delete the communication(s).

The non-transitory storage device may additionally comprise of, further comprising at least one of the following steps: wherein the instructions further comprise a step of using at least one customized standardized template(s), wherein the communication being sent from the at least one submitter is input utilizing at least one of the system and method's customized standardized template(s); further comprising instructions for having a data base, and icon capable of communicating said submitter message to said data server using Unique Identifier and/or Unique Code Identifier.

In at least one embodiment, the present invention is a computer implemented method for reporting at least one live incident in real-time comprising at least one or more of the following steps: accessing a touch sensitive "Smart Button" area on the display of a computer and/or smart device, mobile device and/or smart device, wherein Smart Button activation is initiated with at least one user interface, mouse click, physically pressing a predefined screen area and/or gesture recognition; submitter optionally enters or edits data, adds identity information and/or inputs incident information or report; the submitter decides the degree of anonymity to select when accessing/activating use of a Smart Button from at least one user-interface of at least one input device, connected to at least one of an Internet, a virtual network, a social network, a world wide web, WAN, and/or LAN, said anonymous communication contains information; said activation/accessing of Smart Button causes device to be located and/or automatically enabled to be located employing at least one of GPS, IP location, proximity to at least one cell tower, proximity to at least one Wi-Fi and/or other signal, RFID tagging, Near Field Communications, infrared, radio frequency, establishing prior known location and/or association with at least one known location; said activation further initiating at least one of the following steps: generating at least one Unique Identifier and/or Unique Code Identifier associated with the submitted incident event and/or information; capturing, accessing, or generating at least one Unique Identifier and/or Unique Code Identifier for the message/information for the incident report being submitted; capturing, accessing, or generating at least one Unique Identifier and/or Unique Code Identifier for the device sending the incident report; creating, accessing, and/or utilizing at least one Receiver Unique Identifier or Code associated with at least one individual to be contacted; generation of at least one custom incident or event report and location to at least one receiver(s) with at least one Receiver Unique Identifier or Code; accessing, inputting and/or submitting at least one custom standardized template the user can enter and/or select from dropdown menu at least one of their incident or event details, name, e-mail address, phone number, school or organization, photo, audio, video, alias, or other identifying information associated with the user, or take no action or choose to skip; typing a custom message within a data entry field within a template; manually turning on GPS location services if not currently available with one click and/or interaction with a touchscreen; adding user's picture and save and transmit if user does not want to be anonymous; creating reports for at least one administrator and/or authorized receiver(s); notification from submitter to authorized receiver(s) sent via text, email, voice and/or push mobile notification; location of at least one submitter on at least one map.

The method may additionally comprise of at least one of the following steps: further comprising the creation, access, utilizing, of a group to be displayed within a drop down menu and/or list comprising at least one authorized person to be contacted; wherein said at least one standardized customized template includes a drop-down list for selecting at least one type of event or incident communication; further comprising a step wherein at least one administrator or receiver can view or access a report a map, graph, table will be displayed with the GPS location of at least one submitter; further comprising the emitting of a custom sound, light, vibration to be received and acted upon by receiver; further comprising a step whereby the location of at least submitter is tracked using at least one map locator; wherein said at least one standardized customized template includes a drop-down list and/or other selectable switch, button, or interface for at least one submitter sending or displaying Incident Report, Glossary, Help, Notification, Smart Button or other information.

The method may additionally comprise, wherein said notification is the receipt through the device of push notifications and other information relating to among other things counseling, time sensitive or goodwill messages to submitter(s).

The system and method may additionally comprise, wherein said application(s) are native applications specific to the device being used.

In at least one embodiment, the present invention is an administrative application (app) is executing software for transmitting, communicating, and/or sending messages, data, and/or incident reporting/information utilizing various incident management, administrative, and/or at least one 1-way or at least one 2-way anonymous communications app screens, with input areas, and receiving areas for receiving data and information comprising at least one of the following: buttons for logging the user into and out of the app; viewing incident details submitted by the submitters; viewing incident messages and replies submitted; viewing Pie Charts related to incidents, location and combination thereof; accessing and/or sending Push Notification to users; accessing user settings; accessing Help/Instruction about the app; buttons for displaying Pie Charts related to incidents or location; filtering reports based on status (e.g., All, Open or Close); a clickable screen for briefly describing the incident; buttons for closing the presented screen; refreshing the screen; a screen area for displaying the pie chart; screen areas for displaying the recipient name; the title of the recipient; the name of the building/area where the incident occurred; the date and time stamping of the incident; the type of the incident; the incident priority; the incident message; screen areas for displaying the confirmation code; the status of the incident; buttons for replying to the person who submitted the incident message; forwarding the incident report via email; adding more information (e.g., notes or Student ID numbers) of person involved with the submitted incident; closing the case of the submitted incident report; sending the reply of the message submitted; screen area for displaying the incident messages and replies; button for replying to the incident message; buttons for adding email addresses; forwarding the report to other email addresses; text fields for adding the name of a person involved with the submitted incident; adding notes and responses related to the submitted incident; shows buttons for describing credibility of the submitted incident; saving notes; areas for displaying the number of iOS devices registered for push notifications; number of Android devices registered for push notifications; the total number of registered devices registered for push notifications; shows buttons for accessing the features of sending push notifications; accessing the report of sent push notifications; a button for sending push notifications; editable text fields for entering the subject of push notifications; the message of the push notifications; areas for displaying the first name of the user; the last name of the user; the title of the user; the email of the user; the phone number of the user; and the user's phone carrier; buttons to display the user access; display the building access; update the user's settings; and sign out; buttons for accessing instructions about View Incident Report feature; instructions about Incident Messages; instructions about Push Notifications; and instructions about Settings; non editable text of instructions about Viewing Incident Report; non editable text of instructions about Settings;

In at least one embodiment, the present invention is a custom mobile device software application running on a user computer and/or smart device, executing said custom mobile device software application producing at least one application data entry or selection area on the device having at least one of the following; a space located at the top of the screen that can have a name/logo; at least one of a custom name, organization name, company name, nickname, custom text, symbols, shapes, icons, buttons, touch sensitive areas and/or custom logo, among other things utilizing and/or accessing at least one Unique Identifier and/or Unique Code Identifier; a button for sending an incident report or information utilizing at least one Unique Identifier and/or Unique Code Identifier; a help button is for accessing, retrieving, and receiving custom help utilizing at least one Unique Identifier and/or Unique Code Identifier; a notifications or messages button for accessing a school good will, time sensitive, or other notification(s) utilizing and/or accessing at least one Unique Identifier and/or Unique Code Identifier; the Smart Button; a Smart Button utilizing and accessing at least one Unique Identifier and/or Unique Code Identifier; a Smart Button screen for the submitter to report their anonymous or non-anonymous location utilizing at least one Unique Identifier and/or Unique Code Identifier; a reveal your name area to type in a name and/or other information if the submitter does not want to remain anonymous utilizing and accessing at least one Unique Identifier and/or Unique Code Identifier; a My Identity button to click on if they do not want to be anonymous with at least one entry field for the submitter to type in their identifying information, name, or nickname utilizing and accessing at least one Unique Identifier and/or Unique Code Identifier; a picture icon, icon, clickable text, and/or other area for the submitter to add identifying visual, audio, textual, photographic, video, and/or film content utilizing and accessing at least one Unique Identifier and/or Unique Code Identifier; a pull-down menu and/or selection menu to name the school or organization that the submitter belongs to or is associated with utilizing and accessing at least one Unique Identifier and/or Unique Code Identifier; social media and/or conversations icon or area to add users personal social media information and/or conversations utilizing and accessing at least one Unique Identifier and/or Unique Code Identifier to send notifications if they want to be non-anonymous; a save/reveal button and/or text and/or area to save submitter's information for incident reports or other information utilizing and accessing at least one Unique Identifier and/or Unique Code Identifier.

The said "Smart Button" may additionally comprise of, wherein the said Smart Button is an activation switch located on or associated with the touch-screen or any digitally recognized portion of a computer and/or smart device, which initiates and activates transmission of information concerning at least one urgent or other situation, which initiates and activates acceleration from at least one receiver of at least one urgent or other situation response and/or situation supervision, wherein the said at least one submitter and/or submitter device can instantly report to at least one receiver and/or receiver device with at least of the following: the GPS map location, other critical information, the submitter's name, title, contact information, picture, and/or place of work to authorized receiver(s) and/or personnel which instantly reports credible threats, dangerous situations, or maintenance issues that warrant immediate attention in at least one current embodiment.

The "Smart Button" and associated mobile application may additionally comprise of, whereby submitters, other users, receivers, third parties, and third party responders can transmit and/or receive and/or send at least one 1-way or at least one 2-way communication.

The said submitter may additionally comprise of, at least one of: school administrators, teachers, professors, students, users, or corporate users.

The invention may additionally comprise of, whereby said at least one submitter communicates information executing on at least one computer and/or smart device comprising at least one of the following steps of: sending an anonymous or non-anonymous communication from at least one submitter, from at least one user-interface of at least one input device, connected to at least one of the Internet, a virtual network, a communication network, social network, world wide web, WAN, and/or LAN, wherein said communication contains information sent to at least one receiver; generating at least one Unique Identifier and/or Unique Code Identifier for said information; sending the at least one Unique Identifier and/or Unique Code Identifier; matching the at least one targeted receiver to a specific communication and information with a Receiver Unique Identifier or Code; granting the targeted receiver access to communication and information by utilizing the Unique Identifier and/or Unique Code Identifier for said information with the Receiver Unique Identifier or Code; wherein the targeted receiver is permitted to: open communication(s); read the communication(s); act on the communication(s); respond to the communication(s); reply to the communication(s); forward the communication(s); and/or delete the communication(s); based on the inputted Receiver Unique Identifier or Code; further comprising a step of the at least one receiver(s) responding to, forwarding, taking an action, and/or making a report based on the communication received from the at least one submitter.

The invention may additionally comprise of, whereby after the said user downloads the "Smart Button" mobile software application, they perform at least one of the following in no particular order: user logs into the app with at least one unique identifier or Single Sign On (SSO) supplied to them and user logs into the application by clicking on "Sign In" or other designated protocol; various user choices appear for selection, including but not limited to, work locations, incident types, and other types of options: work locations may include a building and/or Country and/or State and/or Region and/or zip code and/or other work defining information; users select the incident that best describes a situation by pressing on one of the incident types, terms, phrases, ideas, and/or text descriptions'; before pressing the Smart Button, the user selects a work location and/or incident type, and/or other types of options before activation of the Smart Button; to activate the Smart Button, user selects and/or holds/presses down the designated area of the screen for a specified, pre-determined period of time, and/or until a confirmation message appears confirming that user or submitter's message has been sent; when the "Smart Button" is pressed by at least one of a user or submitter belonging to at least one of a school, district, camp, healthcare institution, non-profit organization, religious organizations, organization, university, association, group, team, industry, or company: authorized personnel are immediately notified with user or submitter's information, including but not limited to, user or submitter's name, title, place of work, incident type, coordinates, address, and GPS map location; the user or submitter calls 911, or other urgent phone call number designated by the user or submitter's organization and/or place of work, directly by pressing the designated area of the screen: after the user or submitter presses the designated area of the screen for calling 911 or other urgent phone call number, a confirmation prompt appears; the user or submitter completes the call with 911 or other urgent phone call number and/or other designated information request or pop-up screen response and/or voice command; users access additional features through a Menu Bar by clicking on one of the icons, including, but not limited to the following: Identity, Help/Resources, Messages, and 2-way Chat conversations via text and/or voice; organization sets up additional numbers or specific phone numbers for the smart device running the app to contact; after the user presses/holds down the Smart Button, a confirmation screen appears that informs the user that the user's location has been sent to emergency contacts, along with the user's name, picture, building, title, and/or incident type selected; information is sent to emergency contacts via text and/or email and/or push notifications and/or badge notifications and/or pop-up screens through the app; users access account information by pressing icon labeled "Identity" and manipulate and view the following information in the data fields including, but not limited to: picture/photograph of the user; name of the user; organizational email address of the user; phone number of the user; job position/title of the user; default location/place of work of the user; emergency contacts of the user; user presses "Save" to save profile information for the account;

When users press "Add your picture" or "Change your picture" on the previous My Identity Profile screen, the "Media Upload" screen appears; here, users have the option to select a picture from their Photo Library or take a new picture to upload as their new profile picture;

After a user selects a picture or takes a picture, the picture will be displayed as a preview of what their profile picture will look like;

Users view their future profile picture and if satisfied, they must click "Upload" to create their new profile picture for the My Identity profile;

When users press "Emergency Contacts" on the My Identity profile screen, the list of emergency contacts will appear on the screen;

With the Smart Button, clients can choose to create default emergency contacts for their account; These contacts will receive every Smart Button report for the account; Users have the power to add their own emergency contacts; These contacts will be notified only when the user presses the Smart Button;

Users can enter their own emergency contacts to be notified; Press the contact to edit or press the blue icon to add a new contact;

Users can only view Default Emergency Contacts; These contacts are created during the setup phase of the client's account; Users are unable to edit these contacts;

When users press on a specific contact or the blue icon on the previous Emergency Contacts screen, the "Contact Information" screen appears; Users can then input the desired information and press "Save" to save the contact;

Users can create and edit their own emergency contacts by filling out a person's name, email, and texting number in the appropriate sections, or select a contact from their device address book;

When the user presses "Select Title" on the My Identity Profile screen, this screen appears; here, the user can select their job title by pressing on the appropriate title in the list;

Emergency Procedures: user can click on and expand with text details;

Building Plans: user can click and display their emergency building plans, including, but not limited to, architectural and/or floor plans;

Users can access the Help and Resources Menu by pressing "Help/Resources" on the Menu Bar; The Help and Resources menu is broken down into several customizable drop-down sections; when each blue section header is pressed, the section expands and all of the informational pieces are displayed; The user can press on one of these pieces to view the information on a separate screen;

In addition, clients can customize by including, but not limited to, employee manuals, operations handbooks, or other Human Resources guides within this Help and Resources menu for user access;

Press the section to learn more about the Smart Button; On the following screen, help instructions are displayed for the user;

When the user expands the sections, the informational options are displayed; Users can scroll through the screen and select an option to access helpful information;

These sections are customizable by the client for user's access; Examples of sections are Help, Emergency Procedures, Building Plans, Helpful Links, Videos, YouTube Videos, and any other customizable sections they would like to add;

Informational screen that provides more detail about the Smart Button; This screen appears when the user presses the "About Smart Button" option within the "Help" section in the Help and Resources Menu;

Clients can customize this section based on the emergency procedures in place for their organization;

Users can select different emergency procedures options and view the detailed information on a separate screen;

A detailed view of the information displayed for one of the options in the Emergency Procedures section in the Help and Resources menu; The screen appears when one of the emergency procedures options is pressed by the user;

Here is an example of a Help and Resources section where Emergency Procedures and Building Plans are displayed;

Within the Help & Resources menu, clients have the ability to include building plans in the "Building Plans" section; Users can access a building plan by pressing one of the options within the "Building Plans" section;

On the previous screen, the user selects "Elementary School—Building Plans" to view the plan; The floor plan that can be selected by the user is shown;

Floor plans can be added to the "Building Plans" section in the Help and Resources menu; In the event of an emergency such as a tornado, an active shooter, a hurricane, or any other situation, users can easily open and view the plans after pressing the appropriate plan located in the "Building Plans" section;

Additional expanded sections from the Help and Resources menu that are visible when the user expands each section; Here, additional sections are shown including Building Plans, Helpful Links, Videos, and YouTube Videos;

In the Video Learning Management section, users can watch tutorials, custom training videos, and/or demonstrations from either pre-loaded videos or YouTube; Users simply press one of the named options to play a video;

When the user presses this option, an informational video about the Smart Button will be shown; On the previous screen, when the user presses the "Smart Button for Administrators Overview" option in the "Videos" section in the Help & Resources menu, the video plays;

With the Smart Button, users receive push notification messages sent out by an authorized individual through the Incident Management app, Smart Button app, and/or the Smart Button Web Dashboard;

Additionally, a user clicks on the message to establish a 2-way dialogue with sender; To view the details of each push notification, users must press on a notification message; the message subject and the date & time stamp are the only pieces of information that are displayed; User presses the "Messages" icon on the Menu Bar to access push notifications;

When a push notification message has been received, but has not been read, the user is notified with a red badge number, indicating that they have received a new push notification message; After a user presses a particular Push Notification Message in the Messages menu, the details of the push notification message are shown; The Message Details contain the date, time, subject, and the full text of the message;

Additionally, a user can click on the message to establish dialogue with sender;

When in a crisis, emergency, and/or weather-related event, the user/submitter has the ability to message with authorized emergency contacts, default contacts, entered contacts, and/or organizational personnel;

User/submitter presses the "Conversations" icon located on the Menu Bar to access an emergency chat feature;

school administrators, teachers, professors, users, submitters, corporate users, third parties, and/or receivers have an at least one 1-way or at least one 2-way communication, dialogue, and/or control a multitude of security functions, protocols and procedures during an urgent situation; all communication is at least one 1-way or at least one 2-way communication.

In at least one embodiment, the present invention is a method, comprising: receiving, by at least one dedicated computer, server, or Smart device, at least one incident report sent by at least one user executing on a user computer and/or Smart device either anonymously or non-anonymously; said report including at least one of the following types of incidents, prevention or intervention needed, or other critical activities such as: threats of suicide or harm to self, threats of harm to others, urgent intervention concerns, unethical, or inappropriate actions; at least one dedicated computer, server, or Smart device receiving and transmitting and/or forwarding said report with metadata; said metadata is in whole or in part at least one Unique Identifier and/or Unique Code Identifier associated with at least one submitter, receiver, and/or report which allows for identification while maintaining anonymity.

Although preferred embodiments of the present invention have been described it will be understood by those skilled in the art that the present invention should not be limited to the described preferred embodiments. Rather, various changes and modifications can be made within the spirit and scope of the present invention.

OVERVIEW

The mobile application for acceleration of an urgent situation response and supervision (a.k.a Smart Button) is a revolutionary way for school administrators, teachers, professors, users, or corporate users to instantly report credible threats, or dangerous situations that warrant immediate attention in at least one current embodiment. In at least one current embodiment, the Smart Button is a digital urgent situation button and mobile app for any submitter from a school, campus, university, corporation, non-profit organization, or organization to instantly report their GPS map location with, but not limited to, their name, title, contact information, picture, place of work to authorized personnel. Submitters can receive and/or send 1-way or at least 2-way communications.

BRIEF DESCRIPTION OF THE SEVERAL VIEWS OF THE DRAWING

The drawings constitute a part of this specification and include exemplary embodiments to the invention, which may be embodied in various forms. It is to be understood that in some instances various aspects of the invention may be shown exaggerated or enlarged to facilitate an understanding of the invention. All figures filed along with this patent application are incorporated herein by this reference. All figures are of at least one embodiment of the invention, however, other embodiments of the invention may be different than those depicted herein in any particular figure.

FIG. 2 depicts the flow of creating a new anonymous/non-anonymous mood related or time-sensitive or secretive message for submission.

FIG. 2A—screen shot of photo upload screen, 64 choose file, 59 upload button.

FIG. 2B—screen shot of Selecting the image, depicts the selection of an image or other content or text to upload; 68 selects picture to upload.

FIG. 2C—screen shot of uploading an image.

FIG. 2D—screen shot of cropping an image, with crop button 67, and submit/cancel 61.

FIG. 2E—depicts a smartphone with the Anonymous Alerts Icon. Submitter clicks the mobile application icon to startup/initiate mobile application.

FIG. 2F—depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s)

Figure 1:
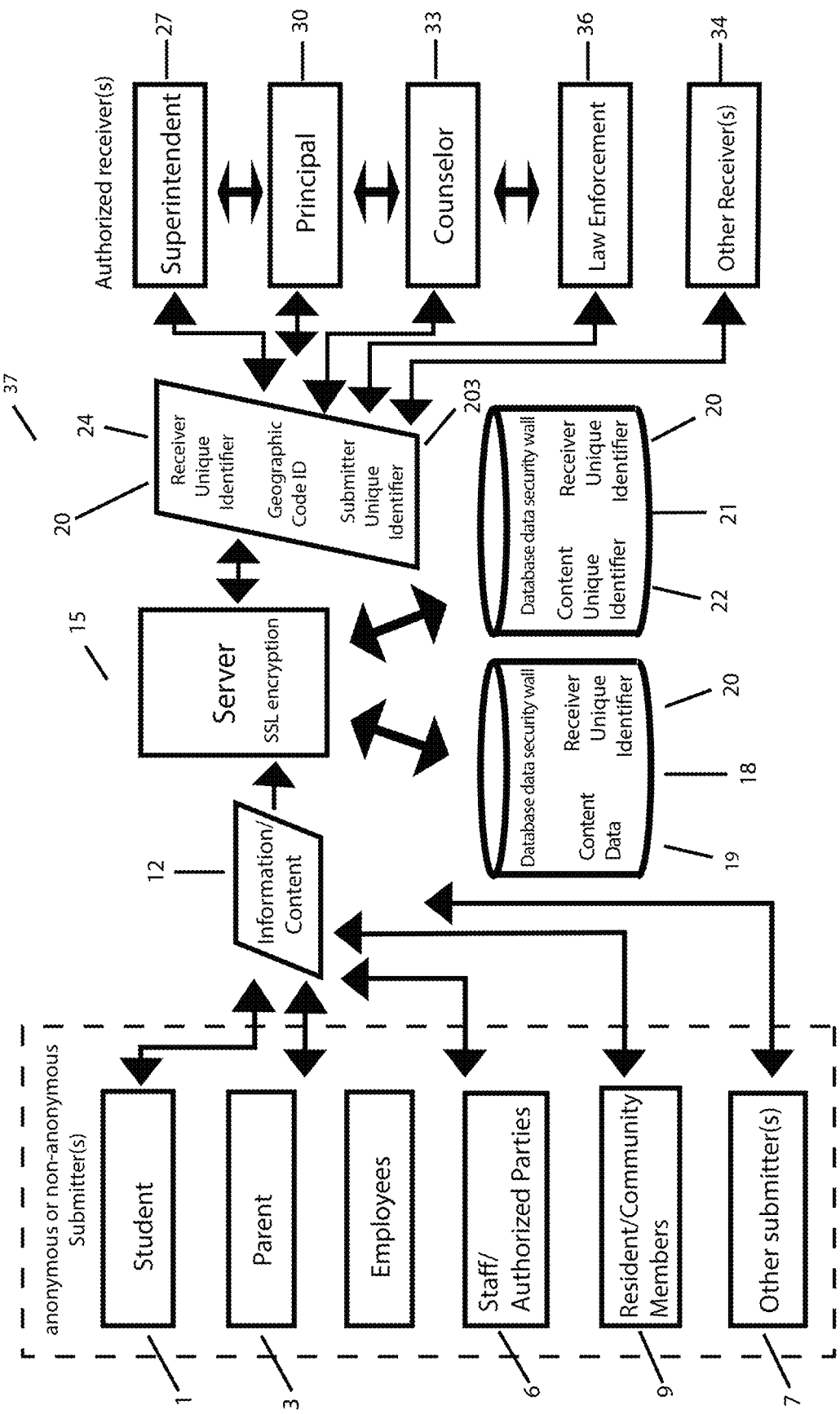
FIG. 1 is a schematic view of the operation of the system for receiving and responding to mood related or time-sensitive or secretive information, content, and/or messages.

and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G—submitter message submission screen wherein the Submitter chooses to select "Send Incident Report" or "Glossary" to access definition of terms or "Help".

FIG. 2H—submitter message submission screen after the Submitter chooses to select "Send Incident Report", which includes several entry fields, a message field, and submit or send button.

FIG. 2I—submitter message submission screen after the Submitter chooses to select "Send Incident Report" which includes several entry fields and Submitter can select location with a picker that is data driven with custom locations.

FIG. 2J—submitter message submission screen after the Submitter chooses to select "Send Incident Report" which includes several entry fields including an anonymous message screen.

FIGS. 2K and 2L—submitter is prompted to upload an image (upload, or take picture then upload) at the Submitter's discretion if the Submitter has an image to upload about an incident report or other message/information. Various choice options are shown.

FIG. 2M confirmation screen showing that image or other content has been successfully uploaded.

FIGS. 2N and 2O—mobile Application Screens—sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored. Alternatively, the submitter can choose to be non-anonymous, and reveal information such as the Submitter's name, e-mail address, phone number, phone text number or network identity code or location for non-anonymous communications.

FIG. 2P—depicts "Glossary of Terms" screen. Can include community-specific customized terms.

FIG. 2Q—screen for "Definition of Terms" in the drop down menus.

FIG. 2R—help Screen on mobile device.

FIG. 2S—screen Shot of Receiver's smart phone device depicting a message being received from an anonymous Submitter.

FIG. 3 depicts the Message Submitter flow of automated operations that occur following the creation and submission of an anonymous/non-anonymous alert message.

FIG. 4 depicts the flow of an Administrative User's Account Setup process for a message recipient.

FIG. 5 depicts the flow of how a message. Receiver or recipient accesses a message from the administrative interface.

FIG. 6A depicts option 1 when viewing new sensitive content message with ability to forward message via e-mail to another party.

FIG. 6B depicts option 2 when viewing new message for Message Recipient to reply to Message Submitter.

FIG. 7 is a screenshot of a system where an Administrator can setup a user account.

FIG. 8 is a screenshot of the possible types of alerts for an anonymous/non-anonymous alert report.

FIG. 9 is a screenshot of system query results that a Message Recipient may search.

Figure 10:
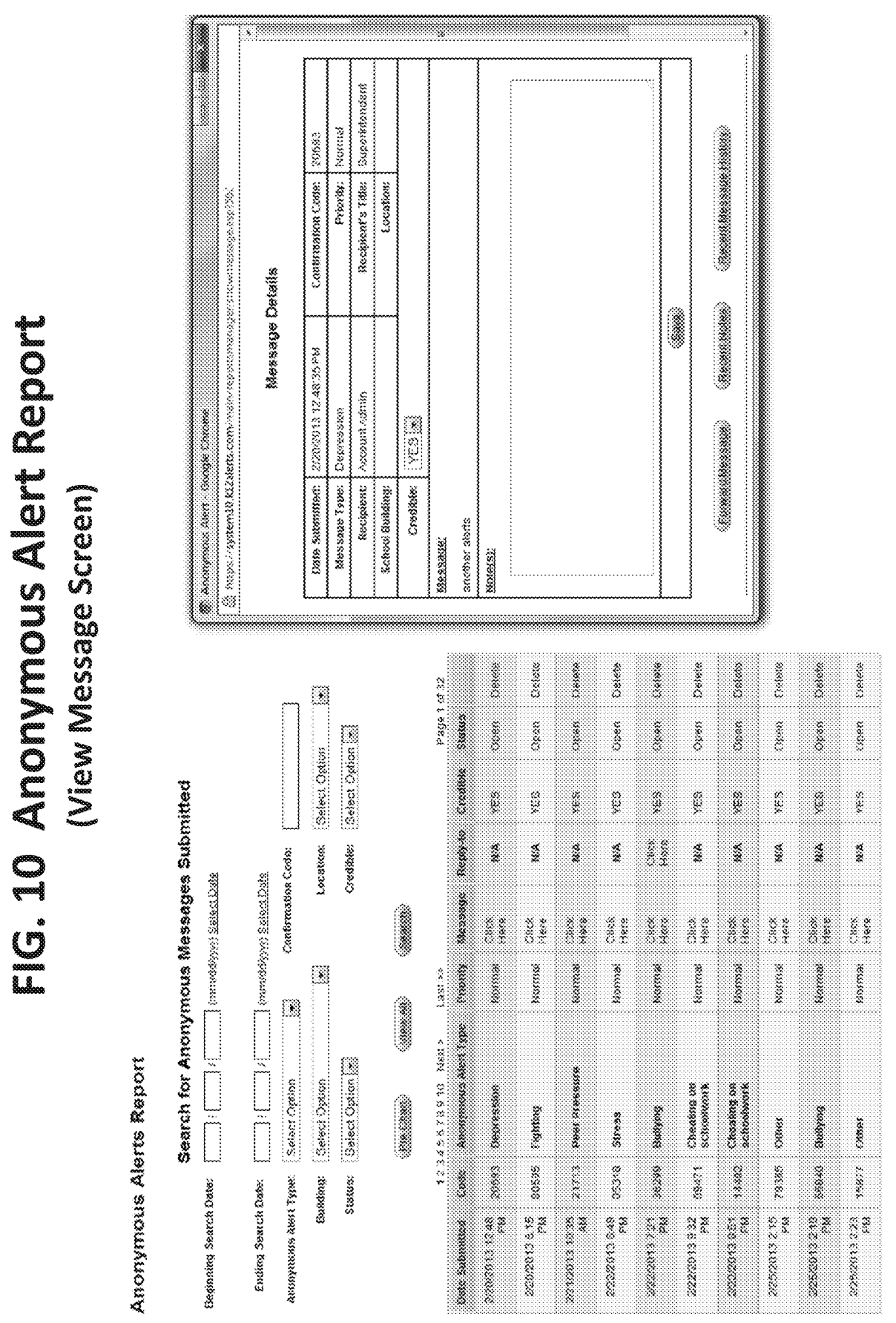

FIG. 10 is a screenshot of a message screen containing an original message, related message history, and reply/forwarding options by an administrative user.

FIG. 11 is a screenshot of a reply screen for an administrative user.

Figure 12:
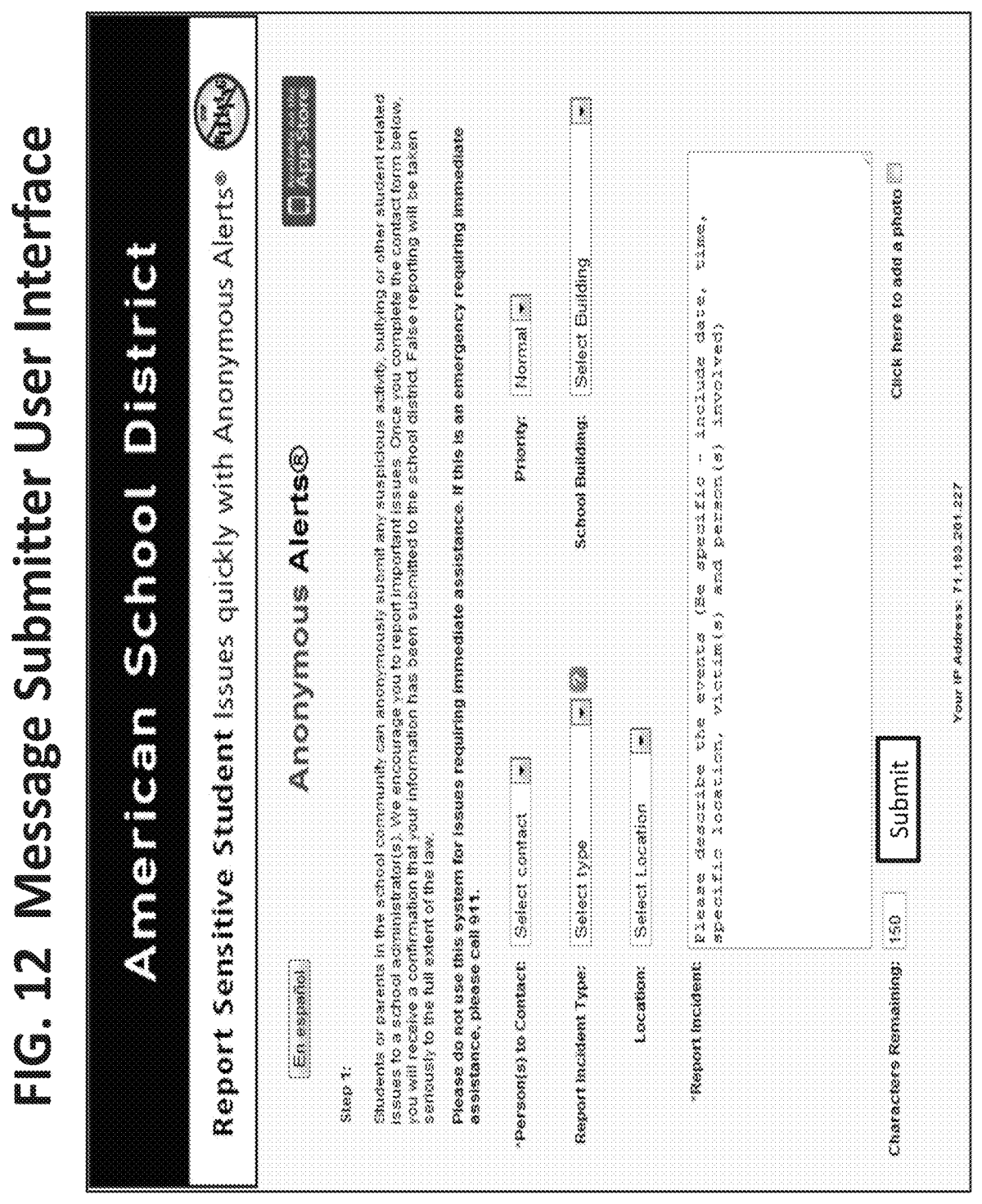

FIG. 12 is a screenshot of an example of the Message Submitter's User Interface.

Figure 13:
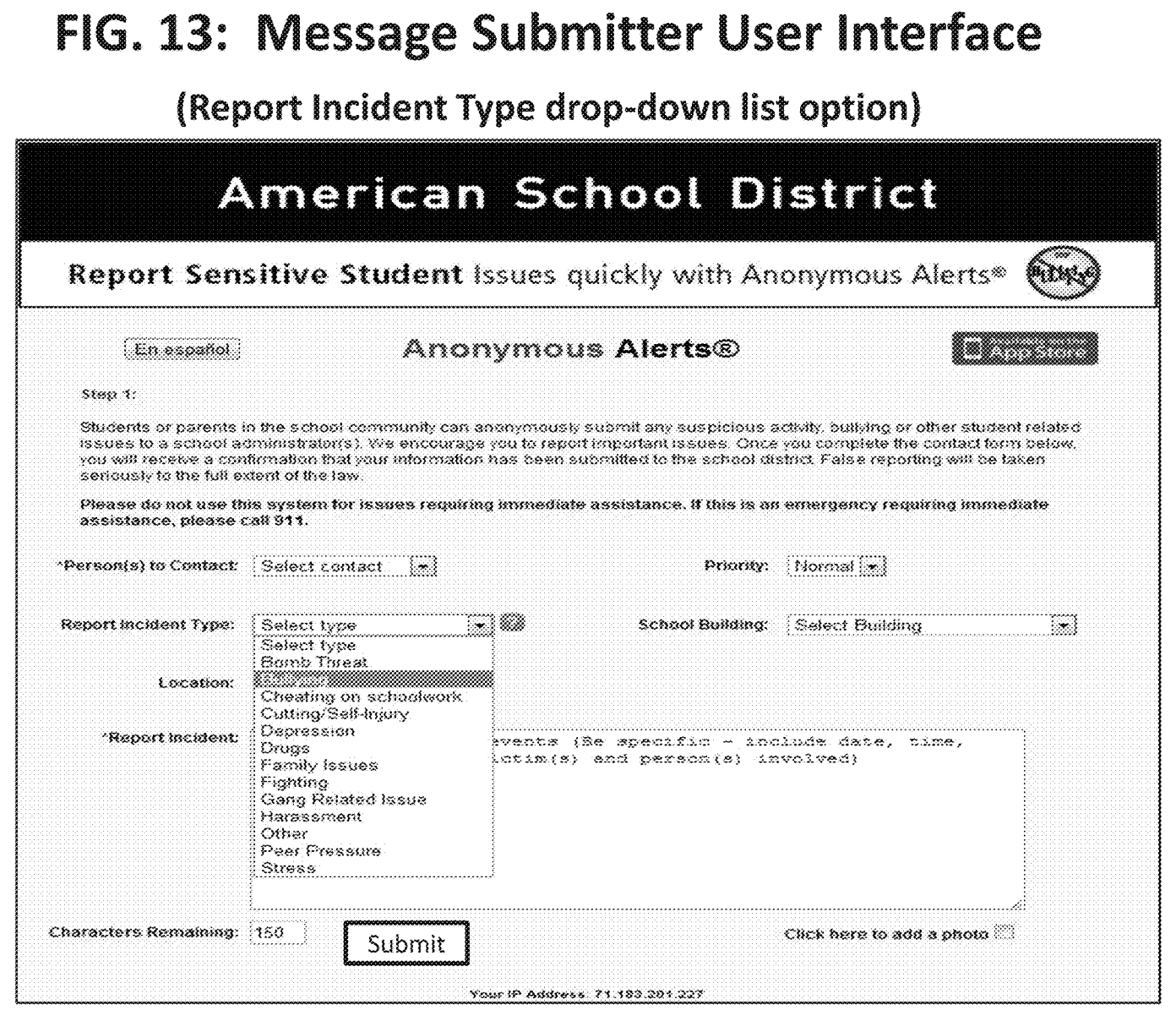

FIG. 13 is a screenshot of an example of the Message Submitter's message type drop-down list options.

FIG. 14 is a screenshot of an example of the Message Submitter's person of contact drop-down selection options.

FIG. 15 is a screenshot of a confirmation that the Message Submitter's submission was received.

FIG. 16 depicts an example of a mobile or smart phone screen having a downloaded application of the method of the invention.

FIG. 17 is an exemplary information handling system m accordance with an embodiment of the present invention.

FIG. 18 depicts some of the Submitter and Receiver elements comprised m an embodiment of the present invention.

Figure 19:
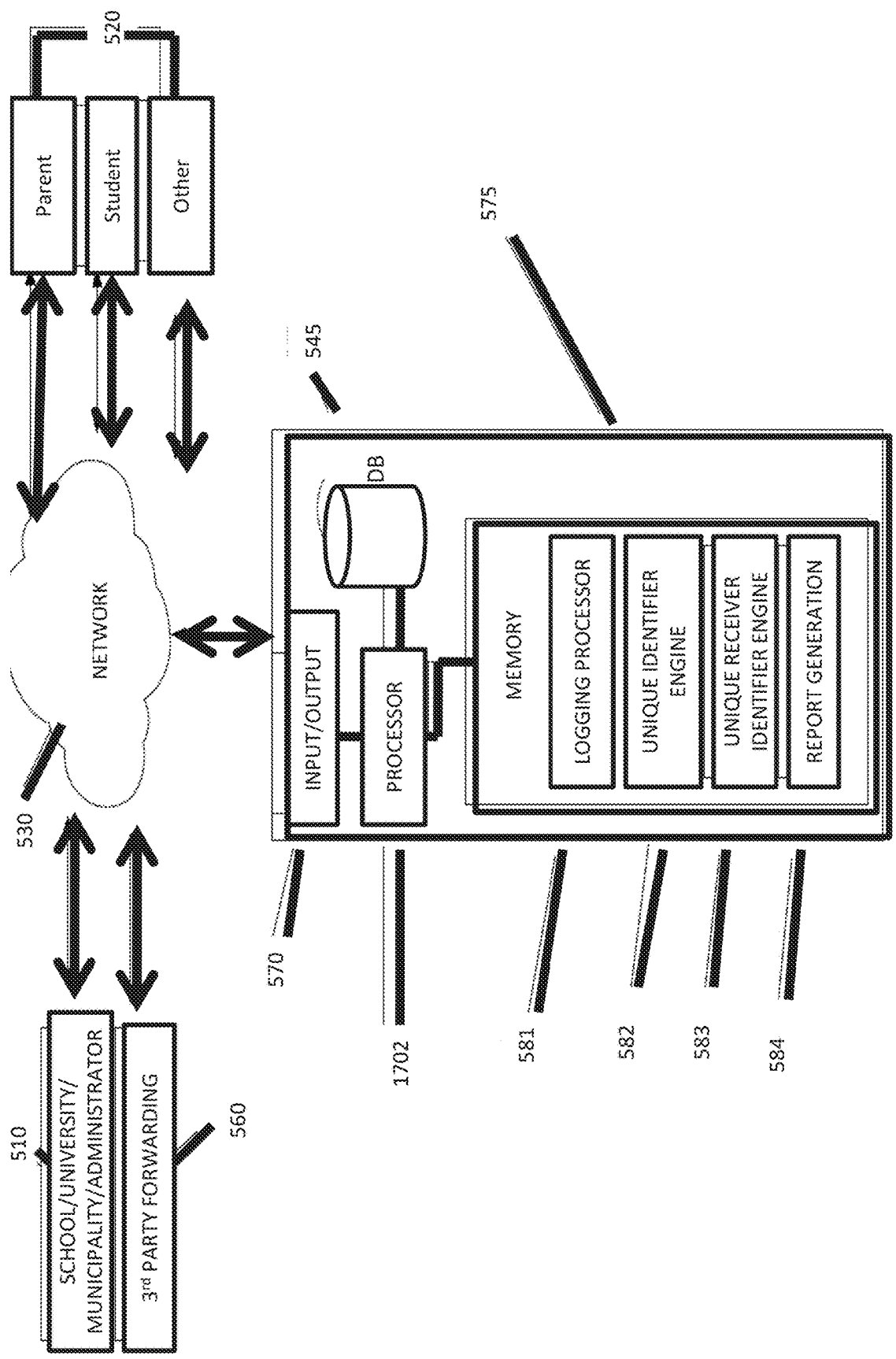

FIG. 19 is a system view showing the relationship between Submitter(s) and Receiver(s) and the intervening hardware, further depicting some of the steps performed in an embodiment of the present invention.

Figure 20:
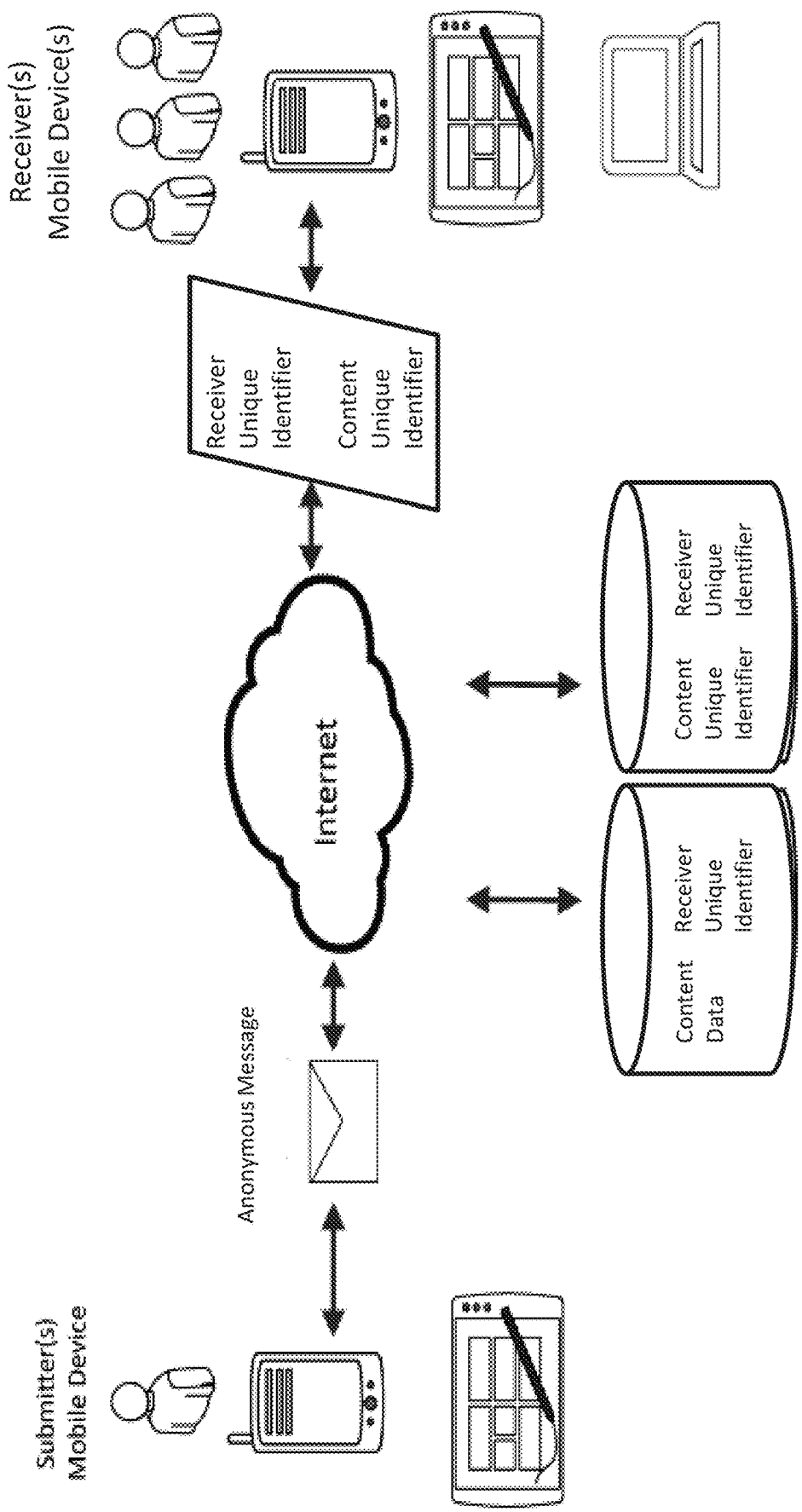

FIG. 20 shows Mobile to Mobile Message Sending and Receiving.

Figure 21:
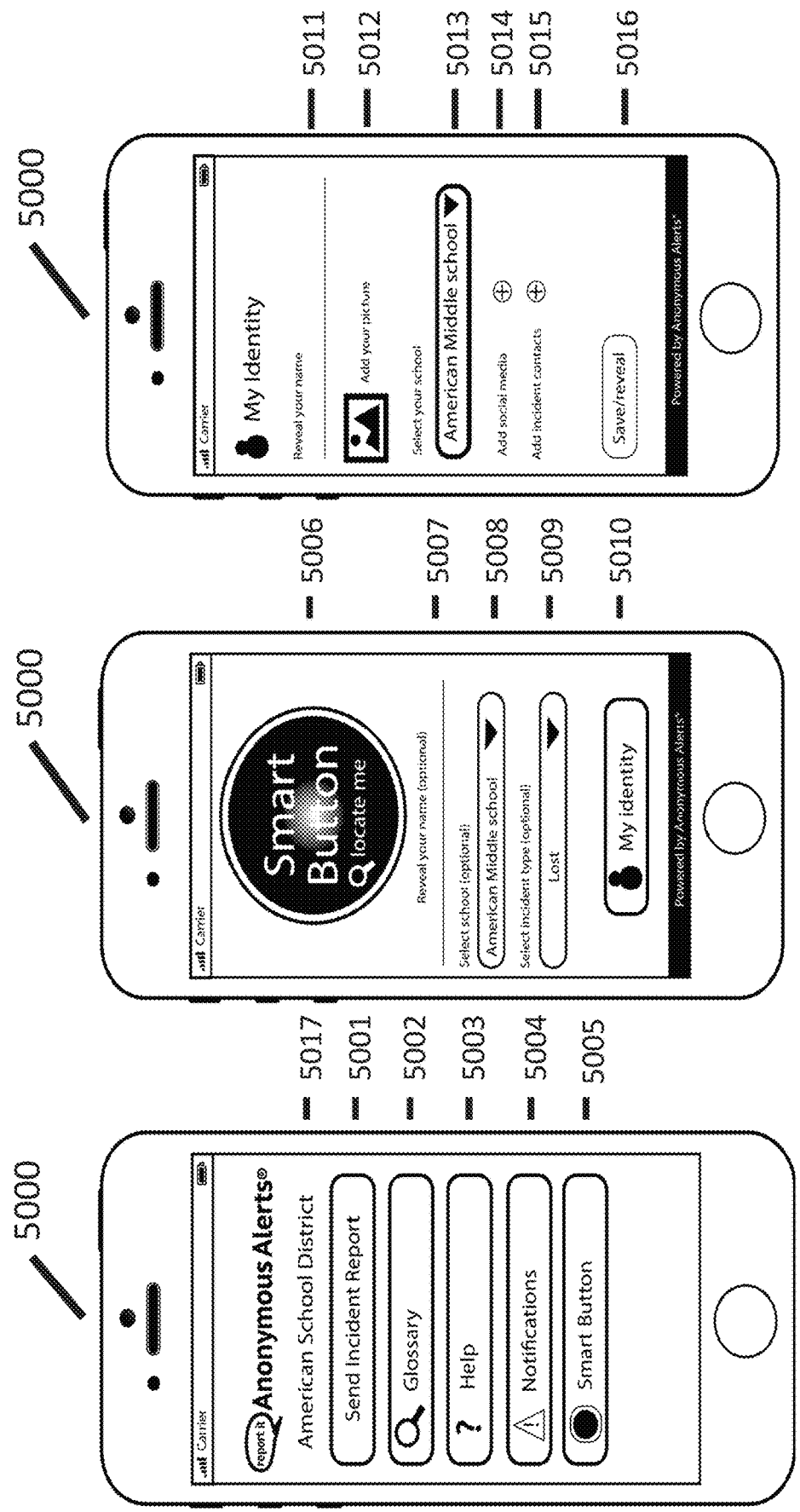

FIG. 21 shows at least one embodiment of Mobile Phone displaying the Smart Button and anonymous incident reporting and locator mobile application screens.

FIGS. 22-26 show various incident management, administrative, and/or at least 2-way anonymous communications app screens.

Figure 27:
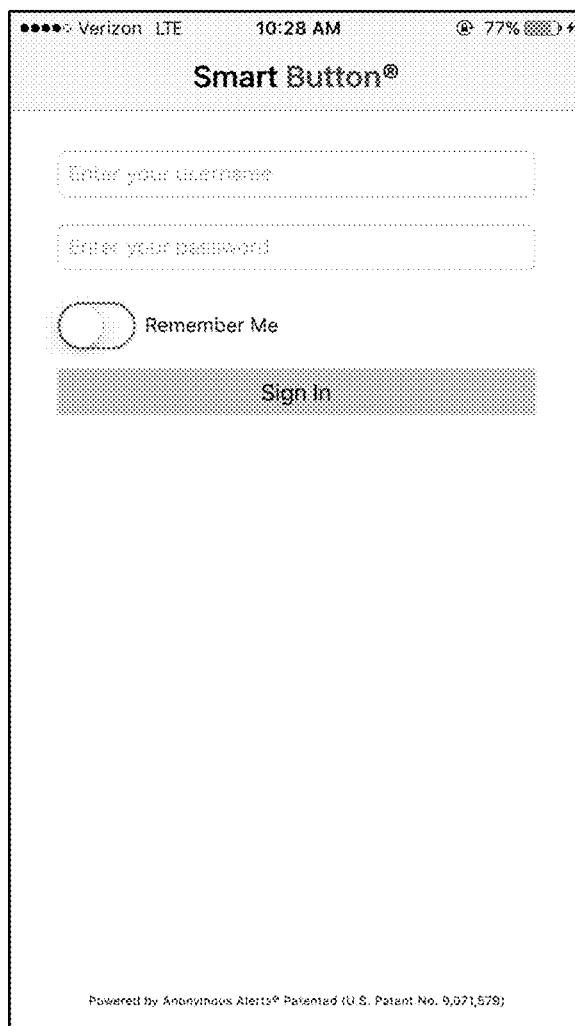

FIG. 27—depicts a screenshot of the log-in screen of the mobile application for Smart Button where the user inputs a unique username and password specific to that one user to gain access to the account.

Figure 28:
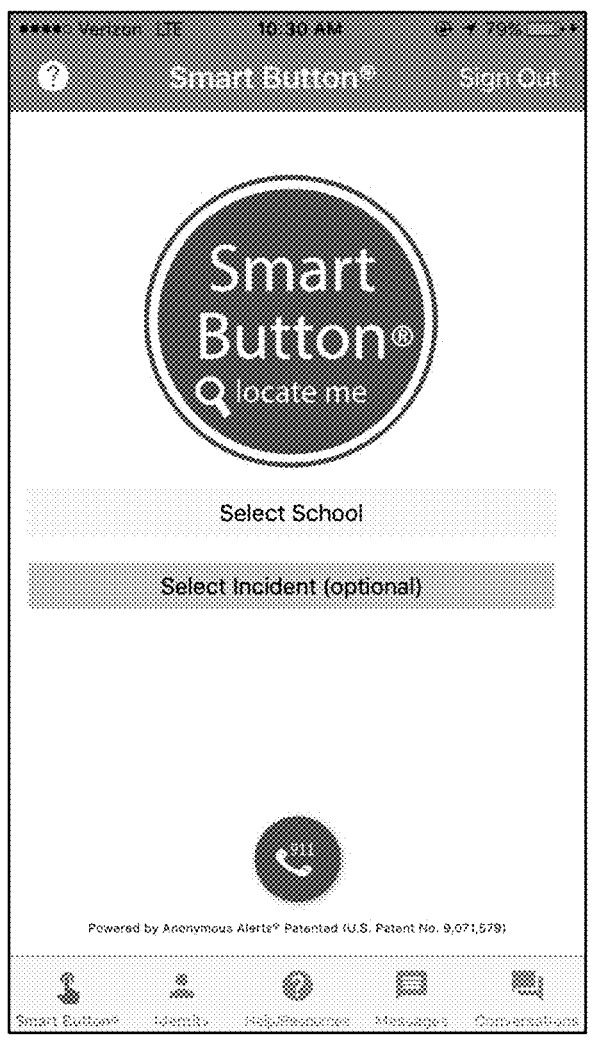

FIG. 28—depicts a screenshot of the "Smart Button" main menu screen wherein the user can choose to press down on the Smart Button to initiate the reporting process, select a school building, select an incident type, directly call 911, access additional account functions by clicking on an icon in the top banner, or access additional account functions by clicking on a tab in the bottom banner.

Figure 29:
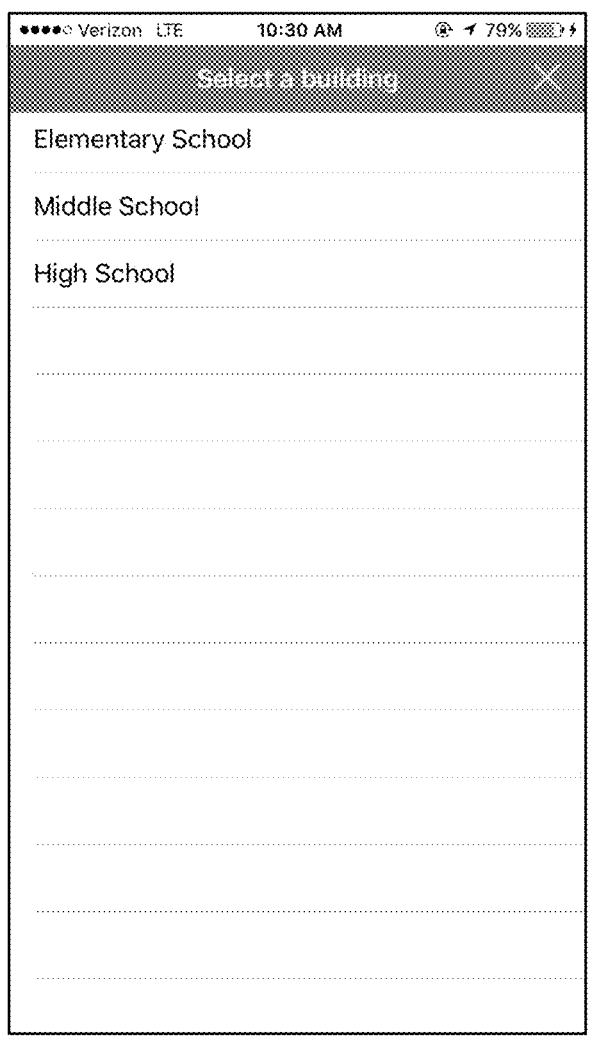

FIG. 29—depicts a screenshot of the "Select a building" screen where a user can select a school building to be identified with for the account.

Figure 30:
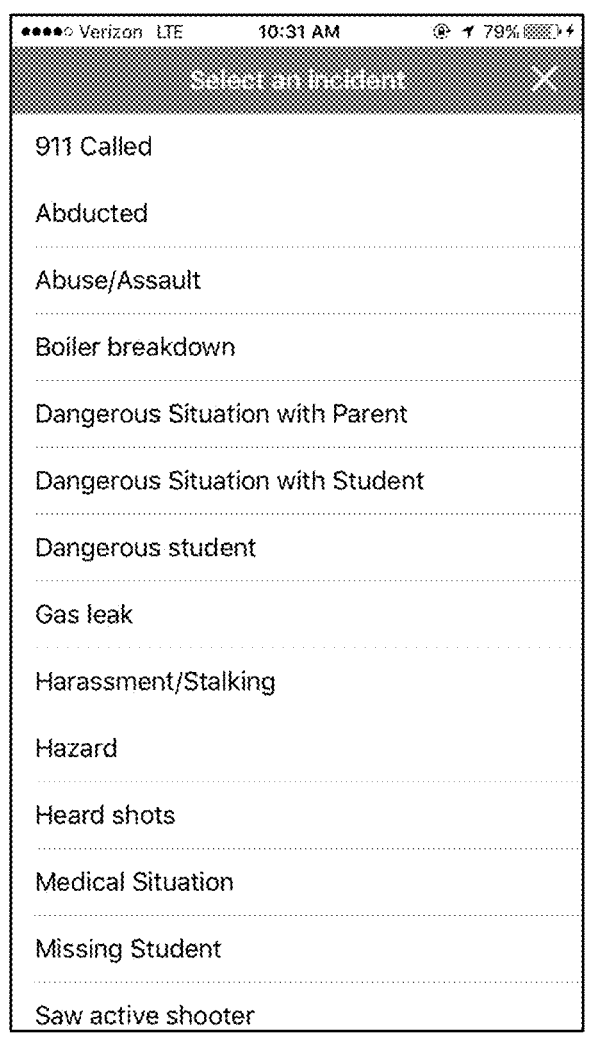

FIG. 30—depicts a screenshot of the "Select an incident" screen where the user has the option to select the incident type that best describes the situation before the user presses down the Smart Button to send a report.

Figure 31:
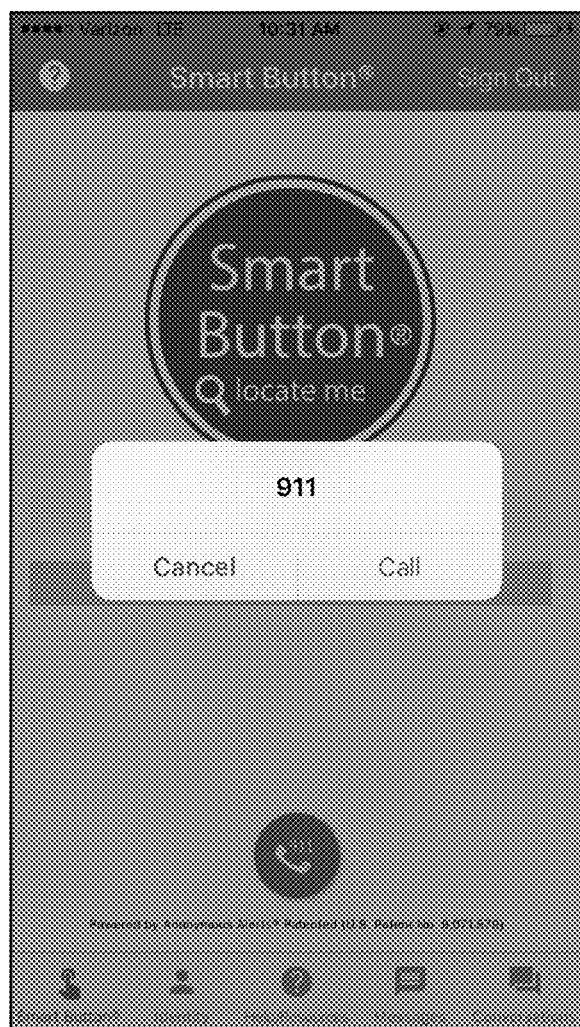

FIG. 31—depicts a screenshot of the "Dial 911" option where the user can click on the "911" icon to activate the prompt to directly call 911.

Figure 32:
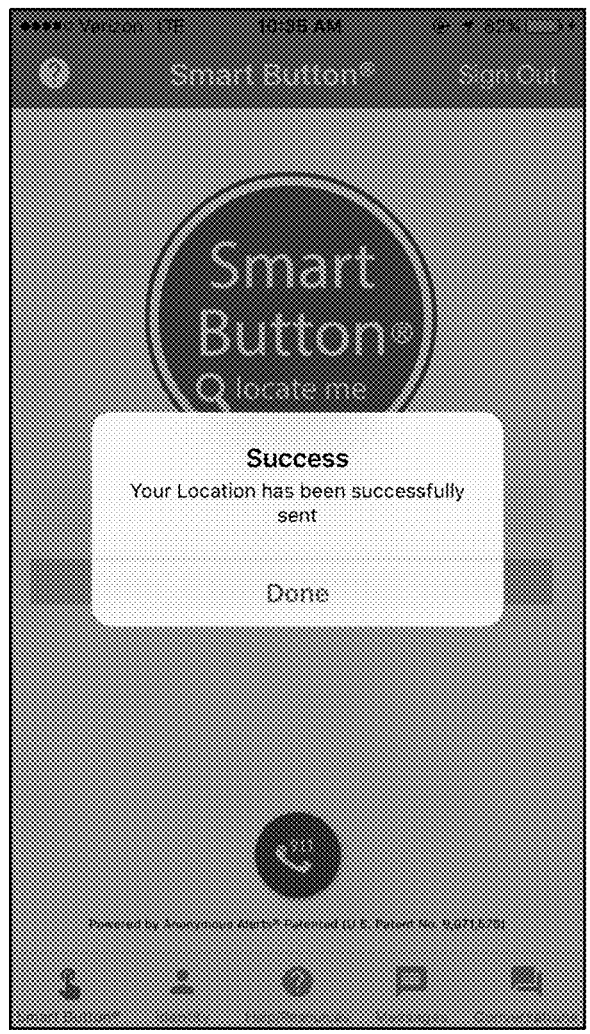

FIG. 32—depicts a screenshot of the "Success" prompt that notifies the user that the report information and the user's GPS location has been transmitted.

Figure 33:
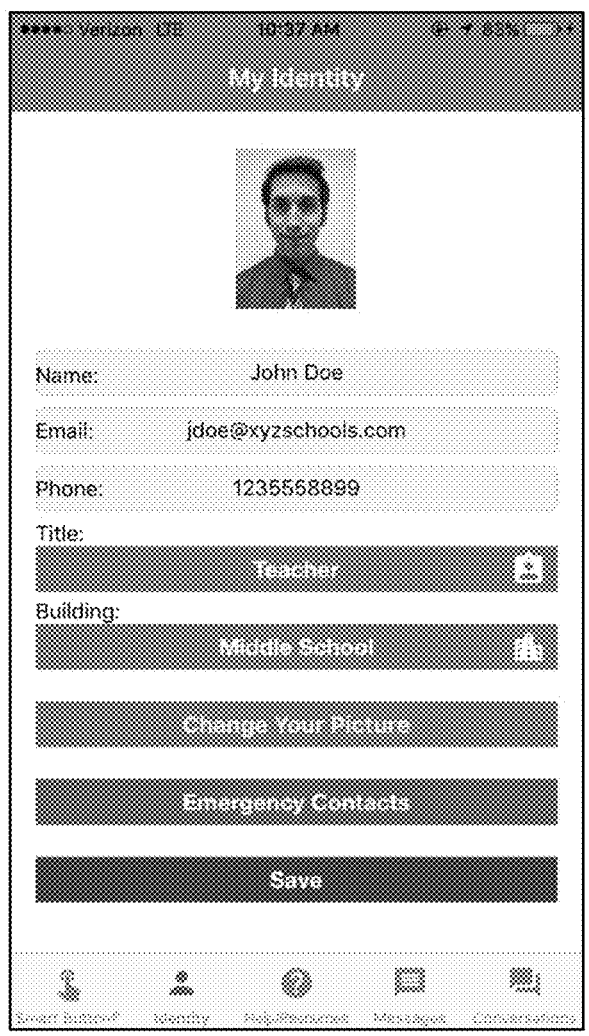

FIG. 33—depicts a screenshot of the "My Identity" screen that is accessed if the user clicks the "Identity" tab in the bottom banner. In "My Identity", the user has the option to edit/add/change account information, including the user's name, email address, phone number, title, account picture, and building to be identified with. In addition, users can access emergency contact information by clicking the "Emergency Contacts" tab.

Figure 34:
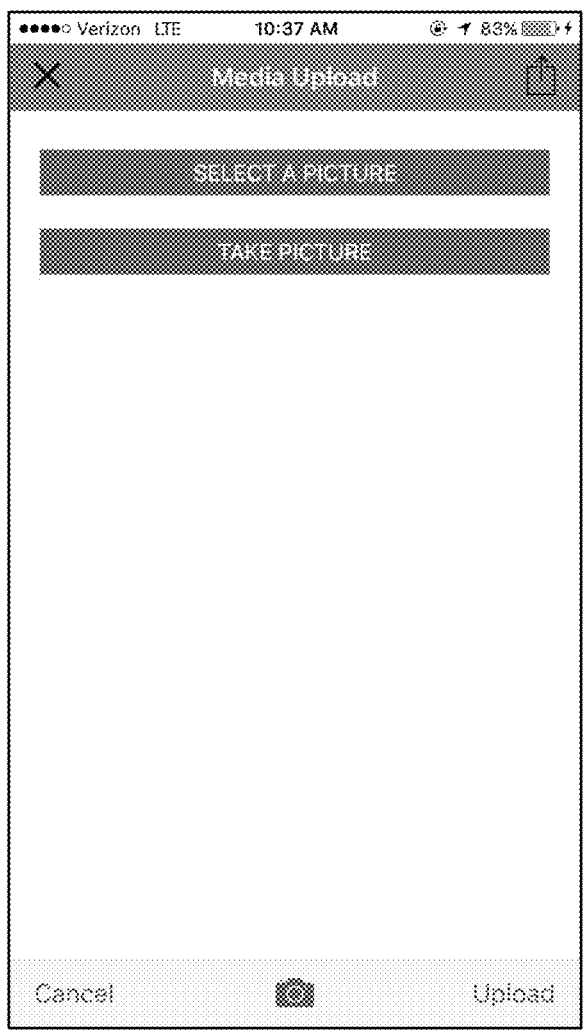

FIG. 34—depicts a screenshot of the "Media Upload" screen that a user can access by clicking the "Change Your Picture" tab in "My Identity" or clicking on the picture itself. Here, users can select a new picture or take a new picture to use as the account picture.

Figure 35:
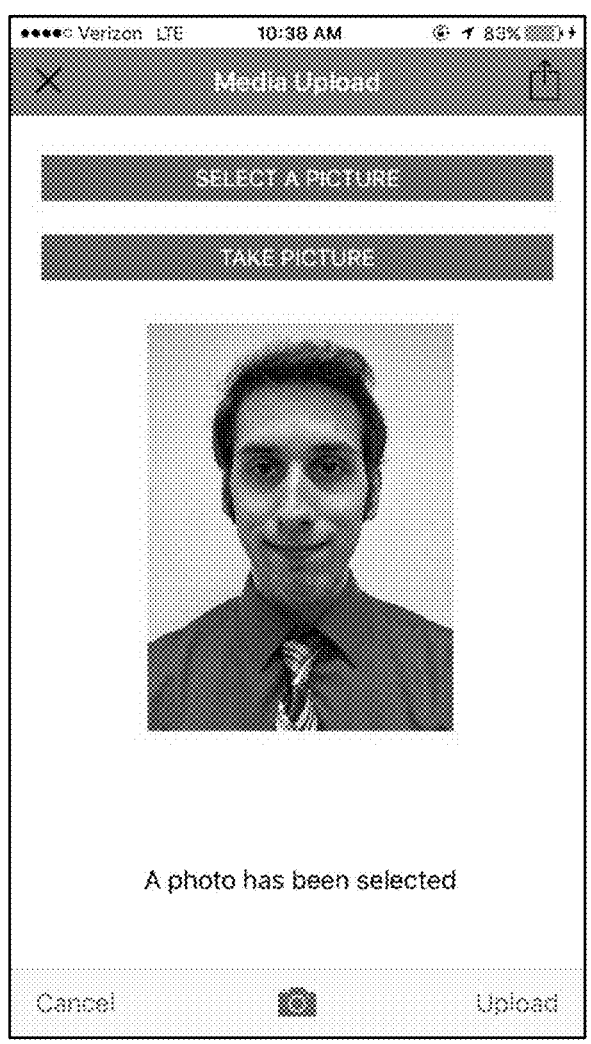

FIG. 35—depicts a screenshot of the picture preview screen when uploading an account picture. The user can click "Upload" to confirm the preview picture as the new account picture.

Figure 36:
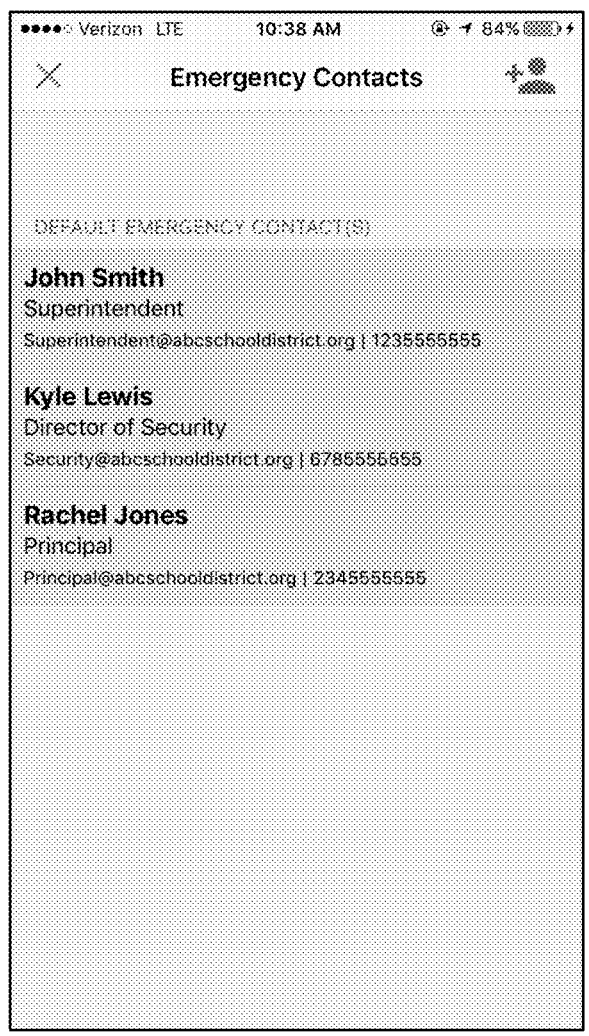

FIG. 36—depicts a screenshot of the "Emergency Contacts" screen. Here users can view the information for the emergency contacts and add a new emergency contact, if permitted.

Figure 37:
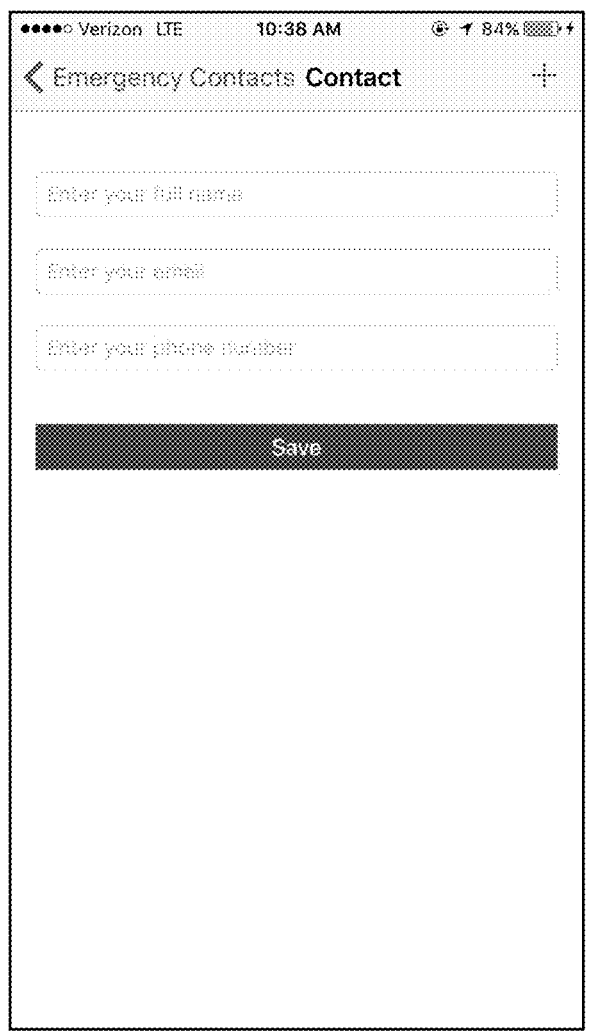

FIG. 37—depicts a screenshot of the "Add Emergency Contact" screen where the user can input a person's name, email address, and phone number to add as a new emergency contact for the user's account.

Figure 38:
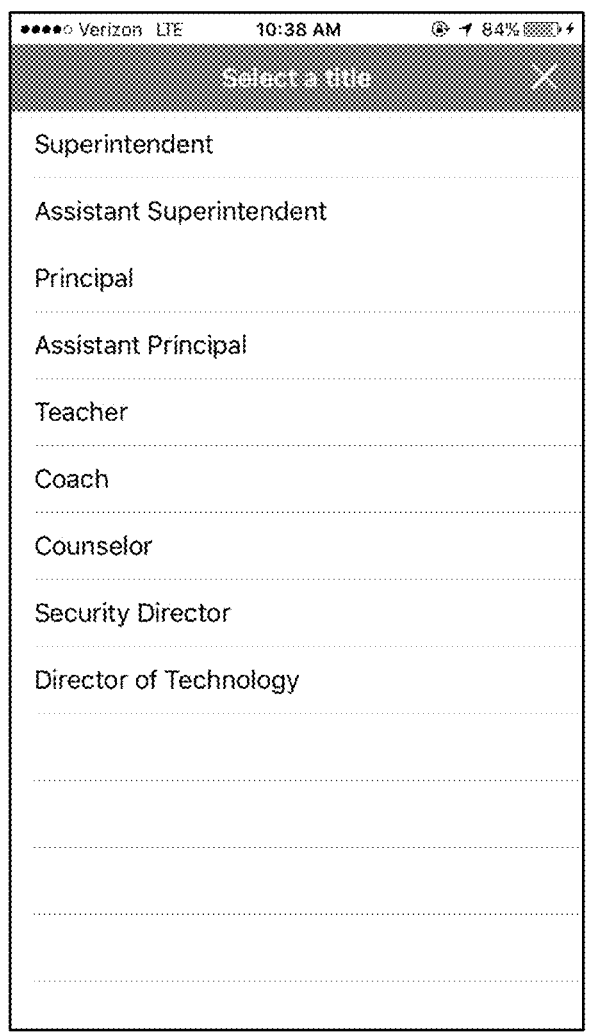

FIG. 38—depicts a screenshot of the "Select a title" screen where a user can select a position title to be identified by in the account.

Figure 39A:
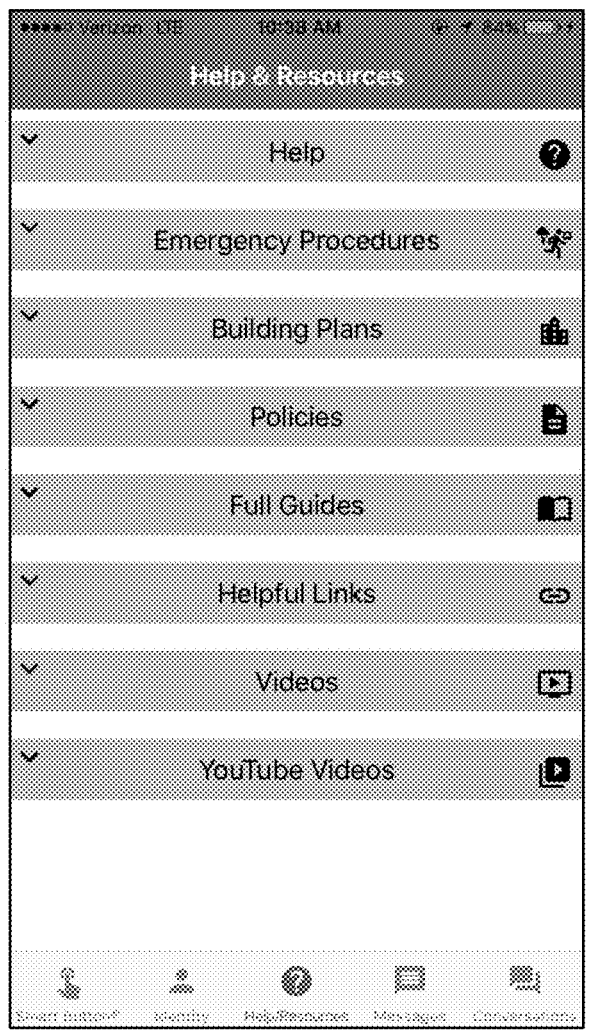

FIG. 39A—depicts a screenshot of the "Help & Resources" menu. A user can click on the drop-down tabs to access list options containing information related to subjects such as emergency procedures, building plans, policies, emergency guides, helpful links, videos, and more.

Figure 39B:
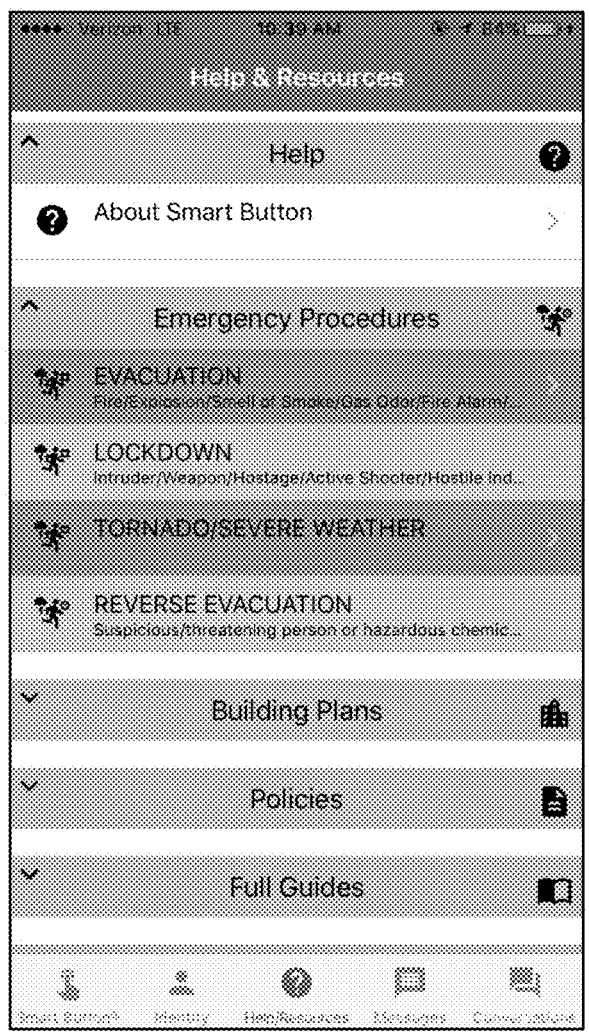

FIG. 39B—depicts a screenshot of the Help & Resources menu where the "Help" and "Emergency Procedures" drop-down tabs have been expanded to reveal the different options to access in a list. A user needs to click on one of the options to access it's accompanying information.

Figure 39C:
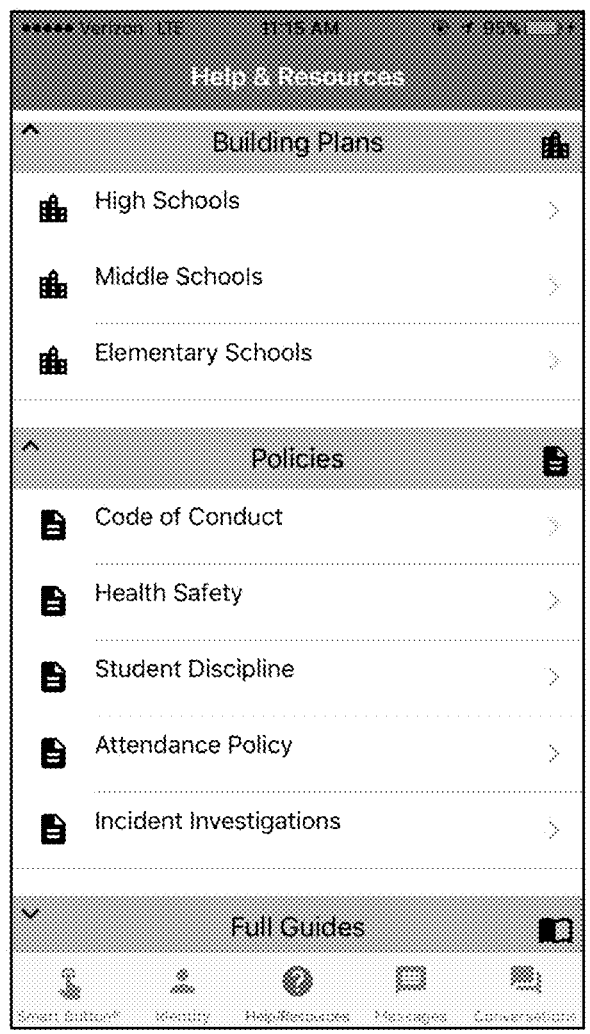

FIG. 39C—depicts a screenshot of the "Building Plans" and "Policies" drop-down tabs expanded where a user can select one of the list options to access the information.

Figure 39D:
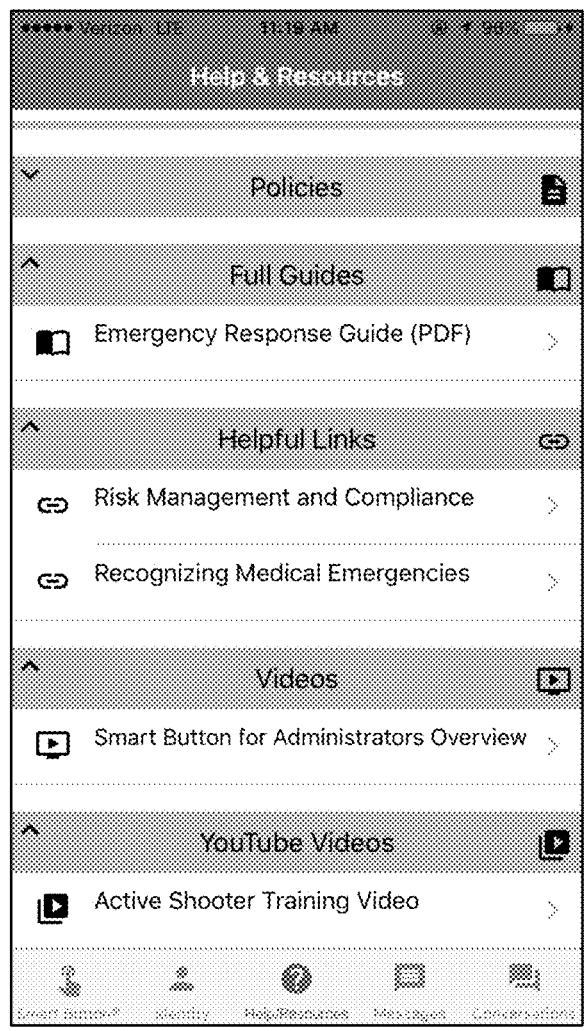

FIG. 39D—depicts a screenshot of additional drop-down tabs in the Help & Resources menu that a user can access. The additional tabs are "Full Emergency Guides", "Helpful Links", "Videos", and "YouTube Videos".

Figure 40:
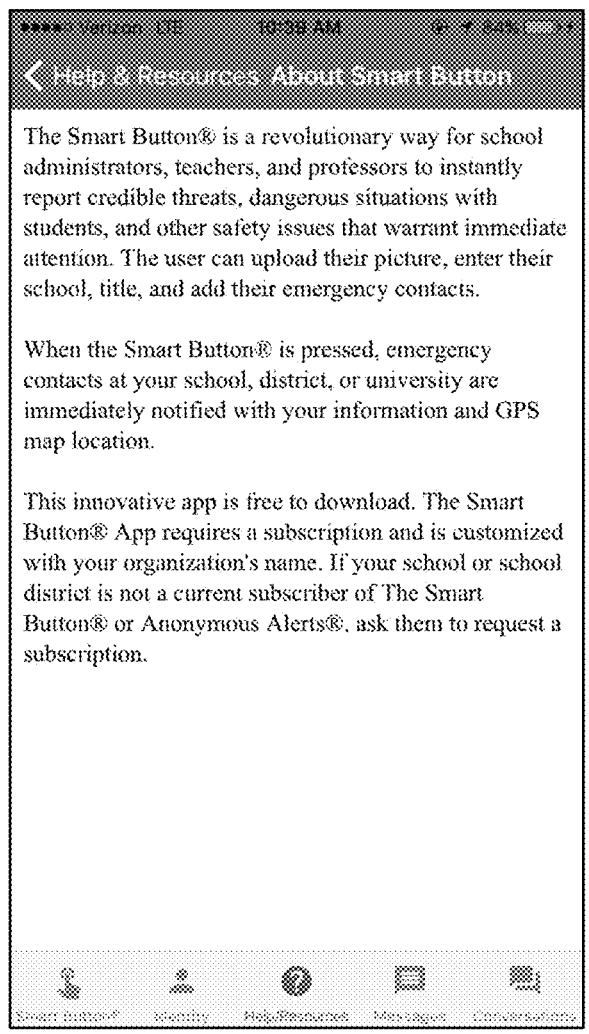

FIG. 40—depicts a screenshot of one of the list options that has been accessed by a user.

Figure 41:
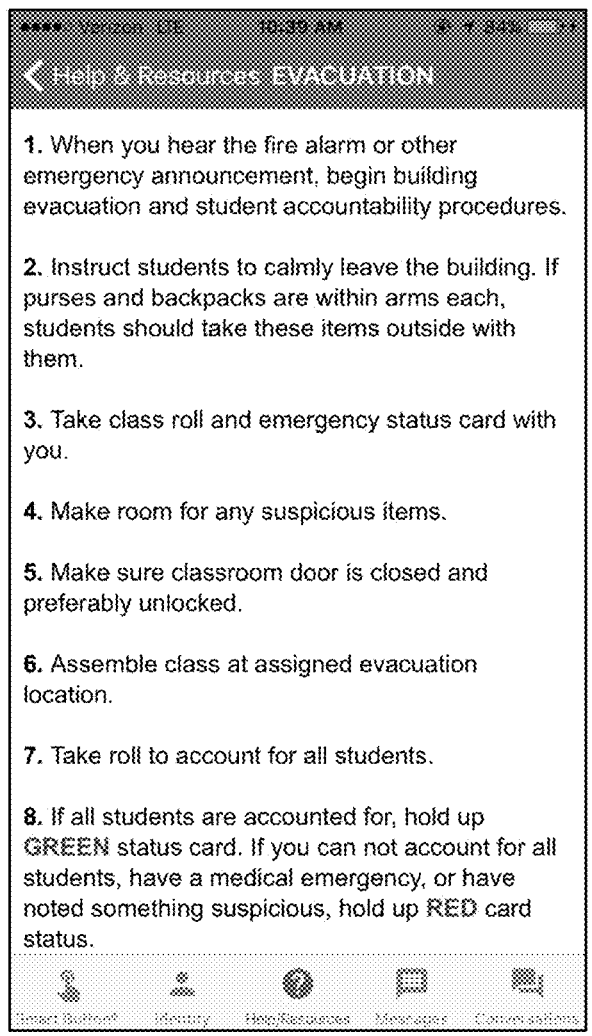

FIG. 41—depicts a screenshot of one of the options in the "Emergency Procedures" drop-down tab that has been selected by the user.

Figure 42:
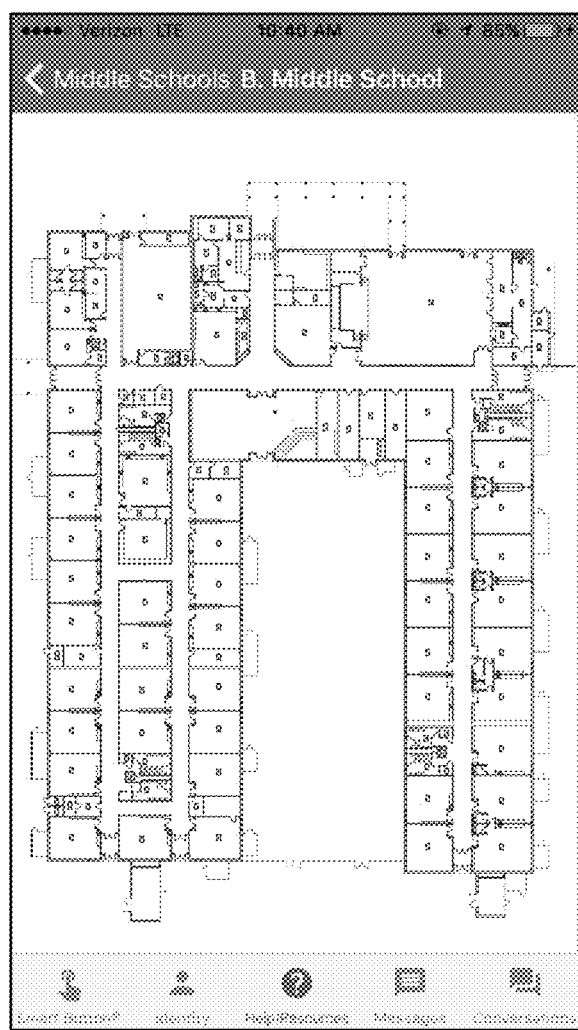

FIG. 42—depicts a screenshot of a building plan that is available to view in the "Building Plans" drop-down tab as long as the user selects it.

Figure 43:
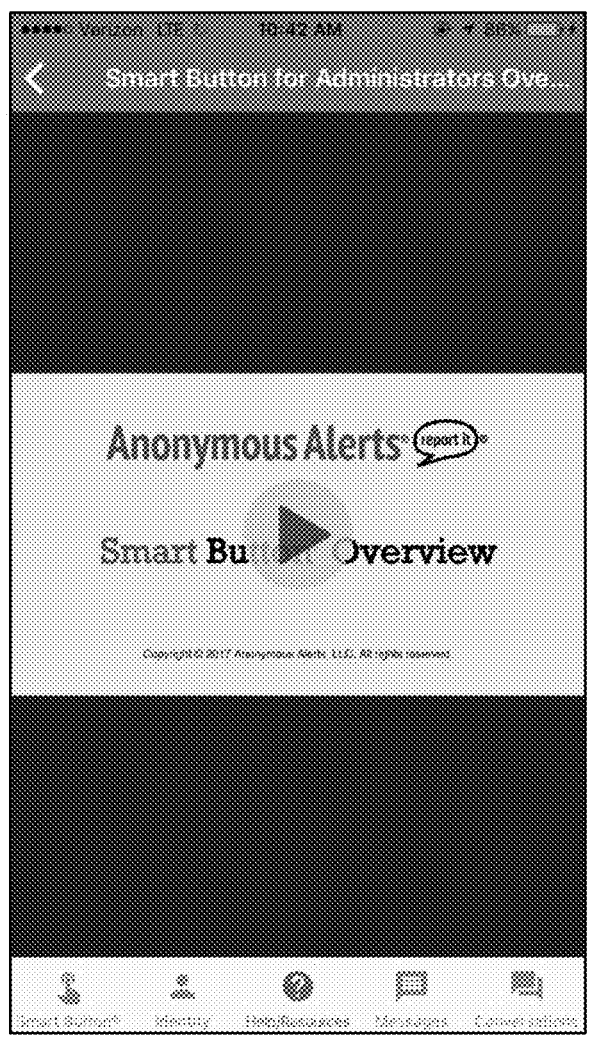

FIG. 43—depicts a screenshot of a video that can be seen if a user selects one of the list options in one of the Video drop-down tabs.

Figure 44:
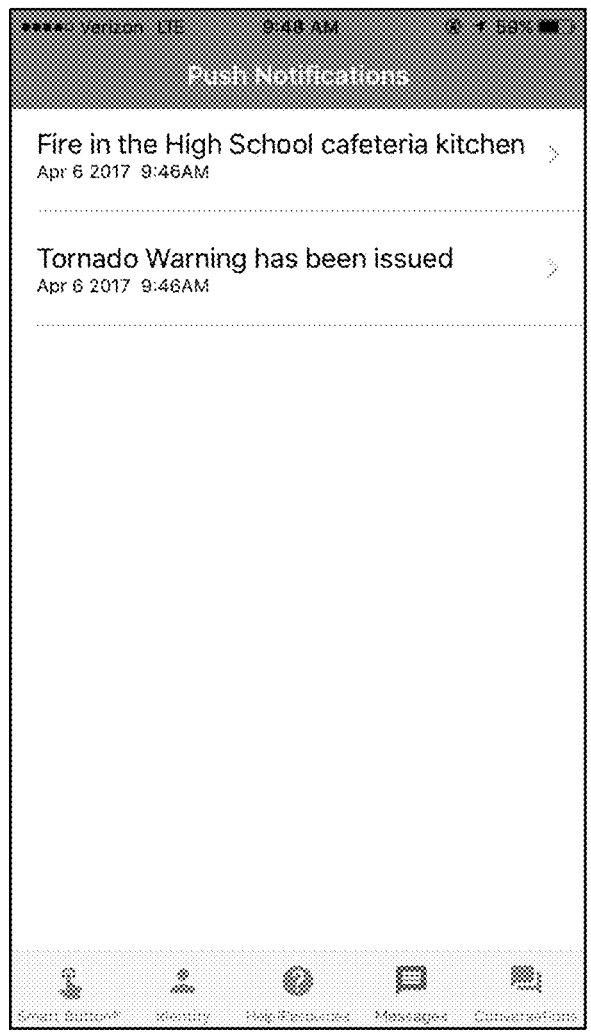

FIG. 44—depicts a screenshot of the "Push Notifications" screen that can be accessed when a user presses the "Messages" icon on the bottom banner. Here, a user can view push notification messages that have been sent to the user's account from one of the account administrators. A user can click on one of the messages to access additional information about the content of the push notification message.

Figure 45:
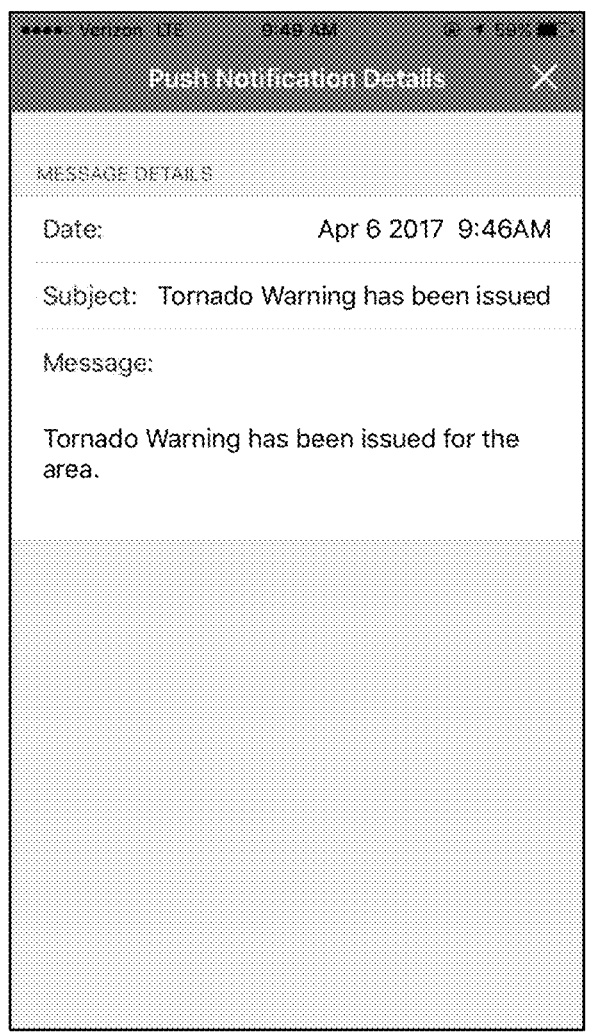

FIG. 45—depicts a screenshot of the "Push Notification Details" screen. Push notification details can be accessed by a user when one of the messages listed in the "Push Notifications" menu screen is clicked on by the user. The details provided include a date and time stamp, the message subject, and the full content of the message.

Figure 46:
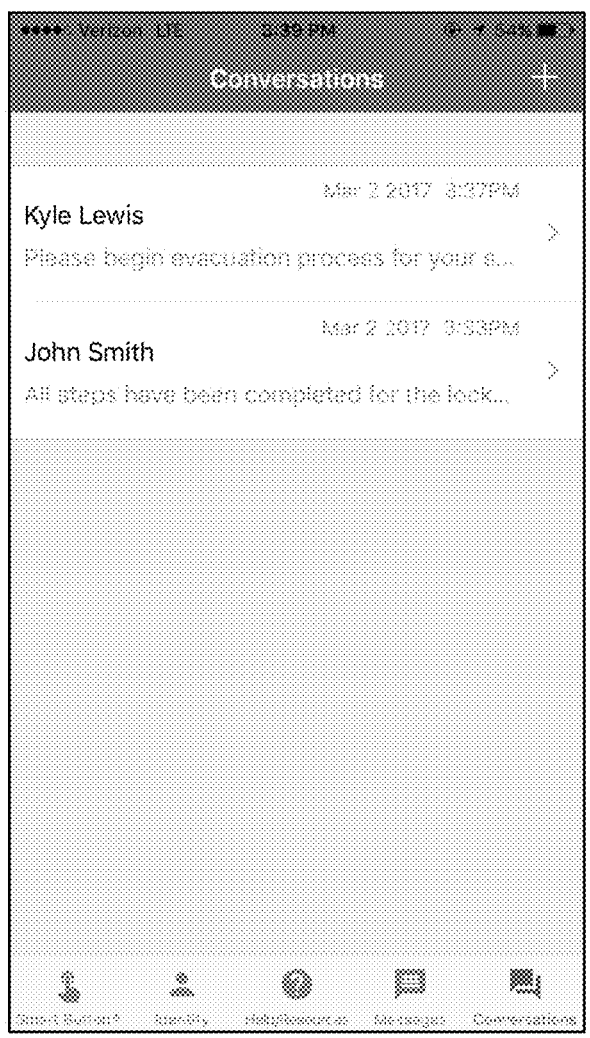

FIG. 46—depicts a screenshot of the "Conversations" menu screen that can be accessed if a user clicks on the "Conversations" icon in the bottom banner. Here a user can start a two-way messaging conversation with one of the emergency contacts by clicking the "+" icon and continue an ongoing conversation by selecting one of the active conversation tabs listed.

Figure 47:
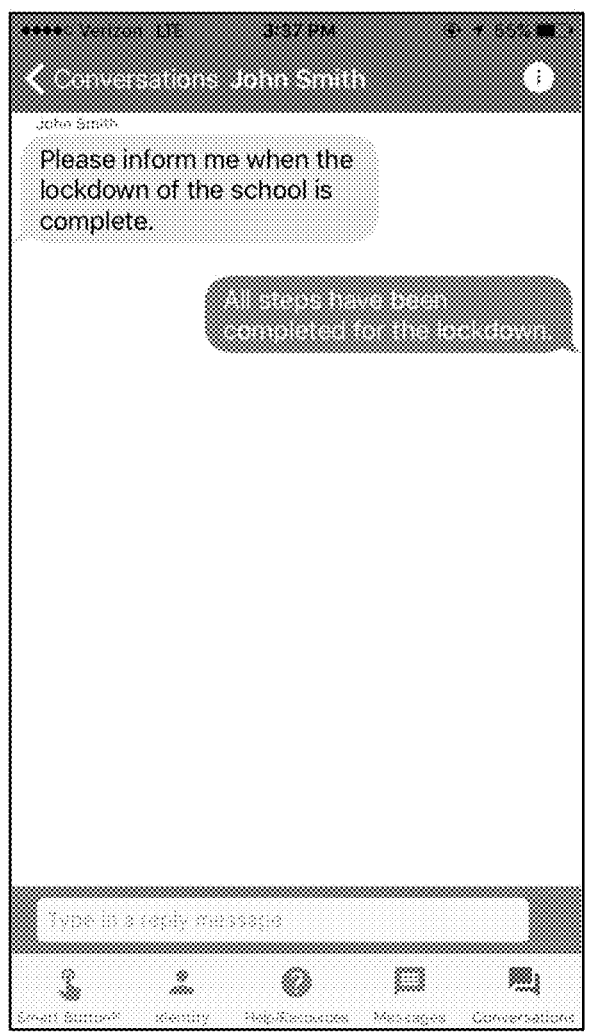

FIG. 47—depicts a screenshot of an active two-way messaging conversation between the user and an emergency contact. The user can type a message and send to the emergency contact, or view the list of members involved in the conversation by clicking the "i" icon.

DETAILED DESCRIPTION OF THE INVENTION

Detailed descriptions of particular embodiment are provided herein. It is to be understood, however, that the present invention may be embodied in various forms. Therefore, specific details disclosed herein are not to be interpreted as limiting, or should these details be interpreted as all being required in any one embodiment but rather as a basis for the claims and as a representative basis for teaching one skilled in the art to employ at least one embodiment of the present invention in virtually any appropriately detailed system, structure or manner.

The basic components of the system for receiving and responding to mood related or time-sensitive content matter messages in accordance with the invention are illustrated by FIG. 1. The system 37 includes a server 15 (and 540), that is accessible by Submitter(s) comprising of at least one student(s) 1, parent(s) 3, staff/authorized parties 6, residents/community members 9 of the community, and/or other Submitter(s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient(s). The system 37 is anchored through the Internet, a virtual network, WAN and/or LAN and is, thus, accessible by personal computer, PDA, tablet, smartphone, mobile device, or other device with Internet, virtual network, WAN, and/or LAN connectivity.

Similarly depicted by FIG. 1, the system 37 is also accessible via the Internet, a virtual network, WAN, and/or LAN by authorized person(s)/receiver(s) such as school superintendent 27, principal 30, counselor 33, law enforcement official(s) 36, and/or other receiver(s) 34. Because of the inventive network's use of the Internet, a virtual network, WAN, and/or LAN, this information is accessible to administrators via personal computer, PDA, mobile device, smart phone, tablet, or other device with Internet, a virtual network, WAN, and/or LAN connectivity. As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods. Also depicted in FIG. 1, but not numbered are the following: a. submitters can be anonymous, partially anonymous, or not anonymous. b. server and server(s) hereby are interchangeable as far as FIG. 1. c. SSL encryption process has been added in section 15. d. the database data security wall has been added below section 15 and the database data security wall has been added to both cylinders below section 15. e. employees has been added as additional submitters. f. submitter unique identifier has been added in the same area as receiver unique identifier.

Depicted in FIG. 2 is the system's 37 accessibility via the cloud 39 (and 530), which can be any or all of the following: the Internet, a virtual network, social network, world wide web, WAN, and/or LAN.

Referring to FIG. 2, an embodiment of a Message Submitter screen 1 is shown. In the embodiment of FIG. 2, a person who would like to submit a message ("Message Submitter" or "Submitter") may optionally select to download a smart device application by clicking or selecting the application icon located on screen 1, 53, and continue the process from the smart device or continue on screen 1 by first selecting the message window 42 from the designated website or application, optionally selecting from the language choices available 43 (The current default is English), and then will select and identify the Person(s)/receiver(s) to Contact 45 to receive the message from a drop-down menu. The Message Submitter may then select a level of priority 48. While the default level in the current embodiment is set to "Normal", a Submitter may indicate that the content of the message is of "High Priority" or one of the other choices being offered. The Submitter may then select a particular Message Type "incident type" 51, which is the character of the message they are sending from the options provided in the drop-down selection (i.e., Bullying, Peer pressure, bomb threat, other school threat, etc.). Submitter also may choose School building type 44, and location there within 52, and a Message Submitter will type a free-form message 54. This embodiment allows for a free-form message. Then the submitter may select a request by checking the box or other indication to add other content to the submission comprising images, text, photos, video, film, sound bites, or other content 56. Lastly, the Submitter would click the graphic icon "I-Step Submit" 57 to submit the message to the receiving and/or corresponding party via a one-click submission process. Also depicted in FIG. 2, but not numbered are the following: a. corporation, non-profit organization, and organization have been added to section 39. b. we have changed section 57 to the following: "Smart Button", or "Submit", or "Send". c. added "default persons to contact" as a unnumbered box below the "Person(s) to Contact" box. d. "medium" has been added to the priority level list attached to the "Priority" box, which is section 48. e. credible threat, abducted, lockdown situation, dangerous student, active shooter, other types of incidents have been added to the list of incident types connected to the "Incident Type" box, which is section 51.

FIGS. 2A-D are screen shots dealing with selecting and manipulating images to be sent. The Message Submitter if desired can alternatively and choose at least one file, 64, (FIG. 2B Choice screen appears for selecting) than select to upload or cancel 59, at least one photo or other content/data from a computer, tablet, smartphone, etc. with or without text. Additionally, the photo can be uploaded from an app, a library, or a photo taken by a phone, tablet or similar device, with the submission comprising images, text, photos, video, film, sound bites, or other content. FIG. 2D shows the ability to make adjustments such as cropping 67 to the selected content prior to submission. To submit, select Submit 61.

FIG. 2E—Depicts a smartphone with the Anonymous Alerts Icon. Submitter clicks the mobile application icon to startup/initiate mobile application.

FIG. 2F—Depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G shows the Submitter message submission screen wherein the Submitter chooses to select "Send Incident Report" or "Glossary" to access definition of terms or "Help".

FIG. 2H shows the Submitter message submission screen after the Submitter chooses to select "Send Incident Report" which includes several entry fields, message field, and submit or send button.

FIG. 2I shows the Submitter message submission screen after the Submitter chooses to select "Send Incident Report" which includes several entry fields and Submitter can select location with a picker that is data driven with custom locations.

FIG. 2J shows the Submitter message submission screen after the Submitter chooses to select "Send Incident Report" which includes several entry fields including an anonymous message screen.

FIGS. 2K and 2L show how the Submitter is prompted to upload an image (upload, or take picture then upload) at the Submitter's discretion if the Submitter has an image to upload about an incident report or other message/information. Various choice options are shown.

FIG. 2M shows a confirmation screen showing that image or other content has been successfully uploaded.

FIGS. 2N and 2O show Mobile Application Screens, sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored. Alternatively, the submitter can choose to be non-anonymous, and reveal information such as the Submitter's name, e-mail address, phone number, phone text number or network identity code or location for non-anonymous communications.

FIG. 2P depicts a "Glossary of Terms" screen. This can include community-specific customized terms.

FIG. 2Q shows the screen for "Definition of Terms" in the drop down menus.

FIG. 2R shows a help screen on mobile device.

FIG. 2S shows a screen shot of Receiver's smart phone device depicting a message being received from an anonymous Submitter.

After activating an icon on at least one of a computer, mobile device, smart device, or tablet the Submitter enters in a login screen of the application, information including a unique code identifier "UCI". The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

As shown in FIG. 3, once a Message Submitter has submitted an alert via the "I-Step Submit" 57 process shown in FIG. 2, the Submitter will receive a notification note and confirmation 60 from the system 37. The system 37 will also generate a unique identifier 63 as depicted by the screenshot in FIG. 15 (the current preferred mode is 5 digits, but any number of digits, letters, symbols or combinations thereof can be used). This unique identifier can be used when contacting the school via telephone or any other transmission method in order to reference the message that was submitted without revealing the Submitter's identity. The system will also permit the Message Submitter to provide an e-mail to which the school may choose to reply 66. The system will automatically encrypt the e-mail address submitted to the school in order to maintain the Submitter's anonymity. Should the Message Submitter elect to be non-anonymous and provide an e-mail and/or other details, the Submitter simply enters the address and/or other information in the non-anonymous section and clicks "submit" 69. The system can guarantee no IP (internet protocol) address tracking for additional security for a group or community that chooses or prefers the highest level of anonymous protection or the method can provide IP addresses as part of the process or when a direct threat has been launched through the system 37. The system 37 can guarantee no IP (internet protocol) address and no VoIP (Voice over Internet Protocol) tracking for additional security for a group or community that chooses or prefers the highest level of anonymous protection or the method can provide IP and/or VoIP addresses as part of the process or when a direct threat has been launched through the system.

As described in FIG. 4 and depicted in the screenshot of FIG. 7, a system administrator (admin) 550 must first create an account for a content Message Recipient (i.e.: receiver/Authorized party). Thus, the admin 550 must first log into the system to access the admin's account, such access to the admin's account can be through use of a mobile or other smart device application by selecting the icon located on the mobile and/or smart device, or login screen 72, or can be through any of a computer, smartphone, mobile phone, mobile device, Internet accessible device. To create a new account, an admin 550 selects the "Account" option on the menu bar 75 and fills in the requisite information, comprising first and last name of the new user 78, may enter title, the type of notification the admin 550 may wish to receive from the system 37 (e-mail, text, voice, instant message, reports only, social media notification or all) 81, and the new user's corresponding contact information including e-mail addresses, and any relevant phone numbers 84. Once an account has been created, a Message Recipient (Receiver) can access anonymous/non-anonymous alert messages by logging into the system Account 87 as described in FIG. 5. From here, the user can run a query for anonymous/non-anonymous alerts from the Campaign Track or reporting system on a menu 90, and identify a date range, and message type 93. The system will run the query 96 and the Recipient/admin 550 user can select to either 1) Open message, 2) Reply to message, 3) Forward message, or 4) Delete message, all options depicted in 99. Should the user choose to open a new message 108 as shown in FIG. 6A, the user will be able to access that particular message, as well as view its message history with time stamped information 102, as depicted in FIG. 6A. The receiver may also elect to forward a message via e-mail to another party 105 before or after opening the message. Should the Receiver choose to reply to a message 111, the system 37 will open a new window 114 and permit a response to the Submitter. The response is then submitted through a "I-Step Submit" or "Submit" (one-click submit) process 117. The method and system of the invention thus allows for an unlimited number of recipients/Receivers to instantly receive information on mood related, time sensitive or secretive, medical, and/or threatening issues.

Referring to FIGS. 8-11, a Receiver who would like to view message content of various types, or those submitted during a particular time period, may do so through the system's 37 search options. FIG. 8 shows both the system's 37 date limitation options for a search query, as well as its options to refine a search by content message type through category selections available in the drop-down list provided. Once a query has yielded a set of results, (see FIG. 9) a user may select any particular message and its history and either read, reply, delete, or forward the information to another party. The results can also be displayed in a graphical pie chart format. FIG. 10 is a screenshot of a message screen containing an original message, related message history, and reply/forwarding options by an administrative user. FIG. 11 is a screenshot of a reply screen for an administrative user.

To submit a new anonymous/non-anonymous alert, a Message Submitter (or Submitter) must do so through the user interface or mobile application used in connection with the user interface. The template, as depicted in FIG. 12, has been simplified to include two required fields from drop-down lists: the Person of Contact field (FIG. 14), and the Message Type field (FIG. 13). The third field provides space for the body of the message. A character count is provided in the lower left hand corner of the template to increase the ease of use of the template. Once a message alert has been successfully submitted, the Submitter will automatically receive a notice confirming the submission. As depicted in FIG. 15, the confirmation notice includes an anonymous ID number as well as a corresponding telephone number should the Submitter wish to follow up on the Submitter's submission. Should the Submitter seek a response, the Submitter may also elect to provide an e-mail address or text number, which can be automatically encrypted by the system 37 in order to maintain the Submitter's anonymity, if desired.

FIG. 16 depicts an example of a mobile or smart phone screen having a downloaded application of the method of the invention.

FIG. 17 depicts an illustrated a block diagram of an exemplary information handling system. The information handling system comprises a bus that connects (either directly, or in combination with another bus) a Central Processing Unit (CPU, or processor) 1702 to RAM 1704, hard disc 1712, ROM 1714, and input/output devices. Additionally, the bus can have an interface for receiving removable memory 1706. Removable memory can include but is not limited to an optical disc, a memory card, or a "boot" drive. Additionally, the bus can connect the CPU 1702 to network interface(s) 1710. The network interface(s) 1710 can either physically or wirelessly connect the information handling system to one or more networks 1708, such as, but not limited to, the internet, WAN, and/or LAN, the Public System Telephone Network, a cellular telephone network, or a cellular data network.

Some inputs can include a mouse 1720, a keyboard 1718, and a microphone 1724. The output devices can include a screen 1716 and speaker(s) 1722. In certain embodiments, the screen 1716 can be heat or touch sensitive so as to project a visual keyboard 1716A for receiving inputs, thus not requiring a keyboard 1718 or mouse 1720.

According to certain embodiments of the present invention, the invention incorporates a plurality of instructions that are executable by the CPU 1702, residing in any combination of RAM 1704, Removable Memory 1706, hard disc 1712, or ROM 1714. Additionally, the instructions can reside at a node on the network. It will be understood that storage of said instructions in the node, RAM 1704, Removable Memory 1706, hard disc 1712, or ROM 1714 changes the foregoing, chemically, electrically, and/or electromagnetically.

FIG. 18 depicts a typical system 37 enabling bi-directional connection via the cloud 530 (and 39) (which can be comprised of one of more of the following: the internet, a virtual network, social network, world wide web, WAN, and/or LAN) of a collection of Submitters 520 using devices such as a smart phone, tablet, computer, and laptop with a collection of Receivers 510 who are authorized persons located in places such as universities, houses, schools, and other places, and their bi-directional communication is enabled by at least one server 15 (and 540) housed in the host system for storing information in a data base 545 such as data identity, unique identifiers and other information used by the system administrator 550 as might be implemented in the present invention.

FIG. 19 is a system view showing the relationship within a cloud 530 (and 39) (which can be comprised of one of more of the following: the internet, a virtual network, social network, world wide web, WAN, and/or LAN) between Submitter(s) 520 which could consist of a parent 3, student 1, or other 7 and Receiver(s) 510 which could consist of a school, university, municipality, administrator, or 3rd party forwarding 560. In the server 15 (and 540) is depicted the input/output devices 570, processor 1702, data base 545, and collective memory 575 in which runs the logging processor 581, unique identifier engine 582, unique receiver identifier engine 583, and report generation 584. The logging processor 581 is unique login software that works in connection with the input devices and interfaces to set up communication between Receivers, Submitters, third parties, and administrators. The unique identifier engine 582 is unique software that generates Unique Identifier(s) using unique algorithms. The unique receiver identifier engine 583 utilizes unique software to generate a Receiver Unique Identifier. The report generator 584 is unique software designed to create unique reporting, charts, tables, lists, statistics, and/or data compilations about alerts and other information received and generated.

It is noted that community members can quickly submit content and information through a variety of transmission options (i.e., computer, fax, phone, smartphone, mobile phone, mobile device, smart device, Internet accessible device) to identified and selected parties who are authorized to respond and confront the issue(s) presented by the sensitive content of the message. The content selection screen is divided into fast and easy sections comprising person of contact, message priority, message type and message. Additionally, submission is advantageously reduced to a simplified, one-step process that creates ease of use for the members of the community for their submission of quick, immediate, and actionable content and code(s). The system can generate immediate feedback once a submission has been successfully sent, providing a code number identifying the particular claim(s) for reference purposes without compromising the anonymity of the Message Submitter. Encryption of the Sender ID can create a level of comfort in the anonymity it offers community members, students, parents, staff, and various community-member users. The content submitter can then choose to reveal their identity anytime thereafter. Additionally, the authorized Receiver(s) of the anonymous messages can have the option to furnish the individual Submitter with a response(s), forward the information to additional parties, and/or forward the information to subject matter experts.

The member transmission option can be to a download smart device application set to receive a particular group code which can insure the submitted content and information is routed to the selected group authorized and designated responder(s).

Additionally, the system can guarantee no IP tracking for additional security for a group or community that chooses or prefers the highest level of anonymous protection, or the method can provide IP addresses as part of the process or when a direct threat has been launched through the system.

Prior to sending an anonymous communication from at least one Submitter, Submitter may activate an icon on at least one of a computer, mobile device, smart device, or tablet. The Submitter can enter in log in screen of the application, information including a unique code identifier. After activating an icon on at least one of a computer, mobile device, smart device, or tablet, the Submitter can enter in a login screen of the application, information including a unique code identifier "UCI". The Unique Code Identifier "UCI" functions for use in identifying the community and act as a location finder to quickly identify which community the anonymous Submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified authorized Receiver(s) or Receiver group(s). The UCI can determine or establish the permissions for locating a specific community and its location.

Submitter can utilize the activated application to send, mood related, time sensitive, or secretive information, sending an anonymous communication, said anonymous communication containing information, encrypting the information, in part or in whole, routing the encrypted information and any other information to be sent to at least one Receiver, generating at least one unique identifier, and sending at least one unique identifier and at least one confirmation message to at least one submitter, and sending at least one unique identifier, and any non-encrypted information to at least one receiver. Submitter can receive a selection command from the Submitter/user, and said Submitter/user can type in a message and/or select a photo/image/sound or video to upload to the system receiving a unique identifier with message confirmation.

The Submitter can receive a selection command from the Submitter/user by clicking on an icon, and this icon appears on a user screen and enables the Submitter/user to type in a message and/or select a photo/image/sound or video to upload to the system receiving a unique identifier with message confirmation.

The user screen can be a mobile user device. The invention can include a data server, wherein an icon enables communication between a Submitter message and the data server using a unique identifier, and Submitter can be using a search module which is capable of searching the database.

FIG. 20—Depicted by FIG. 20, A Mobile to Mobile Message Sending and Receiving—The system includes a server 15 (and 540), that is accessible by Submitter(s) comprising of at least one student(s) 1, parent(s) 3, staff/authorized parties 6, residents/community members 9 of the community, and/or other Submitter(s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient(s). The system 37 is anchored through the Internet, a virtual network, WAN and/or LAN and is, thus, accessible by PDA, tablet, smartphone, mobile device, or other device with Internet, virtual network, WAN, and/or LAN connectivity.

Also via the Internet, a virtual network, WAN, and/or LAN by authorized person(s)/receiver(s) such as school superintendent 27, principal 30, counselor 33, law enforcement official(s) 36, and/or other receiver(s) 34. Because of the inventive network's use of the Internet, a virtual network, WAN, and/or LAN, this information is accessible to administrators via PDA, mobile device, smart phone, tablet, or other mobile device with Internet, a virtual network, WAN, and/or LAN connectivity. As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods.

Figure 22:
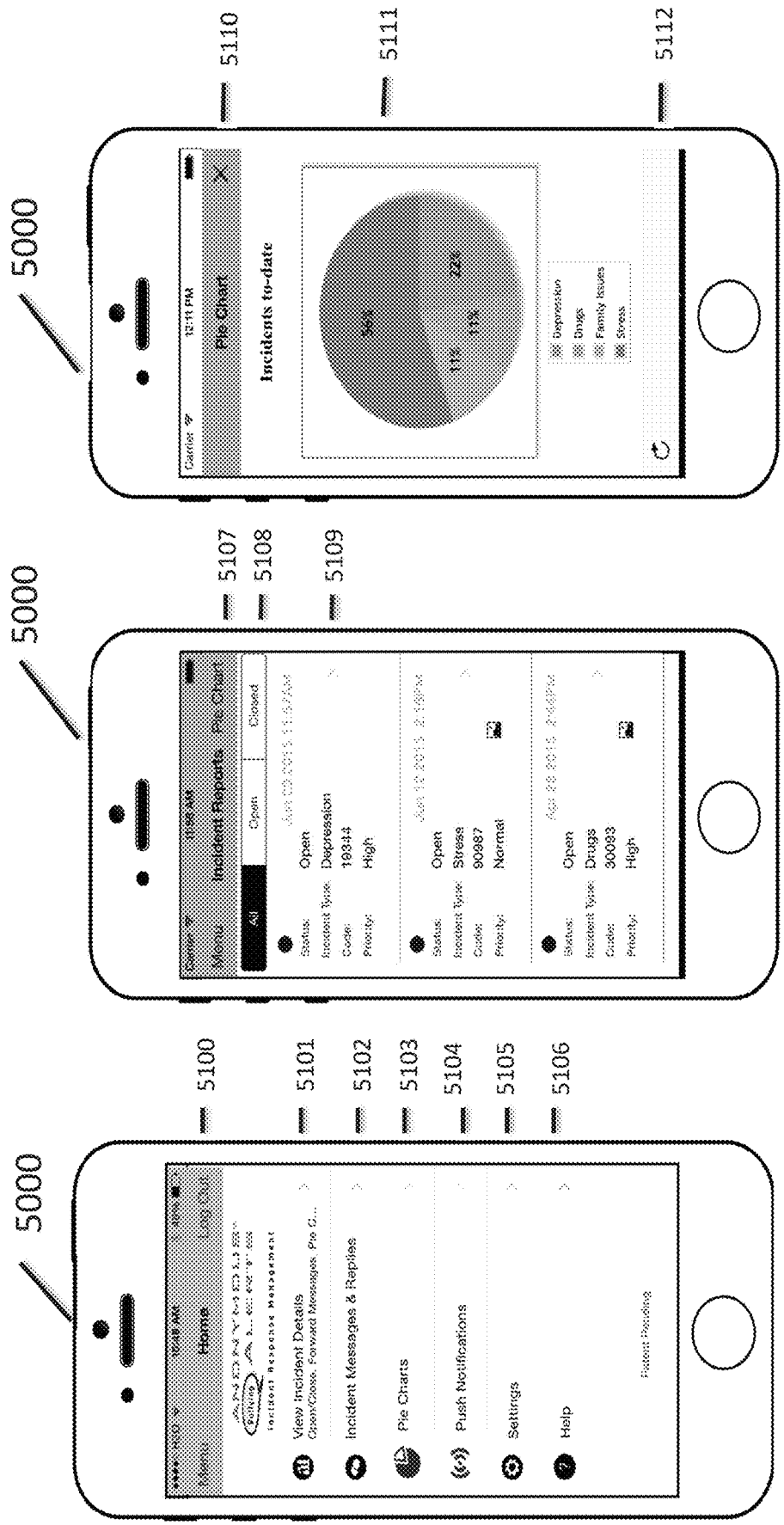

FIG. 21—A Mobile Phone 5000 with a space located at the top of the screen that can have a name/logo 2017, including a custom name, organization name, company name, nickname, custom text, symbols, shapes, icons, buttons, touch sensitive areas and/or custom logo, among other things utilizing and/or accessing UCI The Mobile Phone with 5000 displaying top center button is for sending an incident utilizing a UCI 5002 displaying glossary button is for a custom glossary of terms utilizing a UCI 5003 displaying help button is for a custom help section utilizing a UCI 5004 displaying notifications button is for accessing a school good will or time sensitive notifications utilizing and/or accessing UCI 5005 displaying the Smart button is for a smart button section utilizing a UCI 5006 displaying the Smart button screen for the submitter to report their anonymous or non-anonymous location utilizing a UCI 5007 displaying the reveal your name area to type in your name if the submitter does not want to remain anonymous utilizing a UCI 5008 displaying a pull-down menu and/or selection menu to say the school or organization that the submitter belongs to or is associated with. 5009 displaying a pull-down menu and/or selection menu for the submitter to select what type of incident type for their report. 5010 displaying a My Identity button to click on if they do not want to be anonymous. 5011 with an entry field for the submitter to type in their name or nickname. 5012 displaying a picture icon and/or clickable text for the submitter to add a their photo to not be anonymous. 5013 displaying a pull-down menu and/or selection menu to say the school or organization that the submitter belongs to or is associated with. 5014 displaying social media with a plus sign to add their personal social media sites to send notifications if they want to be non-anonymous. 5015 displaying incident contacts with a plus sign to add their personal incident report contacts to send notifications if they want to be non-anonymous. 5016 displaying a save/reveal button and/or text to save their information for reports utilizing a UCI FIG. 22 shows three screens of an app appearing on a Mobile Phone 5000. The first of the three app screens depicted in FIG. 22 shows buttons for logging the user out of the app 5100, viewing incident details submitted by the users 5101, viewing incident messages & replies submitted 5102, viewing Pie Charts related to incidents or location 5103, accessing Push Notification Features 5104, accessing user settings 5105, and accessing Help/Instruction about the app 5106. The second of the three app screens depicted in FIG. 22 shows buttons for displaying Pie Charts related to incidents or location 5107, filtering reports based on status (e.g., All, Open or Close) 5108, and shows a clickable screen for briefly describing the incident 5109. The third of the three app screens depicted in FIG. 22 shows buttons for closing the presented screen 5110 and refreshing the screen 5112, and shows a screen area for displaying the pie chart 5111.

Figure 23:
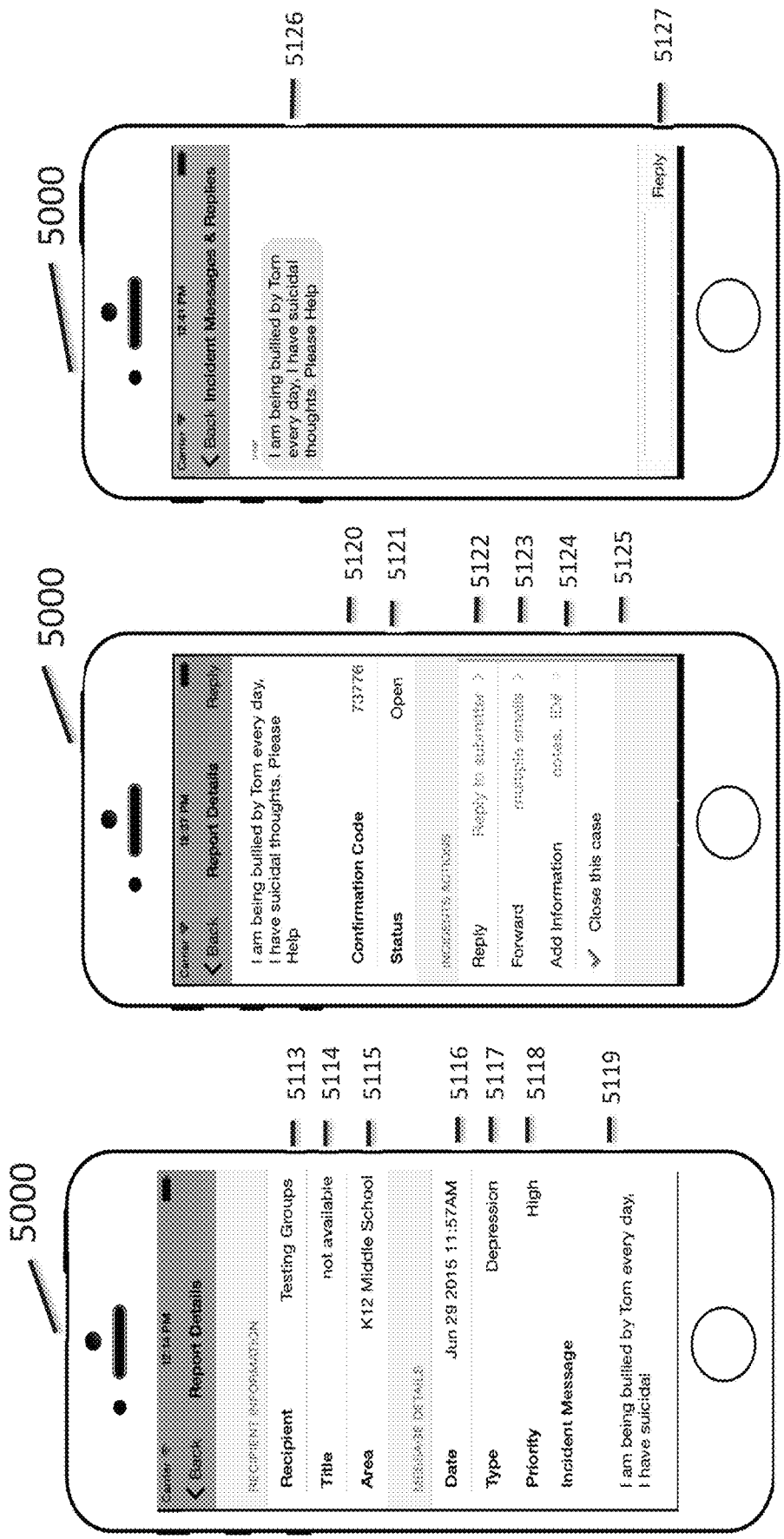

FIG. 23 shows three screens of an app appearing on a Mobile Phone 5000. The first of the three app screens depicted in FIG. 23 shows screen areas for displaying the recipient name 5113, the title of the recipient 5114, the name of the building/area where the incident occurred 5115, the date of the incident 5116, the type of the incident 5117, the incident priority 5118, and the incident message 5119. The second of the three app screens depicted in FIG. 23 shows screen areas for displaying the confirmation code 5120 and the status of the incident 5121, and buttons for replying to the person who submitted the incident message 5122, forwarding the incident report via email 5123, adding more information (e.g., notes or Student ID numbers) of person involved with the submitted incident 5124, closing the case of the submitted incident report 5125, and sending the reply of the message submitted. The third of the three app screens depicted in FIG. 23 shows a screen area for displaying the incident messages and replies 5126 and a button for replying to the incident messages and replies 5127.

Figure 24:
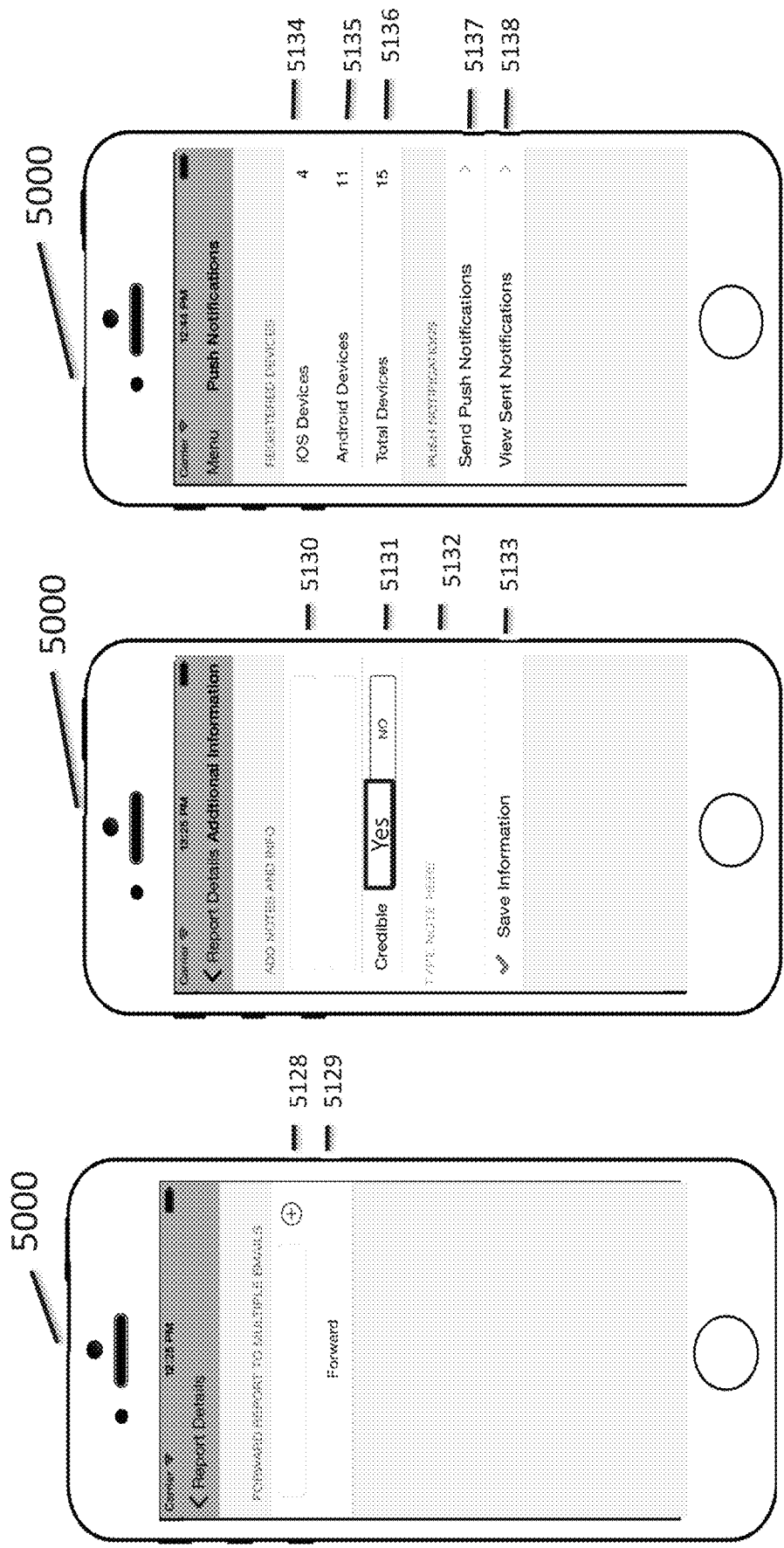

FIG. 24 shows three screens of an app appearing on a Mobile Phone 5000. The first of the three app screens depicted in FIG. 24 shows buttons for adding email addresses 5128 and forwarding the report to the email addresses added 5129. The second of the three app screens depicted in FIG. 24 shows text fields for adding the name of a person involved with the submitted incident 5130, and adding notes related to the submitted incident 5132, and shows buttons for describing credibility of the submitted incident 5131 and saving notes 5133. The third of the three app screens depicted in FIG. 24 shows screen areas for displaying the number of iOS devices registered for push notifications 5134, the number of Android devices registered for push notifications 5135, and the total number of registered devices registered for push notifications 5136, and shows buttons for accessing the features of sending push notifications 5137 and accessing the report of sent push notifications 5138.

Figure 25:
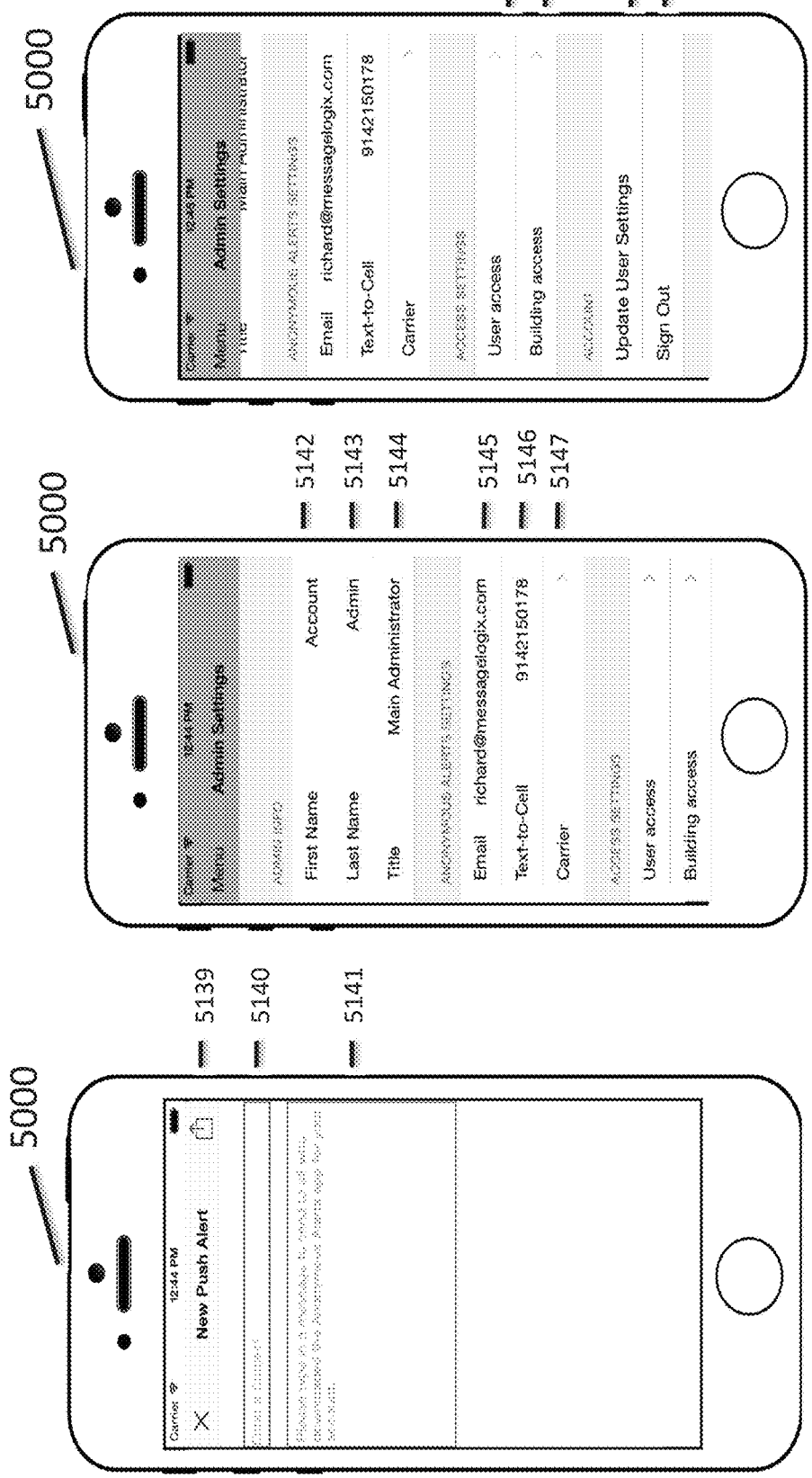

FIG. 25 shows three screens of an app appearing on a Mobile Phone 5000. The first of the three app screens depicted in FIG. 25 shows a button for sending push notifications 5139, and editable text fields for entering the subject of push notifications 5140 and the message of the push notifications 5141. The second of the three app screens depicted in FIG. 25 shows screen areas for displaying the first name of the user 5142, the last name of the user 5143, the title of the user 5144, the email of the user 5145, the phone number of the user 5146, and the user's phone carrier 5147. The third of the three app screens depicted in FIG. 25 shows buttons to display the user access 5148, display the building access 5149, update the user's settings 5150, and sign out 5151.

Figure 26:
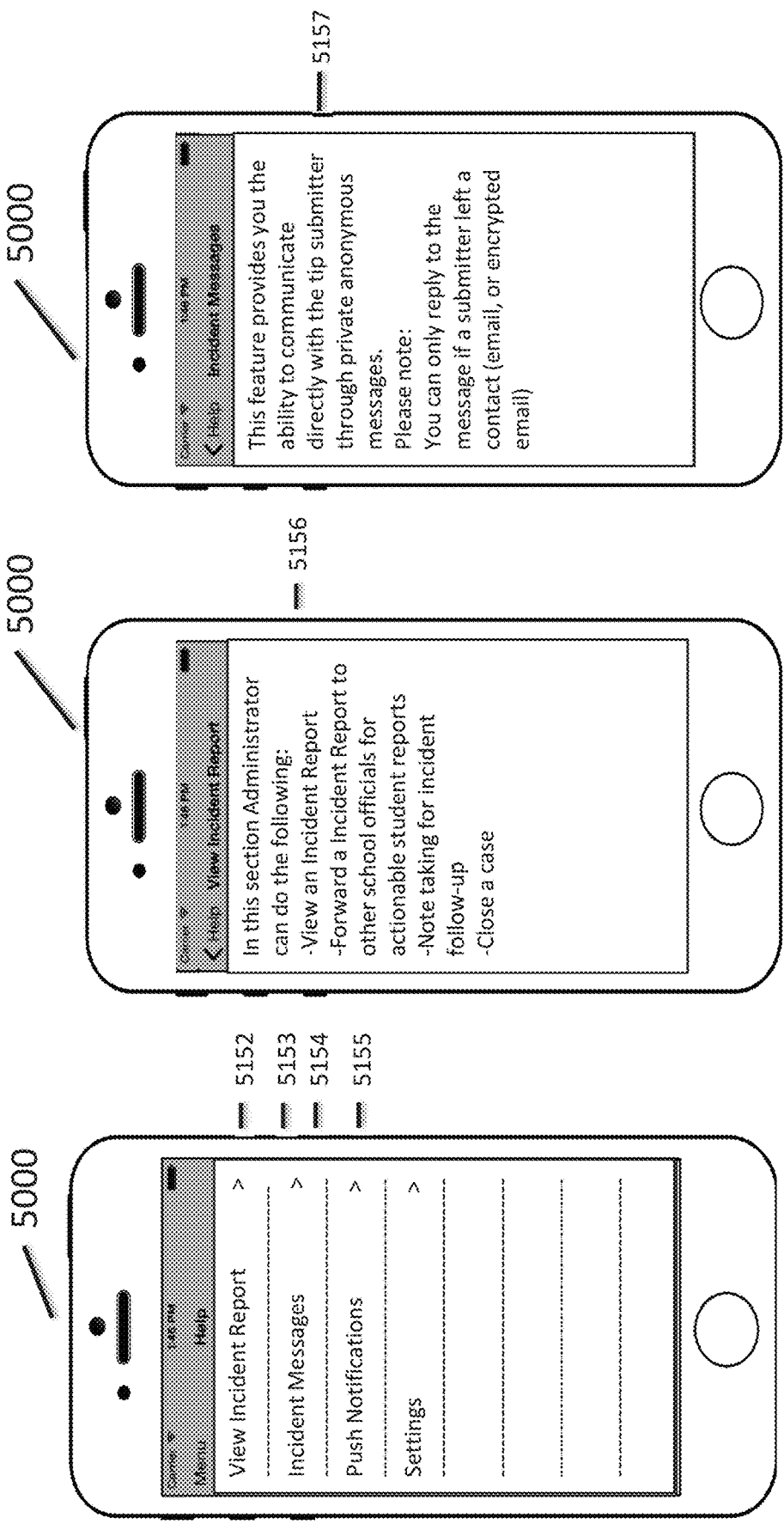

FIG. 26 shows three screens of an app appearing on a Mobile Phone 5000. The first of the three app screens depicted in FIG. 26 shows buttons for accessing instructions about View Incident Report feature 5152, instructions about Incident Messages 5153, instructions about Push Notifications 5154, and instructions about Settings 5155. The second of the three app screens depicted in FIG. 26 shows non editable text of instructions about Viewing Incident Report 5156. The third of the three app screens depicted in FIG. 26 shows non editable text of instructions about Settings 5157.

In at least one embodiment, the application flow is as follows: A Submitter presses Smart Button icon/button to activate SmartButton. Legal information (not shown in drawings) appears informing the user that said user must agree to (only first time use) terms that state that the user will not abuse the app or use it for false reporting, and that the My Identity information will not be linked to Anonymous Alerts reporting, among other terms. A User clicks on Smart Button. After pressing the Smart Button, the GPS status is checked and verified. If GPS is turned off, user gets a prompt to go to settings and turn on GPS location. If GPS is turned on, "My Identity" 5006 information is checked. If "My Identity" information is not filled out a prompt appears asking "Do you want to remain anonymous or fill out more information?". If the selection is yes, a prompt appears saying "Select ORANGE" [not shown in drawing] smart button again to submit additional information below" and additional information, such as "reveal your name (optional)", "Select School (optional)", "Select incident type (optional), and/or "push alert to social media (optional)", appear. If the selection is no, no more prompts appear. If the "My Identity" information is filled out an alert will be sent to contacts saved under "My Identity" profile page with all the Identity information already filled out, and a prompt will appear only for user to "Select incident type (optional)". User can fill out "My Identity" page at any time and can fill out their name, school, add a picture, add social media, and add contacts. The Smart Button will be GREY when user is unable to press button in 3-5 minute time out.

While the instant invention has been shown and described m accordance with preferred and practical embodiments thereof, it is recognized that departures from the instant disclosure are contemplated within the spirit and scope of the present invention. Therefore, the true scope of the invention should not be limited since other modifications will become apparent to those skilled in the art upon a study of the claims, drawings, descriptions, explanations, and specifications herein.

FIG. 27 depicts a screenshot of the log-in screen of the mobile application for Smart Button where the user inputs a unique username and password specific to that one user to gain access to the account.

FIG. 28 depicts a screenshot of the "Smart Button" main menu screen wherein the user can choose to press down on the Smart Button to initiate the reporting process, select a school building, select an incident type, directly call 911, access additional account functions by clicking on an icon in the top banner, or access additional account functions by clicking on a tab in the bottom banner.

FIG. 29 depicts a screenshot of the "Select a building" screen where a user can select a school building to be identified with for the account.

FIG. 30 depicts a screenshot of the "Select an incident" screen where the user has the option to select the incident type that best describes the situation before the user presses down the Smart Button to send a report.

FIG. 31 depicts a screenshot of the "Dial 911" option where the user can click on the "911" icon to activate the prompt to directly call 911.

FIG. 32 depicts a screenshot of the "Success" prompt that notifies the user that the report information and the user's GPS location has been transmitted.

FIG. 33 depicts a screenshot of the "My Identity" screen that is accessed if the user clicks the "Identity" tab in the bottom banner. In "My Identity", the user has the option to edit/add/change account information, including the user's name, email address, phone number, title, account picture, and building to be identified with. In addition, users can access emergency contact information by clicking the "Emergency Contacts" tab.

FIG. 34 depicts a screenshot of the "Media Upload" screen that a user can access by clicking the "Change Your Picture" tab in "My Identity" or clicking on the picture itself. Here, users can select a new picture or take a new picture to use as the account picture.

FIG. 35 depicts a screenshot of the picture preview screen when uploading an account picture. The user can click "Upload" to confirm the preview picture as the new account picture.

FIG. 36 depicts a screenshot of the "Emergency Contacts" screen. Here users can view the information for the emergency contacts and add a new emergency contact, if permitted.

FIG. 37 depicts a screenshot of the "Add Emergency Contact" screen where the user can input a person's name, email address, and phone number to add as a new emergency contact for the user's account.

FIG. 38 depicts a screenshot of the "Select a title" screen where a user can select a position title to be identified by in the account.

FIG. 39A depicts a screenshot of the "Help & Resources" menu. A user can click on the drop-down tabs to access list options containing information related to subjects such as emergency procedures, building plans, policies, emergency guides, helpful links, videos, and more.

FIG. 39B depicts a screenshot of the Help & Resources menu where the "Help" and "Emergency Procedures" drop-down tabs have been expanded to reveal the different options to access in a list. A user needs to click on one of the options to access it's accompanying information.

FIG. 39C depicts a screenshot of the "Building Plans" and "Policies" drop-down tabs expanded where a user can select one of the list options to access the information.

FIG. 39D depicts a screenshot of additional drop-down tabs in the Help & Resources menu that a user can access. The additional tabs are "Full Emergency Guides", "Helpful Links", "Videos", and "YouTube Videos".

FIG. 40 depicts a screenshot of one of the list options that has been accessed by a user.

FIG. 41 depicts a screenshot of one of the options in the "Emergency Procedures" drop-down tab that has been selected by the user.

FIG. 42 depicts a screenshot of a building plan that is available to view in the "Building Plans" drop-down tab as long as the user selects it.

FIG. 43 depicts a screenshot of a video that can be seen if a user selects one of the list options in one of the Video drop-down tabs.

FIG. 44 depicts a screenshot of the "Push Notifications" screen that can be accessed when a user presses the "Messages" icon on the bottom banner. Here, a user can view push notification messages that have been sent to the user's account from one of the account administrators. A user can click on one of the messages to access additional information about the content of the push notification message.

FIG. 45 depicts a screenshot of the "Push Notification Details" screen. Push notification details can be accessed by a user when one of the messages listed in the "Push Notifications" menu screen is clicked on by the user. The details provided include a date and time stamp, the message subject, and the full content of the message.

FIG. 46 depicts a screenshot of the "Conversations" menu screen that can be accessed if a user clicks on the "Conversations" icon in the bottom banner. Here a user can start a two-way messaging conversation with one of the emergency contacts by clicking the "+" icon and continue an ongoing conversation by selecting one of the active conversation tabs listed.

FIG. 47 depicts a screenshot of an active two-way messaging conversation between the user and an emergency contact. The user can type a message and send to the emergency contact, or view the list of members involved in the conversation by clicking the "i" icon.

PARTIAL COMPONENT LIST FOR DRAWINGS

Following is a partial list of the components depicted in the drawings:

| Component Number | Component Description |
|---|---|
| 1 | Student |
| 3 | Parent |
| 6 | Staff/Authorized Parties |
| 7 | Other Submitter(s) |
| 9 | Resident/Community Member |
| 12 | Information/Content |
| 15 | Server |
| 18 | Database (includes Content Data 19 + Receiver Unique Identifier 20) |
| 19 | Content Data |
| 20 | Receiver Unique Identifier |
| 21 | Content Unique Identifier 22 + Receiver Unique Identifier 20 |
| 22 | Content Unique Identifier |
| 24 | Receiver Unique Identifier 20 + Geographic Code ID 203 |
| 27 | Superintendent |
| 30 | Principal |
| 33 | Counselor |
| 34 | Other Receiver(s) |
| 36 | Law Enforcement |
| 37 | System |
| 39 | Cloud (includes one or more of the following: Internet, a virtual network, social network, world wide web, WAN, and/or LAN) |
| 42 | Message Window |
| 43 | Translation |
| 44 | School Building |
| 45 | Person(s) to Contact |
| 48 | Priority |
| 51 | Incident Type |
| 52 | Locations |
| 53 | Download iPhone App |
| 54 | Message |
| 56 | Add photo/image/video/sound |
| 57 | "I-Step Submit" or "Submit" |
| 59 | Upload |
| 60 | Message submitter (anonymous identity) receives a unique identifier and confirmation from system |
| 61 | Submit/Cancel |
| 63 | Message submitter receives a unique identifier to contact the school about message without providing identity |
| 64 | Choose File or Cancel |
| 66 | Message submitter has option to provide an e-mail address and/or other information that submitter decides to encrypt or not |
| 67 | Crop |
| 68 | Open |
| 69 | Message submitter enters e-mail and/or other information and clicks SUBMIT |
| 72 | Admin Logs in to System Account |
| 75 | Admin clicks Account on Menu bar |
| 78 | Admin enters the new user's name/title |
| 81 | Admin determines type of notification person will receive |
| 84 | Admin enters the new user's: E-mail address/Text to Cell number/Phone Number |
| 87 | Logs in |
| 90 | Selects Anonymous Alerts from Campaign Track or reporting system |
| 93 | Data Range/Message Type |
| 96 | System runs Query |
| 99 | Chooses message option |
| 102 | View message history with timestamp |
| 105 | Forward message via e-mail to another person |
| 111 | Message Receiver/Message Recipient OPTION 2 REPLY TO MESSAGE PROCESS |
| 114 | System opens new window with text box |
| 117 | Clicks "I-Step Submit" or |
| 203 | "Submit" Geographic Code ID |
| 510 | Receiver(s) |
| 520 | Submitter(s) |
| 530 | Cloud (includes one or more of the following: Internet, a virtual network, social network, world wide web, WAN, and/or LAN) |
| 540 | Server |
| 545 | Database |
| 550 | System Administrator |

-continued

| Component Number | Component Description |
|---|---|
| 560 | 3rd Party Forwarding |
| 570 | Input Output Devices |
| 575 | Collective Memory |
| 581 | Logging Processor |
| 582 | Unique Identifier Engine |
| 583 | Unique Receiver Identifier Engine |
| 584 | Report Generator |
| 1702 | CPU (Processor) |
| 1704 | Ram |
| 1706 | Removable memory |
| 1708 | Network |
| 1710 | Network interfaces |
| 1712 | Hard disk |
| 1714 | Rom |
| 1716 | Screen |
| 1716A | Visual Keyboard |
| 1718 | Keyboard |
| 1720 | Mouse |
| 1722 | Speakers |
| 1724 | Microphone |
| 5000 | Mobile Phone |
| 5001 | Send Incident Report Menu Button |
| 5002 | Glossary Menu Button |
| 5003 | Help Menu Button |
| 5004 | Notifications Menu Button |
| 5005 | Smart Button Menu Button |
| 5006 | Smart Button/Locate Menu Button |
| 5007 | Reveal Your Name Menu Button |
| 5008 | Select School Menu Button |
| 5009 | Select Incident Type Menu Button |
| 5010 | My Identity Menu Button |
| 5011 | Reveal Your Name Menu Button |
| 5012 | Add Your Picture Menu Button |
| 5013 | Select Your School Menu Button |
| 5014 | Add Social Media Menu Button |
| 5015 | Add Incident Contacts Menu Button |
| 5016 | Save/Reveal Menu Button |
| 5017 | Name/Logo |
| 5100 | Log Out Menu Button |
| 5101 | View Incident Details Menu Button |
| 5102 | Incident Messages & Replies Menu Button |
| 5103 | Pie Charts Menu Button |
| 5104 | Push Notifications Menu Button |
| 5105 | Settings Menu Button |
| 5106 | Help Menu Button |
| 5107 | Pie Charts Menu Button |
| 5108 | All/Open/Closed Status Menu Buttons |
| 5109 | Incident Description Screen |
| 5110 | Exit Menu Button |
| 5111 | Pie Chart |
| 5112 | Refresh Menu Button |
| 5113 | Name of Recipient |
| 5114 | Title of Recipient |
| 5115 | Area of Recipient |
| 5116 | Date of Message |
| 5117 | Type of Message |
| 5118 | Priority Level of Message |
| 5119 | Incident Message |
| 5120 | Confirmation Code of Report |
| 5121 | Status of Report |
| 5122 | Reply Menu Button |
| 5123 | Forward Menu Button |
| 5124 | Add Information Menu Button |
| 5125 | Close Case Menu Button |
| 5126 | Incident Messages & Replies |
| 5127 | Reply Menu Button |
| 5128 | Add Email Menu Button |
| 5129 | Forward Menu Button |
| 5130 | Add Notes and Info |
| 5131 | Credibility Menu Button |
| 5132 | Notes |
| 5133 | Save Information Menu Button |
| 5134 | Number of iOS Devices |
| 5135 | Number of Android Devices |
| 5136 | Total Number of Devices |
| 5137 | Send Push Notifications Menu Button |
| 5138 | View Sent Notifications Menu Button |
| 5139 | Share Menu Button |
| 5140 | Subject |
| 5141 | Message |
| 5142 | First Name of User |
| 5143 | Last Name of User |
| 5144 | Title of User |
| 5145 | User's Email Information |
| 5146 | User's Text-To Cell Information |
| 5147 | User's Carrier Information |
| 5148 | User Access Menu Button |
| 5149 | Building Access Menu Button |
| 5150 | Update User Settings Menu Button |
| 5151 | Sign Out Menu Button |
| 5152 | View Incident Report Menu Button |
| 5153 | Incident Messages Menu Button |
| 5154 | Push Notifications Menu Button |
| 5155 | Settings Menu Button |
| 5156 | View Incident Report Screen |
| 5157 | Incident Messages |

DEFINITIONS

These definitions are in addition to the words and phrases specifically defined in the body of this application.

Anonymous Alerts: is a registered trademark of Anonymous Alerts, LLC, having US Trademark Registration No. 4,306,994.

Computer and/or smart device: can be a mobile device, smart pad, electronic device, mobile phone, input device, communication device, tablet, computer, fax, facsimile machine, phone, smart device and/or smart phone.

Database data security wall: an encrypted storage database that serves as a third party intervening gateway destination for communications containing information acting as the end of transmission from at least one submitter and the beginning of transmission to at least one receiver, therefore causing complete separation from the incoming and outgoing transmissions, which is a security wall keeping transmissions anonymous if designated as such by submitter.

Device: Comprises at least one of electronic device, computer, mobile device, digital scanner, image scanner, scanner, handheld device, reader device, or server.

Digital Scanner, Image Scanner: an electronic device that generates a digital representation of an image for data input to a computer.

Electronic Device: a device that accomplishes its purpose electronically.

Hand-held computing device: a device that can have an operating system (OS), and usually can run various types of application software, known as apps. Most hand held devices can also be equipped with WI-FI, Bluetooth and GPS capabilities that can allow connections to the Internet and other Bluetooth capable devices such as an automobile or a microphone headset. A camera and/or media player feature for video or music files can also be typically found on these devices along with a stable battery power source. Other types of Mobile Devices include tablet computers. As in a personal digital assistant ("PDA"), the input and output are often combined into a touch-screen interface, Smartphones and PDAs Enterprise Digital Assistants may offer integrated data capture devices like barcode, RFID, optical, Optical Character Recognition, and smart card readers.

Internet: includes generically/commonly known internet networks, virtual networks, wide area networks (WAN) and local area networks (LAN).

Message or communication: a generic term used to refer to a communication whether it be made in writing, by voice, by image (photo, picture, etc.) or otherwise, or in any combination thereof.

Mobile Device: is a generic term used to refer to a variety of devices that allow people to access data and information. A Mobile Device (can also be known as a handheld computing device, handheld device, handheld computer or simply handheld) can also be a hand-held computing device, which can have a display screen and can also have a touch input and/or a miniature keyboard.

User Interface: is the means by which a user can communicate with the method of the invention, e.g., a computer, fax, voice prompt, key board, touch pad, phone, mobile device and/or smart device.

Virtual: occurring, relating to, or existing within a virtual reality or for all practical purposes an existence which is possible or inferred.

Unique Identifier: a unique code identifying person(s) and/or group(s) generated through software combined with at least one unique algorithm.

Unique Code Identifier: a unique code identifying person(s) and/or group(s) generated through software combined with at least one unique algorithm.

Receiver Unique Identifier or Code: a unique code identifying receiver(s) (and not Submitter(s)) generated through software combined with at least one unique algorithm.

Host System Administration Device: (located at system host's location) The master system communicating with all central and local systems.

Authorized Person: Any designated person possessing authority to instantiate action based upon data supplied by a Submitter.

Unidentified Submitter: a Submitter who does not wishing to remain anonymous.

Virtual Network: a network occurring, relating to, or existing within a virtual reality Social Network: a private and/or website or network that enables the connection of any number of users for any number of purposes LAN: local area networks (LAN).

WAN: wide area networks (WAN).

System Administration Device: (located at client's location) the input device used by the system administrator at any venue or locality.

information/submission from Submitter: information and/or a submission that can then be responded to and/or acted upon.

Submitter: a person who and/or group that submits information.

Sender: a Submitter Receiver: a person who and/or group that receives information.

As used herein, the term "Smart Button®" is defined as a switch either virtual or physical which is activated accessed and/or utilized by a submitter and/or receiver to initiate and/or continue communication prior, during and/or after an incident or event takes place transmitting the information, data, and/or location of significance and importance to and from the submitter to receiver(s). Smart Button is a registered trademark of Anonymous Alerts, LLC.

As used herein, the term "and/or," when used in a list of two or more items, means that any one of the listed items can be employed by itself, or any combination of two or more of the listed items can be employed. For example, if a device is described as containing components A, B, and/or C, the composition can contain A alone; B alone; C alone; A and B in combination; A and C in combination; B and C in combination; or A, B, and C in combination.

What is claimed is:

1. A method for at least one submitter to communicate incident-related information in real time comprising the following steps:

sending from at least one submitter at least one anonymous communication of incident-related information or at least one non-anonymous communication of incident-related information; or sending from at least one submitter at least one anonymous communication of incident-related information or at least one non-anonymous communication of incident-related information at the said at least one submitter's sole discretion;

sending said at least one communication in real time from at least one submitter computer and/or smart device running at least one custom software application, or selecting at least one receiver or receiving group and sending said at least one communication, in real time, from at least one computer and/or smart device, running the at least one custom software application;

said computer and/or smart device being connected to at least one of the following: text, e-mail, phone, audio, visual, facsimile, instant message, social network transmission, Bluetooth, Infrared, NFC, radio frequency, communication, and/or data transmission and/or receipt, and through the Internet, a virtual network, a communication network, social network, world wide web, WAN, and/or LAN, Ethernet, streaming, optical transmission and/or receipt, fiber-optic transmission and/or receipt, wireless communication, GPS, cable, global satellite, wireless network, Internet satellite;

sending to at least one receiver in real time the at least one communication containing incident-related information comprising the following steps:

generating at least one Unique Identifier and/or Unique Code Identifier to be associated with said at least one communication containing incident-related information;

generating at least one Submitter Identifier to be used to identify the at least one submitter computer and/or smart device running said at least one custom software application;

sending via said connection the at least one communication containing incident-related information by executing on the submitter computer and/or smart device, running said at least one custom software application, receiving the at least one communication containing incident-related information in at least one dedicated computer, server, and/or smart device, then sending said at least one communication containing incident-related information and the at least one Unique Identifier and/or Unique Code Identifier associated with said at least one communication containing incident-related information to at least one database data security wall; sending the at least one communication containing incident-related information and said at least one Unique Identifier and/or Unique Code Identifier for the communication from the at least one database data security wall, matching at least one targeted receiver to the specific said at least one communication containing incident-related information sent by the at least one submitter associated to the at least one Unique Identifier and/or Unique Code Identifier matching the Receiver Unique Identifier or Code, whereby the at least one matching targeted receiver is able to react in real-time in a response tailored to the specific incident being communicated;

providing a Receiver Unique Identifier or Code to at least one of the following: at least one of authorized host computer system, host system administration device, system administration device, and/or the targeted receiver;

accessing in real time by the at least one matching targeted receiver the communication containing incident-related information along with the associated said at least one Unique Identifier and/or Unique Code Identifier and Receiver Unique Identifier or Code; and reacting by the at least one matching targeted receiver to the incident being communicated in a response specifically tailored to the incident, the reaction including at least one of the following:

forwarding the communication(s);
responding to the communication(s);
replying to the communication(s);
making a report(s);
locating source(s) of communication(s);
initiating and/or utilizing plan(s);
sending or bringing help for individual and community safety, mitigating damage to persons, property or infrastructure;
sending or bringing the police, fire fighters, one or more ambulances, the at least one matching targeted receiver, a parent, a therapist, a doctor, a school employee, a security guard, a SWAT team, a bomb squad; and/or
deleting the communication(s).

2. The method of claim 1 whereby level of said anonymous communication can be sent by submitter within a range of permitted, available, or offered choices, range, degree, or type or whereby level of said anonymous communication can be sent within a range of permitted, available, or offered choices, range, degree, or type.

3. The method of claim 1 whereby the information is coupled with or contains metadata, including but not limited to, at least one Unique Identifier and/or Unique Code Identifier used for anonymous or non-anonymous identification.

4. The method of claim 1 whereby the information is coupled with or contains metadata.

5. The method of claim 1, wherein the information contains in whole or in part, at least one of the following: voice message, handwriting notes or duplication, video(s), photograph(s), image(s), text(s), evidence.

6. The method of claim 1 additionally including the following initiating method: downloading the at least one specific customized software application, receiving authorization and/or metadata; performing sign in process, initiating and running of the said at least one specific customized software application on said user computer and/or smart device, operated by the said at least one user;

or initiating and running, or signing in, initiating and running on the said at least one specific customized software application on said user computer and/or smart device, operated by said at least one user;

and/or inputting data for sign-in process;

using the sign-in metadata or data to authorize the user's account and matching it with previously retrieved identifying information and creating and/or assigning at least one Unique Identifier and/or Unique Code Identifier, which identifies the user.

7. The method of claim 1 further comprising at least one of the following:

encrypting the information being submitted, in whole or in part, to be sent to the at least one receiver;
encrypting the information being stored in the at least one database data security wall, in whole or in part;
decrypting the information upon its exit from the at least one database data security wall, in whole or in part;
targeting the at least one receiver, for the communication;
whereby the communication and/or transmission of data is through at least one of: text, e-mail, phone, audio, visual, facsimile, instant message, social network transmission, Bluetooth, Infrared, NFC, radio frequency, communication, and/or data transmission and/or receipt, and through the Internet, a virtual network, a communication network, social network, world wide web, WAN, and/or LAN, Ethernet, streaming, optical transmission and/or receipt, fiber-optic transmission and/or receipt, wireless communication, GPS, cable, global satellite, wireless network, Internet satellite;
the at least one Unique Identifier and/or Unique Code Identifier being generated is associated with the submitted said communication containing information, in whole or in part;
the at least one Unique Identifier and/or Unique Code Identifier and at least one confirmation message from said at least one receiver is being sent to the at least one submitter;
choosing by the at least one submitter to be identified as being anonymous or non-anonymous, thus if desiring non-anonymous submission said at least one receiver submitting or allowing access to related information, comprising their name, e-mail address, phone number, phone text number, network identity code,
device identification code or location for non-anonymous communications to the at least one receiver(s), wherein the submitter related information is stored in at least one data base to be associated with at least one Unique Identifier and/or Unique Code Identifier; and/or
matching of the targeted receiver to a specific communication and information targeted by the at least one submitter is associated with at least one Unique Identifier and/or Unique Code Identifier stored in the database;
providing the at least one Unique Identifier and/or Unique Code Identifier to at least one of authorized host computer system, host system administration device, system administration device, and/or to the at least one targeted receiver.

8. The method of claim 1, additionally comprising at least one designated contact and/or at least one added contact, and/or said at least one designated contact and/or added contact is notified upon incident report submission or transmission.

9. The method of claim 1, further including a switch, button or Smart Button.

10. The method of claim 1, further comprising other information and content made available to authorized users, including but not limited to, architectural and structural plans, blueprints, policies, compliance, laws and statutes, other locating and compliance materials made available to authorized users.

11. The method of claim 7 whereby:

the submitting of the encrypted information, in whole or in part, and any other information is sent to the at least one receiver, wherein the at least one receiver is a targeted receiver for the communication;

the sending of the at least one Unique Identifier and/or Unique Code Identifier, and any non-encrypted information or messages is to the at least one receiver.

12. The method of claim 1 whereby said communication which contains information and/or messages transmitted and sent by at least one submitter and received by at least one receiver is at least one of the following;
information and/or messages are encrypted;
encryption occurs utilizing at least two levels of encryption or at least three levels of encryption;
said encryption of at least one communication containing information and/or message(s) are transmitted;
said submitter and said receiver are anonymously communicating and separated and thus not connected directly via the usage of at least one database data security wall positioned between the wireless transmission and reception;
system and security adaptation for cloud;
system and security adaptation firewalls.

13. The method of claim 1, whereby any information can be submitted or received on at least one computer and/or smart device and/or communication sent comprises at least one of the following an image, photo, text, video, film, sound file, sound bites, audio, content file, downloadable content, downloadable file utilizing a Unique Identifier and/or Unique Code Identifier with said message and/or information.

14. The method of claim 1, further comprising the steps of:
prior to sending at least one anonymous communication or at least one non-anonymous communication from the at least one submitter, downloading and/or activating an icon on at least one of a computer, mobile device, mobile phone, smart pad, electronic device, smart watch, smart glasses, car play and alike, input device, communication device, touchscreen computing device, portable media player, smart device, or tablet to provide an activated application and open a log-in screen;
inputting at least one Unique Identifier and/or Unique Code Identifier on the log-in screen wherein the Unique Identifier and/or Unique Code Identifier identifies which community the anonymous submitter(s) wants to communicate with or is located in or near; and
submitting the Unique Identifier and/or Unique Code Identifier to authorized person(s) and/or administrator(s) to disseminate the Unique Identifier and/or Unique Code Identifier with-in the community and surrounding areas so the Unique Identifier and/or Unique Code Identifier can be utilized by submitter person(s) and/or groups(s) in or near the community for sending anonymous communications to a specified authorized receiver(s) or receiver group(s).

15. The method of claim 1, wherein the at least one of a user-interface and/or an input device is comprised of a computer, mobile device, Mobile phone, smart pad, electronic device, smart watch, smart glasses, car play and alike, input device, communication device, touchscreen computing device, portable media player, smart device, smart phone, tablet, voice prompt, phone, fax, facsimile, a part therein and/or associated software, further comprising the steps of:
locating the submitter(s) using a geographic locator, device unique identifier, and/or global positioning system (GPS); and
providing the submitter's location to at least one of authorized host computer system, host system administration device, and/or system administration device for submission to receiver(s);
and/or
wherein the geographic locator is sending and/or transmitting to/from the submitter's, receiver's, and/or the administrator's mobile device.

16. The method of claim 1, further comprising the steps of:
downloading, accessing, utilizing and/or activating an application to send, mood related, time sensitive, or secretive information, sending an anonymous communication, said anonymous communication containing information; encrypting the information, in whole or in part;
routing the encrypted information and any other information to be sent to at least one receiver;
generating at least one Unique Identifier and/or Unique Code Identifier; and sending the at least one Unique Identifier and/or Unique Code Identifier and at least one confirmation message to the at least one submitter, and sending the at least one Unique Identifier and/or Unique Code Identifier, and any non-encrypted information to the at least one receiver.

17. The method of claim 1, further comprising the steps of:
the system receiving at least one selection command, voice activated or other content input or transmission from the submitter;
the submitter typing in a message, information and/or selecting a photo, camera function, image, text, film, audio, file, content, sound or video to upload to the system; and the submitter, after sending a submission/communication, receiving a communication.

18. The method of claim 1, whereby the anonymous communication(s) and/or non-anonymous communication(s) are carried forth via at least one of the following: 2-way text-to-cell communication, 2-way voice communication, 2-way Social Media communications, 2-way texting, 2-way phone, 2-way SMS or MMS, 2-way communication, 2-way chat, about information, and the 2-way communication push notifications is between the sender/submitter(s) and the receiver(s).

19. The method of claim 1, wherein
said incident-related information includes at least one of the following types of incidents, prevention or intervention needed, or other critical activities threats of suicide or harm to self, threats of harm to others, urgent intervention concerns, unethical, or inappropriate actions;
the information is coupled with or contains metadata, said metadata is in whole or in part at least one Unique Identifier and/or Unique Code Identifier associated with at least one submitter, receiver, and/or communication which allows for identification while maintaining anonymity;
said metadata also identifying a type of responder to address the incident, to prevent the incident, to intervene or to advise.

20. A method for at least one submitter to communicate information comprising: sending an anonymous communication from at least one of the at least one submitter, from at least one computer and/or smart device, connected to at least one of: text, e-mail, phone, audio, visual, facsimile, instant message, social network transmission, Bluetooth, Infrared, NFC, radio frequency, communication, and/or data transmission and/or receipt, and through the Internet, a virtual network, a communication network, social network, world wide web, WAN, and/or LAN, Ethernet, streaming, optical transmission and/or receipt, fiber-optic transmission and/or receipt, wireless communication, GPS, cable, global satellite, wireless network, Internet satellite, wherein said anonymous communication contains information, inputting the anonymous communication by the at least one submitter in whole or in part utilizing at least one customized standardized template with at least one drop-down list for selecting at least one receiver of a plurality of receivers;

receiving, by the said input device, the selection by the submitter from the drop-down list within the standardized template;

sending at least one Unique Identifier and/or Unique Code Identifier, and any non-encrypted information or message to the at least one receiver of the plurality of receivers;

the customized standardized template drop-down list further comprises at least one of the following: recipient, priority level, type of incident, building, location, GPS location or other and additionally comprising at least one of the following:

wherein the said customized standardized template includes a choice for setting the level of priority that can be assigned to the communication, the level is one of "Urgent", "High", "Medium", "Normal", "Low", or other;

wherein the standardized template includes a drop-down list for selecting a type of communication, said types of communication comprising of, including, but not limited to, at least one of these: stress, family, issues, harassment, stealing, drugs, bullying, weapons on campus, credible threats, bomb threats, cheating on schoolwork, cutting/self-injury, cyber bullying, fighting, gang related issues and/or associations, peer pressure, sexual harassment, and/or depression, trafficking, accident, standards, rules, regulations, statutes, guidelines, or other customized type of communication;

wherein the said standardized template includes a drop-down list for selecting types of location, said types of location comprising of: bus, cafeteria/lunchroom, classroom, hallway, deck, parking lot, warehouse, shed, storage facility, dock, base, headquarters, auditorium, courtyard, quad area, gymnasium, locker room, street, sidewalk, playground, bathroom, in town, sports field, theater, Facebook, instant messaging, FaceTime, social media, iMessage, e-mail, instant message, Twitter, telephone, Skype, IP (internet protocol) address, VoIP (Voice over Internet Protocol), a multimedia message (MIMS), YouTube or other customized type of location;

wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smart phone;

the at least one submitter, at their discretion, can select communication language from a choice of, or drop down window displaying, a selection of a variety of languages to pick from to read and/or communicate in and the at least one receiver, through this method, has the ability to select auto translation of the information; and reacting by the at least one receiver in response to the Unique Identifier and/or Unique Code Identifier and related content received by receiver(s) from the submitter(s), the at least one receiver being able to send at least one response message back to the at least one submitter in response to the Unique Identifier and/or Unique Code Identifier and related content received by receiver(s) from the submitter(s).

21. A non-transitory storage device comprising a plurality of instructions for:

sending an anonymous communication involving live situation, one-click, one-step, mood related, time sensitive, medical, threatening, or secretive information from at least one submitter, from at least one user-interface of at least one input device, connected to at least one of an Internet, a virtual network, a social network, a world wide web, WAN, and/or LAN, wherein said anonymous communication contains information;

encrypting the information, in whole or in part;

submitting the encrypted information and any other information to be sent to at least one receiver of a plurality of receivers;

generating at least one Unique Identifier and/or Unique Code Identifier, and sending the at least one Unique Identifier and/or Unique Code Identifier and at least one confirmation message to the at least one submitter;

sending the at least one Unique Identifier and/or Unique Code Identifier and any non-encrypted information to the at least one receiver of a plurality of receivers, wherein the instructions further comprise a step, when the submitter chooses to only be identified as being anonymous, the submitter completing the anonymous email address and/or text number entry field in the confirmation message;

sending the confirmation message to at least one receiver of the plurality of receivers, wherein the submitter communication is identified as being anonymous; sending, by the at least one receiver of the plurality of receivers, at least one response message anonymously back to the submitter in response to or associated with the at least one Unique Identifier and/or Unique Code Identifier, wherein the at least one receiver of the plurality of receivers is a targeted receiver for the communication;

storing the non-encrypted information in at least one database;

matching the targeted receiver to a specific communication and information targeted by the submitter associated to at least one Unique Identifier and/or Unique Code Identifier stored in the database;

providing a Receiver Unique Identifier or Code to at least one of authorized host computer system, host system administration device, system administration device, and/or to each said at least one receiver of the matched targeted receiver;

granting the targeted receiver access to the secure communication and information targeted by the submitter for the targeted receiver once the inputted Receiver Unique Identifier or Code is verified;

wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier or Code.

22. The non-transitory storage device of claim 21, wherein the instructions further comprise a step, when the submitter chooses to be identified as being non-anonymous, wherein the submitter may reveal information such as their name, e-mail address, phone number, phone text number, photo, video, audio, mobile or other device identifier, or network identity code or location for non-anonymous communications to the at least one receiver(s) and the information is stored in at least one data base, and the submitter communication is identified as being non-anonymous.

23. The non-transitory storage device of claim 21, wherein the instructions further comprise a step, wherein at least one of the at least one receiver(s) is a targeted receiver(s) of the communication, and further comprising the steps of:

matching at least one targeted receiver to specific communications and information stored in at least one database or other storage device and associated with at least one Unique Identifier and/or Unique Code Identifier;

providing a Receiver Unique Identifier or Code to at least one of authorized host computer system, host system administration device, system administration device, and/or to each said at least one receiver;

giving a receiver access to secure communications and information targeted by submitter to them once they input their Receiver Unique Identifier or Code; and permitting the receiver to open communication(s), read the communication(s), act on the communication(s), forward the communication(s), respond to the communication(s), reply to the communication(s), and/or delete the communication(s).

24. The non-transitory storage device of claim 21, further comprising at least one of the following steps:

wherein the instructions further comprise a step of using at least one customized standardized template(s), wherein the communication being sent from the at least one submitter is input utilizing at least one of the customized standardized template(s);

further comprising instructions for having a data base, and icon capable of communicating said submitter message to said data server using Unique Identifier and/or Unique Code Identifier.

25. A computer implemented method for reporting at least one live incident in real-time comprising the following steps: accessing a touch sensitive Smart Button area on the display of a computer and/or smart device, mobile device and/or smart device, activating the Smart Button with at least one user interface, mouse click, physically pressing a predefined screen area and/or gesture recognition; the method further comprising at least one or more of the following steps:

at least one submitter optionally enters or edits data, adds identity information and/or inputs incident information or report;

the at least one submitter decides the degree of anonymity to select when accessing/activating use of a Smart Button from at least one user-interface of at least one input device, connected to at least one of an Internet, a virtual network, a social network, a world wide web, WAN, and/or LAN, said anonymous communication contains information; and/or said activation/accessing of Smart Button causes device to be located and/or automatically enabled to be located employing at least one of GPS, IP location, proximity to at least one cell tower, proximity to at least one Wi-Fi and/or other signal, RFID tagging, Near Field Communications, infrared, radio frequency, establishing prior known location and/or association with at least one known location;

said activation further initiating at least one of the following steps:

generating at least one Unique Identifier and/or Unique Code Identifier associated with the at least one submitted incident event and/or information;

capturing, accessing, or generating at least one Unique Identifier and/or Unique Code Identifier for the message/information for the at least one incident report being submitted;

capturing, accessing, or generating at least one Unique Identifier and/or Unique Code Identifier for the device sending the at least one incident report; creating, accessing, and/or utilizing at least one Receiver Unique Identifier or Code associated with at least one individual to be contacted;

generation of at least one custom incident or event report and location to at least one receiver(s) with at least one Receiver Unique Identifier or Code;

accessing, inputting and/or submitting at least one custom standardized template the user can enter and/or select from dropdown menu at least one of their incident or event details, name, e-mail address, phone number, school or organization, photo, audio, video, alias, or other identifying information associated with the user, or take no action or choose to skip;

typing a custom message within a data entry field within a template; manually turning on GPS location services if not currently available with one click and/or interaction with a touchscreen;

adding user's picture and save and transmit if user does not want to be anonymous;

creating reports for at least one administrator and/or authorized receiver(s);

notification from at least one submitter to authorized receiver(s) sent via text, email, voice and/or push mobile notification; and/or location of at least one submitter on at least one map.

26. The method of claim 25, further comprising at least one of the following steps:

further comprising the creation, access, utilizing, of a group to be displayed within a drop-down menu and/or list comprising at least one authorized person to be contacted;

wherein said at least one standardized customized template includes a drop-down list for selecting at least one type of event or incident communication;

further comprising a step wherein at least one administrator or receiver can view or access a report a map, graph, table will be displayed with the GPS location of at least one submitter;

further comprising the emitting of a custom sound, light, vibration to be received and acted upon by receiver;

further comprising a step whereby the location of at least submitter is tracked using at least one map locator;

wherein said at least one standardized customized template includes a drop-down list and/or other selectable switch, button, or interface for at least one submitter sending or displaying Incident Report, Glossary, Help, Notification, Smart Button or other information.

27. The method of claim 25, wherein said notification is the receipt through the device of push notifications and other information relating to among other things counseling, time sensitive or goodwill messages to submitter(s).

28. The method of claim 25, wherein said application(s) are native applications specific to the device being used.

29. The method of claim 25, further comprising at least one of the following:

creating and/or displaying buttons for logging a user into and out of the method;
viewing incident details;
creating and/or displaying incident messages and replies;
viewing incident messages and replies;
creating and/or displaying pie charts related to incidents, location and combination thereof;
viewing pie charts related to incidents, location and combination thereof;
accessing and/or sending push notification to users;
accessing user settings;
accessing and/or displaying help/instruction;
creating and/or displaying buttons for displaying pie charts related to incidents or location;
filtering reports based on status;
creating and/or displaying a clickable display for briefly describing the incident;
creating and/or displaying buttons for closing a presented display;
refreshing the display;
creating and/or displaying a display area for displaying the pie chart;
creating and/or displaying display areas for displaying the recipient name;
accessing and/or entering a title of a recipient;
accessing and/or entering a name of a building/area where an incident occurred;
accessing and/or entering a date and time stamping of an incident;
accessing and/or entering a type of incident;
accessing and/or entering an incident priority;
accessing and/or entering an incident message;
accessing and/or entering display areas for displaying a confirmation code;
accessing and/or entering a status of an incident;
creating and/or displaying buttons for replying to a person who submitted an incident message;
forwarding an incident report via email;
adding more information about person involved with a submitted incident;
closing a case of a submitted incident report;
sending a reply to a message submitted;
creating and/or displaying a display area for displaying incident messages and replies;
creating and/or displaying a button for replying to an incident message;
creating and/or displaying buttons for adding email addresses;
forwarding a report to other email addresses;
creating and/or displaying text fields for adding a name of a person involved with a submitted incident;
adding notes and responses related to a submitted incident;
creating and/or displaying buttons for describing credibility of a submitted incident;
saving notes;
creating areas for displaying amount of iOS devices registered for push notifications;
displaying number of Android devices registered for push notifications;
displaying a total number of registered devices registered for push notifications;
creating and/or displaying buttons for accessing features of sending push notifications;
accessing a report of sent push notifications;
creating and/or displaying a button for sending push notifications;
creating and/or displaying editable text fields for entering a subject of push notifications;
creating and/or displaying a message of push notifications;
creating and/or displaying areas for displaying a first name of a user;
entering and/or acccessing a last name of a user;
entering and/or acccessing a title of a user;
entering and/or acccessing an email of a user;
entering and/or acccessing a phone number of a user;
entering and/or acccessing a user's phone carrier;
creating and/or displaying buttons to display a user access;
creating and/or displaying buttons to display a building access;
creating and/or displaying buttons to update a user's settings;
creating and/or displaying buttons to sign out;
creating and/or displaying buttons for accessing instructions about view incident report feature;
creating and/or displaying buttons for accessing instructions about incident messages;
creating and/or displaying buttons for accessing instructions about push notifications;
creating and/or displaying buttons for accessing instructions about settings;
creating and/or displaying buttons for accessing non editable text of instructions about viewing incident report; and/or
creating and/or displaying buttons for accessing non editable text of instructions about settings.

30. A method of producing at least one application data entry or selection area on a user computer and/or smart device comprising:

producing the following application data entry or selection areas on the device:
a name, logo, custom name, organization name, company name, nickname, custom text, symbol, shape, icon, button, and/or touch sensitive area, utilizing and accessing at least one Unique Identifier and/or Unique Code Identifier;
a button for sending by at least one submitter to at least one receiver an incident report in real time utilizing at least one Unique Identifier and/or Unique Code Identifier;
a choice for the at least one submitter to be anonymous or not;
a choice for the at least one receiver to be anonymous or not;
a reveal your name area to type in a name and/or other information if the submitter does not want to remain anonymous utilizing and
accessing at least one Unique Identifier and/or Unique Code Identifier, the reveal your name area appearing when the submitter chooses to be anonymous;
a My Identity button to click on if the submitter does not want to be anonymous with at least one entry field for the submitter to type in their identifying information utilizing and accessing at least one Unique Identifier and/or Unique Code Identifier, the My Identity button appearing when the submitter chooses to be anonymous and the receiver chooses not to be anonymous;
and further comprising producing at least one application data entry or selection area on the device having at least one of the following:

a help button for accessing and retrieving help utilizing at least one Unique Identifier and/or Unique Code Identifier;

a notifications or messages button for accessing time sensitive or other notification(s) utilizing and accessing at least one Unique Identifier and/or Unique Code Identifier;

a Smart Button utilizing and accessing at least one Unique Identifier and/or Unique Code Identifier;

a Smart Button screen for the submitter to report their anonymous or non-anonymous location utilizing and accessing at least one Unique Identifier and/or Unique Code Identifier;

an icon and/or other area for the submitter to add identifying visual, audio, textual, photographic, video, and/or film content utilizing and accessing at least one Unique Identifier and/or Unique Code Identifier;

a pull-down menu and/or selection menu to name the school or organization that the submitter belongs to or is associated with utilizing and accessing at least one Unique Identifier and/or Unique Code Identifier;

social media and/or conversations icon or area to add users personal social media information and/or conversations utilizing and accessing at least one Unique Identifier and/or Unique Code Identifier;

a save/reveal button and/or area to save submitter's information for incident reports or other information utilizing and accessing at least one Unique Identifier and/or Unique Code Identifier.

31. The method of claim 30, wherein the method produces the Smart Button and the Smart Button is an activation switch located on or associated with the touch-screen or any digitally recognized portion of the computer and/or smart device, which initiates and activates transmission of information concerning at least one urgent or other situation, which initiates and activates acceleration from at least one receiver of at least one urgent or other situation response and/or situation supervision, wherein the said at least one submitter and/or submitter device can instantly report to at least one receiver and/or receiver device with at least of the following: the GPS map location, other critical information, the submitter's name, title, contact information, picture, and/or place of work to authorized receiver(s) and/or personnel which instantly reports credible threats, dangerous situations, or maintenance issues that warrant immediate attention in at least one current embodiment.

32. The invention of claim 31, whereby submitters, other users, receivers, third parties, and third party responders can transmit, receive, and/or send at least one 1-way or at least one 2-way communication.

33. The said at least one submitter of claim 31 is at least one of: a school administrator, teacher, professor, student, user, or corporate user.

34. The invention of claim 31 whereby said at least one submitter communicates information executing on at least one computer and/or smart device comprising at least one of the following steps of:

sending an anonymous or non-anonymous communication from at least one submitter, from at least one user-interface of at least one input device, connected to at least one of the Internet, a virtual network, a communication network, social network, world wide web, WAN, and/or LAN, wherein said communication contains information sent to at least one receiver;

generating at least one Unique Identifier and/or Unique Code Identifier for said information;

sending the at least one Unique Identifier and/or Unique Code Identifier;

matching the at least one targeted receiver to a specific communication and information with a Receiver Unique Identifier or Code;

granting the targeted receiver access to communication and information by utilizing the Unique Identifier and/or Unique Code Identifier for said information with the Receiver Unique Identifier or Code;

wherein the targeted receiver is permitted to:

open communication(s);

read the communication(s);

act on the communication(s);

respond to the communication(s);

reply to the communication(s);

forward the communication(s);

and/or delete the communication(s);

based on the inputted Receiver Unique Identifier or Code;

further comprising a step of the at least one receiver(s) responding to, forwarding, taking an action, and/or making a report based on the communication received from the at least one submitter.

* * * * *